US007860926B2

(12) United States Patent
Gobara et al.

(10) Patent No.: US 7,860,926 B2
(45) Date of Patent: *Dec. 28, 2010

(54) INFORMATION PROCESSING SYSTEM, INFORMATION PROCESSING APPARATUS, SERVER APPARATUS, INFORMATION PROCESSING METHOD, AND PROGRAM

(75) Inventors: Kunio Gobara, Tokyo (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 465 days.

This patent is subject to a terminal disclaimer.

(21) Appl. No.: 11/817,084

(22) PCT Filed: Sep. 9, 2005

(86) PCT No.: PCT/JP2005/016595

§ 371 (c)(1),
(2), (4) Date: Aug. 24, 2007

(87) PCT Pub. No.: WO2006/090498

PCT Pub. Date: Aug. 31, 2006

(65) Prior Publication Data

US 2009/0063615 A1     Mar. 5, 2009

(30) Foreign Application Priority Data

Feb. 25, 2005    (JP)    ............................. 2005-050410

(51) Int. Cl.
*G06F 15/16*    (2006.01)
(52) U.S. Cl. ........................................ 709/203; 709/224
(58) Field of Classification Search .................. None
See application file for complete search history.

(56) References Cited

U.S. PATENT DOCUMENTS 5,355,516 A * 10/1994 Herold et al. ............... 455/510
5,884,326 A *  3/1999 Weinger et al. ............. 707/201
6,075,787 A *  6/2000 Bobeck et al. ........... 370/395.2

(Continued)

FOREIGN PATENT DOCUMENTS

JP    2002-354048    12/2002

(Continued)

OTHER PUBLICATIONS

International Search Report Dated Dec. 6, 2005.

*Primary Examiner*—Moustafa M Meky
*Assistant Examiner*—Clayton R Williams
(74) *Attorney, Agent, or Firm*—Pearne & Gordon LLP

(57) ABSTRACT

An information processing apparatus (1) is equipped with: a history packet transmitting unit (11) for transmitting a history packet via a communication processing apparatus (2); a request packet transmitting unit (12) for transmitting a request packet which requests a transmission of a return packet; a packet transmission control unit (13) for controlling the transmission of the request packet; a return packet receiving unit (14) for receiving the return packet transmitted from a server apparatus (3); and a port keeping time detecting unit (15) for detecting a port keeping time of the communication processing apparatus (2) based upon the reception of the return packet by the return packet receiving unit (14). The server apparatus (3) is comprised of: a request packet receiving unit (31) for receiving the request packet; and a return packet transmitting unit (32) for transmitting the return packet to a port of the communication processing apparatus (2) when the request packet receiving unit (31) receives the request packet. With employment of the above-described arrangement, an information processing system capable of detecting the port keeping time of the communication processing apparatus is provided.

28 Claims, 26 Drawing Sheets

U.S. PATENT DOCUMENTS

| | | | |
|---|---|---|---|
| 6,760,775 B1 * | 7/2004 | Anerousis et al. | 709/238 |
| 6,956,867 B1 * | 10/2005 | Suga | 370/465 |
| 2001/0028650 A1 * | 10/2001 | Yoshizawa et al. | 370/389 |
| 2001/0042103 A1 * | 11/2001 | Tomari et al. | 709/206 |
| 2003/0212816 A1 * | 11/2003 | Bender et al. | 709/237 |
| 2005/0008234 A1 * | 1/2005 | Martin | 382/233 |
| 2006/0182100 A1 * | 8/2006 | Li et al. | 370/389 |
| 2008/0056276 A1 | 3/2008 | Gobara et al. | |
| 2009/0219943 A1 | 9/2009 | Gobara et al. | |

FOREIGN PATENT DOCUMENTS

| | | |
|---|---|---|
| JP | 2004-158923 | 6/2004 |
| JP | 2004-166031 | 6/2004 |
| JP | 2006238108 A | 9/2006 |
| WO | 2004/030292 | 4/2004 |
| WO | 2006013811 A | 2/2006 |

* cited by examiner

HISTORY PACKET

REQUEST PACKET

RETURN PACKET

FIG. 11

| WAIT TIME | FLAG |
|---|---|
| 30 SECONDS | 1 |
| 1 MINUTE | 0 |
| 1 MINUTE 30 SECONDS | 0 |
| 2 MINUTES | 0 |
| 3 MINUTES | 0 |
| 4 MINUTES | 0 |
| 5 MINUTES | 0 |

FIG. 12

| APPARATUS IDENTIFICATION INFORMATION | DESTINATION INFORMATION | |
|---|---|---|
| | IP ADDRESS | PORT NUMBER |
| AAA | 202.224.135.10 | 12345 |
| BBB | 202.224.135.55 | 23456 |
| ⋮ | ⋮ | ⋮ |

FIG. 15

| WAIT TIME | FLAG |
|---|---|
| 5 MINUTES | 1 |
| 4 MINUTES | 0 |
| 3 MINUTES | 0 |
| 2 MINUTES | 0 |
| 1 MINUTE | 0 |
| 30 SECONDS | 0 |

| HISTORY PACKET TRANSMISSION TIMING | REQUEST PACKET TRANSMISSION TIMING |
|---|---|
| 0 SECONDS | 1 MINUTE |
| 1 MINUTE 15 SECONDS | 3 MINUTES 15 SECONDS |
| 3 MINUTES 30 SECONDS | 6 MINUTES 30 SECONDS |
| ⋮ | ⋮ |

INFORMATION PROCESSING SYSTEM, INFORMATION PROCESSING APPARATUS, SERVER APPARATUS, INFORMATION PROCESSING METHOD, AND PROGRAM

TECHNICAL FIELD

The present invention is related to an information processing system, and the like, which detect port keeping times of communication processing apparatuses.

BACKGROUND ART

In information processing systems containing information processing apparatuses, communication processing apparatuses, and server apparatuses, for instance, predetermined packets have been transmitted in a periodic manner from the information processing apparatuses such as home-use PCs (Personal Computers) and domestic appliances via the communication processing apparatuses to the server apparatuses. This technical idea is disclosed in, for example, the pamphlet (page 1, FIG. 1 etc.) of PCT Disclosure No 2004/030292.

In this case, the information processing apparatuses are, for instance, routers having the NAT (Network Address Translation) function, and the like. Also, predetermined packets of the information processing apparatuses are transmitted in a periodic manner so as to, for instance, grasp whether or not IP addresses of communication processing apparatuses on the WAN (Wide Area Network) side are changed, or in order that ports of the communication processing apparatuses are maintained (namely, packets sent from WAN side may be transmitted via communication processing apparatuses to information processing apparatuses) in such a manner that the information processing apparatuses can be accessed via the server apparatuses from external apparatuses such as portable telephones.

In communication processing apparatuses having the NAT function such as routers, when packets are transmitted from LAN (Local Area Network) sides to WAN sides, both private IP addresses and port numbers of the LAN sides are translated to global IP addresses and port numbers of the WAN sides. Also, when return packets sent from the WAN sides are received, reverse translations of these IP addresses and port numbers are carried out, so that packets are transferred to the information processing apparatuses. In this case, in the communication processing apparatuses, times required for performing the above-described address translations have been set. Concretely speaking, when a predetermined time period has elapsed after a certain address translation had been finally carried out between a WAN side and a LAN side, an address translation with respect to a packet received from the WAN side is not carried out (new address translation is carried out with respect to packet received from LAN side). In other words, this packet transmitted from the WAN side is not received by the information processing apparatus, so that the external apparatus such as the portable telephone cannot access the information processing apparatus via the server apparatus. The above-described predetermined time period will be referred to as a "port keeping time."

In the above-described information processing systems, in order that the information processing apparatuses can receive information from the server apparatuses, the communication processing apparatuses are required to be capable of continuously performing address translations with respect to packets transmitted from the server apparatuses (namely, packets from WAN sides). As a consequence, even in such a case that information need not be transmitted/received between the information processing apparatuses and the server apparatuses, it is required that the communication processing apparatuses are capable of performing the address translations with respect to packets transmitted from the server apparatuses by transmitting the packets from the information processing apparatuses via the communication processing apparatuses to the server apparatuses in the periodic manner. In this case, there is such a request that transmission time periods of the packets by the information processing apparatuses in the periodic manner should be made as long as possible. This reason is given as follows: That is, the packet transmission time periods must be prolonged in order to reduce the transmissions of the unnecessary packets, or so as to decrease processing work loads for transmitting the packets by the information processing apparatus. Concretely speaking, it is preferable if the transmission time periods of the packets by the information processing apparatuses in the periodic manner may be made slightly shorter (for instance, 1 second, 2 seconds etc.) than port keeping times of communication processing apparatuses to which the information processing apparatuses have been connected.

However, generally speaking, it is unclear that information processing apparatuses have been connected to which communication processing apparatuses. As a result, while such a time period corresponding to the shortmost port keeping time within various sorts of communication processing apparatuses marketed from various manufactures has been set to the information processing apparatuses, these information processing apparatuses transmit packets by employing this set time period. In this case, even in such an information processing apparatus which has been connected to a communication processing apparatus having a long port keeping time, packets are transmitted in a periodic manner based upon the previously set short time periods. As a result, a large number of unwanted packets are transmitted.

DISCLOSURE OF THE INVENTION

The present invention has been made to solve the above-described problems, and has an object to provide an information processing system, and the like, capable of detecting a port keeping time of a communication processing apparatus to which the information processing apparatus has been connected.

To achieve the above-described object, an information processing system, according to the present invention, is featured by such an information processing system comprising: an information processing apparatus; a server apparatus; and a communication processing apparatus for performing a process operation related to a communication between the information processing apparatus and the sever apparatus; in which: the information processing apparatus is comprised of: a history packet transmitting unit for transmitting a history packet via one port of the communication processing apparatus, the history packet corresponding to a packet for leaving a transmission history on the communication processing apparatus; a request packet transmitting unit for transmitting one, or more pieces of request packets to the server apparatus via a port different from a history port corresponding to the port of the communication processing apparatus, through which the history packet has passed, the one, or more pieces of request packets corresponding to a packet for requesting a transmission of a return packet corresponding to a packet transmitted from the server apparatus; a packet transmission control unit for controlling the transmission of the request packet by the request packet transmitting unit; a return packet receiving unit for receiving the return packet transmitted via the history port from the server apparatus; and a port keeping time detecting unit for detecting a port keeping time of the communication processing apparatus based upon the reception of the return packet by the return packet receiving unit; and in which: the server apparatus is comprised of: a request packet receiving unit for receiving the request packet; and a return packet transmitting unit for transmitting the return packet to the history port when the request packet receiving unit receives the request packet.

Since the above-described arrangement is employed, the port keeping time of the communication processing apparatus can be detected based upon the reception of the return packet by the return packet receiving unit, which is transmitted in response to the request packet. Then, with employment of the detected port keeping time, for example, packets can be transmitted in a periodic manner. As a result, transmissions of unnecessary packets cannot be carried out.

BRIEF DESCRIPTION OF THE DRAWINGS

FIG. 11 is a diagram for indicating an example as to wait time setting information in the embodiment mode 1.

FIG. 12 is a diagram for representing an example as to transmission destination information in the embodiment mode 1.

FIG. 15 is a diagram for showing one example as to wait time setting information in the embodiment mode 1.

DESCRIPTION OF REFERENCE NUMERALS AND SINGS

Figure 1:
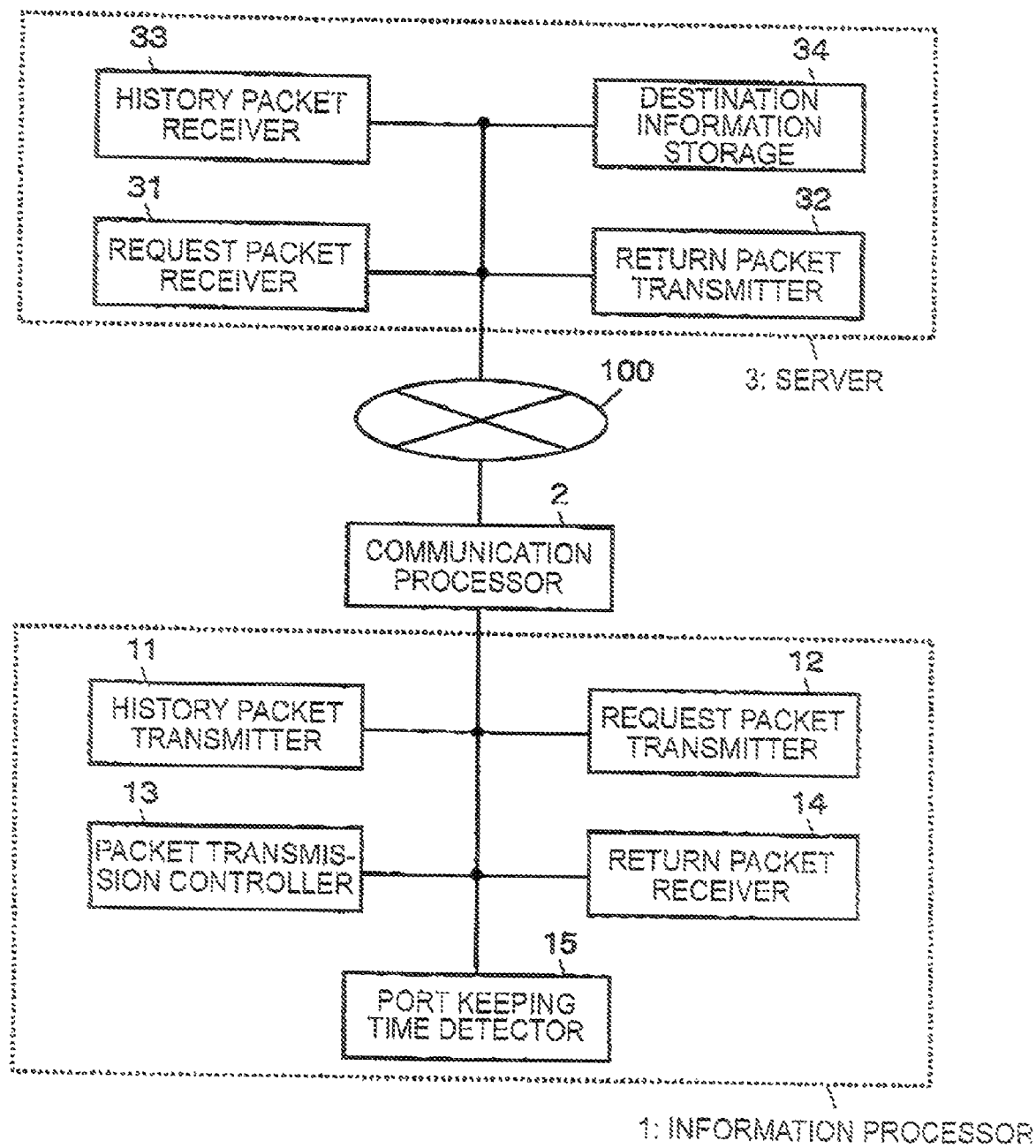
FIG. 1 is a block diagram for indicating an arrangement of an information processing system according to an embodiment mode 1 of the present invention.

1, 4 information processing apparatus
2 communication processing apparatus
3, 5 server apparatus
11 history packet transmitting apparatus
12 request packet transmitting apparatus
13 packet transmission control unit
14, 42 return packet receiving unit
15 port keeping time detecting unit
31, 41 request packet receiving unit
32, 51 return packet transmitting unit
33 history packet receiving unit
34 transmission destination storage unit

BEST MODE FOR CARRYING OUT THE INVENTION

An information processing system, according to the present invention, will now be described with reference to embodiment modes. It should be understood that in the below-mentioned embodiment modes, structural elements to which the same reference numerals are applied are identical, or similar to each other, and descriptions thereof may be omitted.

Embodiment Mode 1

Referring now to drawings, a description is made of an information processing system according to an embodiment mode 1 of the present invention.

FIG. 1 is a block diagram for showing an arrangement of the information processing system according to the embodiment mode 1. In FIG. 1, the information processing system of this embodiment mode 1 is equipped with an information processing apparatus 1, a communication processing apparatus 2, and a server apparatus 3. FIG. 1 describes such a case that one information processing apparatus 1 is connected to the communication processing apparatus 2. Alternatively, two, or more sets of information processing apparatuses may be connected to the communication processing apparatus 2. The information processing apparatus 1 is, for example, a computer, a microwave oven, a telephone, a printer, a facsimile apparatus, a refrigerator, a washing machine, an air conditioning apparatus, a television, a picture recording apparatus, a Settop Box, or the like. The communication processing apparatus 2 has been connected via a wireless, or wired communication line 100 to the server apparatus 3. The communication line 100 is, for instance, the Internet, an intranet, a public telephone network, or the like.

The information processing apparatus 1 is equipped with a history packet transmitting unit 11, a request packet transmitting unit 12, a packet transmission control unit 13, a return packet receiving unit 14, and a port keeping time detecting unit 15.

The history packet transmitting unit 11 transmits a history packet with respect to the server apparatus 3. This history packet is transmitted via one port of the communication processing apparatus 2. In this case, a history packet corresponds to a packet employed so as to leave a transmission history in the communication processing apparatus 2. This history packet is transmitted in order to determine a reference time for measuring a port keeping time of the communication processing apparatus 2, or to determine a transmission destination of a return packet (will be described later). This history packet is, for instance, a packet of a UDP. Certain information may be included in a payload of this history packet. A port of the communication processing apparatus 2 on the side of the communication line 100, through which the history packet has passed, will be referred to as a history port. It should also be noted that the history packet transmitting unit 11 may alternatively contain a transmission device (for example, modem, network card, and so on) which is employed so as to perform a transmission. If such a transmission device is not contained, then the transmission device (not shown) is present between the history packet transmitting unit 11 and the communication processing apparatus 2. Also, the history packet transmitting unit 11 may be alternatively realized by hardware, or may be realized by such a software as driver software for driving the transmission device.

The request packet transmitting unit 12 transmits one, or more pieces of request packets to the server apparatus 3. The request packet transmitting unit 12 transmits a request packet via a port of the communication processing apparatus 2, which is different from the history port. In this case, a request packet corresponds to such a packet which requests to transmit a return packet. A return packet implies such a packet which is transmitted from the server apparatus 3 to the history port of the communication processing apparatus 2. This request packet is, for instance, a packet of a UDP. Certain information may be included in a payload of this request packet. It should also be noted that while such a request as an instruction and a command for transmitting a return packet is not contained in the request packet, for instance, since such a message that the packet is the request packet is contained, it may be judged that the packet is the request packet in the server apparatus 3. It should also be noted that the request packet transmitting unit 12 may alternatively contain a transmission device (for example, modem, network card, and so on) which is employed so as to perform a transmission. If such a transmission device is not contained, then the transmission device (not shown) is present between the request packet transmitting unit 12 and the communication processing apparatus 2. Also, the request packet transmitting unit 12 may be alternatively realized by hardware, or may be realized by such a software as driver software for driving the transmission device.

The packet transmission control unit 13 controls a transmission of a request packet transmitted by the request packet transmitting unit 12. A control of a transmission of a request packet implies, for example, a control of transmission timing of a request packet by the request packet transmitting unit 12. A detailed content of this process operation will be described later.

The return packet receiving unit 14 receives a return packet transmitted from the server apparatus 3. This return packet corresponds to such a packet which has been transmitted via the history port of the communication processing apparatus 2. It should also be noted that as will be described later, the return packet receiving unit 14 does not always receive all of return packets transmitted from the server apparatus 3. This reason is given as follows: That is, among return packets transmitted from the server apparatus 3, such a return packet which has reached the communication processing apparatus 2 after the port keeping time of the history port had elapsed is not transmitted from the communication processing apparatus 2 to the information processing apparatus 1. It should also be noted that the return packet receiving unit 14 may alternatively contain a reception device (for example, modem, network card, etc.) which is employed so as to perform a reception. If such a reception device is not contained, then the reception device (not shown) is present between the return packet receiving unit 14 and the communication processing apparatus 2. Also, the return packet receiving unit 14 may be alternatively realized by hardware, or may be realized by such a software as driver software for driving the reception device.

The port keeping time detecting unit 15 detects a port keeping time of the communication processing apparatus 2 based upon a reception of a return packet by the return packet receiving unit 14. In this case, the expression "based upon reception of return packet" implies a condition for indicating whether or not a return packet is received, or with employment of a time instant when the return packet is received. A concrete operation of the port keeping time detecting unit 15 will be described later. The port keeping time detecting unit 15 may alternatively detect a port keeping time not only based upon a reception of a return packet, but also based upon a transmission of a history packet. It should also be understood that the port keeping time detecting unit 15 may detect the port keeping time itself of the communication processing apparatus, or may also detect such a port keeping time which is shorter than the port keeping time of the communication processing apparatus 2. For instance, in the case that the port keeping time of the communication processing apparatus 2 is "2 minutes", the port keeping time detecting unit 15 may detect that the port keeping time of the communication processing apparatus 2 corresponds to "2 minutes", or may alternatively detect the port keeping time as "1 minute." The detecting process operations as to the port keeping time by the port keeping time detecting unit 15 will be described later. In the below-mentioned descriptions, "port keeping time" may also imply information indicative of a port keeping time detected by the port keeping time detecting unit 15.

It should also be noted that 2, or more pieces of arbitrary elements among the history packet transmitting unit 11, the request packet transmitting unit 12, and the return packet receiving unit 14 contain devices related to communications, these devices may be the same means, or may be alternatively different means from each other.

The communication processing apparatus 2 performs process operations related to communications between the information processing apparatus 1 and the server apparatus 2. The communication processing apparatus 2 according to this embodiment mode 1 has a NAT (Network Address Translation) function, and is referred to as, for example, a "router." The communication processing apparatus 2 according to the embodiment mode translates address information of a transmission source contained in a packet transmitted from the information process apparatus 1 into address information of the communication processing apparatus 2 on the WAN (Wide Area Network) side. The address information of the transmission source is, namely, address information of the information processing apparatus 1.

Concretely speaking, a source (transmission source) address (corresponding to private IP address, and is assumed as "address A"), and a source (transmission source) port number (assumed as "port number B"), which are contained in the packet transmitted from the information processing apparatus 1 are translated into a global IP address (assumed as "address X"), and a port number (assumed as "port number Y") of the communication processing apparatus 2 on the WAN side. Also, as to the packet transmitted to the address X and the port number Y of the communication processing apparatus 2 on the WAN side from the server apparatus 3, the address X and the port number Y of the transmission destination are translated to the address A and the port number B of the information processing apparatus 1, and then, the packet is transmitted to the information processing apparatus 1. In this case, a global IP address implies such an address that a certain information processing apparatus is communicated with an external apparatus, for example, an eternal apparatus connected to a WAN (Internet etc.). As a consequence, generally speaking, a global IP address corresponds to an address which is used in a WAN. Alternatively, in such a case that a certain electronic appliance is communicated with an apparatus which is connected to a LAN (for example, intranet etc.) via a router having an NAT function, the above-described global IP address may be such an address used in this LAN. This IP address may be, for instance, a presently available so-called "address of IPv4", or an address of other versions such as an address of an IPv6.

It should also be understood that in the communication processing apparatus 2, in the case where a reception filter rule has been set, a packet reception is carried out based upon this reception filter rule. In the reception filter rule, there are an Address Sensitive filter, a Port Sensitive filter, and a No filter. That is, assuming now that an address and a port number of a transmission destination of a packet are defined as an address P and a port number Q respectively, for example, in the case that such a packet whose address and port number as to the transmission destination are the address P and the port number Q is transmitted from the LAN side of the communication processing apparatus 2 to the WAN side thereof, the Address Sensitive filter receives no packet other than only a packet from the address P; the Port Sensitive filter receives no packet other than only a packet from the port number Q; and the No filter where a filter is not present receives packets from any addresses and any port numbers. In this case, an operation in which the communication processing apparatus 2 receives a packet implies the below-mentioned operation: That is, in a port of the communication processing apparatus 2 allocated to a packet transmitted from the information processing apparatus 1 on the LAN side, a packet transmitted from the WAN side is accepted to be address-translated, and then, the packet whose address has been translated is transmitted with respect to the information processing apparatus 1 on the LAN side.

As previously described also in the above-described conventional technique, a predetermined limitation is made in a time period during which this address translation is carried out by the address processing apparatus 2. In other words, the address translation between the address A; the port number B, and the address X; the port number Y is not carried out at such a time instant when the port keeping time of the communication processing apparatus 2 has elapsed after the address translation between both the addresses and the port numbers was finally carried out. As a consequence, even when a packet is transmitted via the communication line 100 with respect to the address X and the port number Y after the above-described port keeping time has elapsed, an address translation is not carried out in the communication processing apparatus 2, so that the information processing apparatus 1 cannot receive this transmitted packet.

The server apparatus 3 is equipped with a request packet receiving unit 31, a return packet transmitting unit 32, a history packet receiving unit 33, and a transmission information storage unit 34.

The request packet receiving unit 31 receives a request packet transmitted from the information processing apparatus 1. It should also be noted that the request packet receiving unit 31 may alternatively contain a reception device (for example, modem, network card, etc.) which is employed so as to perform a reception. If such a reception device is not contained, then the reception device (not shown) is present between the request packet receiving unit 31 and the communication line 100. Also, the request packet receiving unit 31 may be alternatively realized by hardware, or may be realized by such a software as driver software for driving the reception device.

When the request packet receiving unit 31 receives a request packet, the return packet transmitting unit 32 transmits a return packet to the history port of the communication processing apparatus 2. The return packet transmitting unit 32 transmits the return packet based upon transmission destination information (will be described later) which has been stored by the transmission destination information storage unit 34. In other words, the return transmitting unit 32 transmits the return packet to an address and a port number, which are indicated by the transmission destination information. This return packet is, for instance, a packet of a UDP. Certain information may be included in a payload of this request packet. It should also be noted that the request packet transmitting unit 32 may alternatively contain a transmission device (for example, modem, network card, and so on) which is employed so as to perform a transmission. If such a transmission device is not contained, then the transmission device (not shown) is present between the return packet transmitting unit 32 and the communication line 100. Also, the return packet transmitting unit 32 may be alternatively realized by hardware, or may be realized by such a software as driver software for driving the transmission device.

The history packet receiving unit 33 receives a history packet transmitted from the information processing apparatus 1. It should also be noted that the history packet receiving unit 33 may alternatively contain a reception device (for example, modem, network card, etc.) which is employed so as to perform a reception. If such a reception device is not contained, then the reception device (not shown) is present between the history packet receiving unit 33 and the communication line 100. Also, the history packet receiving unit 33 may be alternatively realized by hardware, or may be realized by such a software as driver software for driving the reception device.

The transmission destination information storage unit 34 stores transmission destination information in a predetermined recording medium based upon the history packet received by the history packet receiving unit 33. In this case, transmission destination information implies such an information related to a transmission destination of a return packet. Concretely speaking, the transmission destination information storage unit 34 reads a transmission source address and a transmission source port number, which are contained in a header of the history packet received by the history packet receiving unit 33, and then, stores the transmission destination information containing both the transmission source address and the transmission source port number. The transmission source address of the history packet corresponds to an address of the communication processing apparatus 2 on the side of the communication line 100, and the transmission source port number of the history packet corresponds to such a port number indicative of a port of the communication processing apparatus 2 on the side of the communication line 100, namely a port number representative of a position of the history port. The predetermined recording medium into which the transmission destination is stored is, for example, a semiconductor device, an optical disk, a magnetic disk, and so on. This predetermined recording medium may be contained by the transmission destination information storage unit 34, or may be alternatively provided outside the transmission destination information storage unit 34.

It should also be noted that 2, or more pieces of arbitrary elements among the history packet receiving unit 33, the request packet receiving unit 31, and the return packet transmitting unit 32 contain devices related to communications, these devices may be the same means, or may be alternatively different means from each other.

Figure 2:
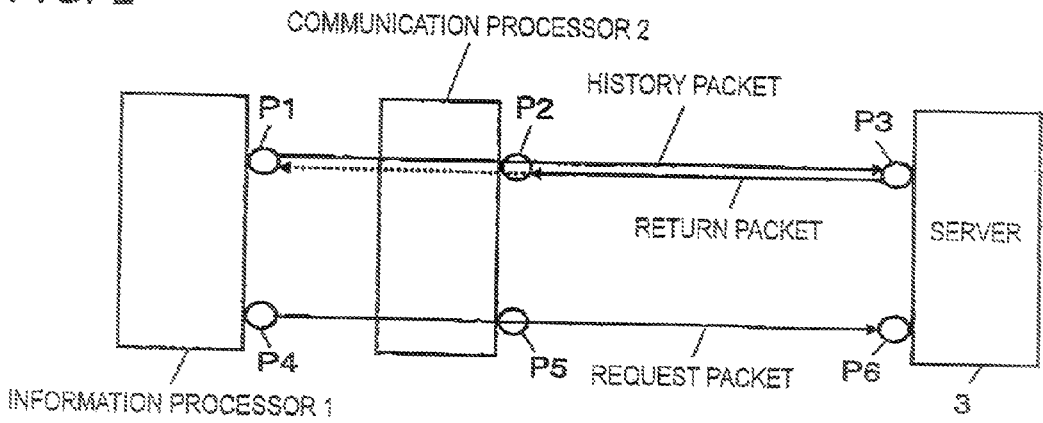
FIG. 2 is a diagram for explaining transmissions/receptions of packets executed in the information processing system of the embodiment mode 1.

Next, a concrete description is made of ports through which a history packet, a request packet, and a return packet pass. As indicated in FIG. 2, a history packet to be transmitted from the information processing apparatus 1 is transmitted from a port "P1." Then, this history packet passes through a port "P2" of the communication processing apparatus 2 on the side of the communication line 100, and is received by a port "P3" of the server apparatus 3. The port P2 corresponds to the history port.

In this case, the port P2 of the communication processing apparatus 2, through which the history packet passes, is such a port which is newly allocated in the communication processing apparatus 2 when a history packet in a first time passes through this port P2. In other words, it is important to transmit a history packet by employing such a port of the communication processing apparatus 2, which is not employed in a communication between another information processing apparatus and the server apparatus. This reason is given as follows: That is, for example, while the port P2 has been so far employed in other usage, in the case that another communication is carried out via the port P2 from the transmission of the history packet until the transmission of the return packet, a port keeping time cannot be correctly detected. In order that the port P2 becomes such a port which is newly allocated in the communication processing apparatus 2 when the history packet in the first time passes through, for example, a new port, namely such a port which has not yet been employed in other communications may be employed as the port P1 of the information processing apparatus 1.

Thereafter, a request packet is transmitted from the port P4 of the information processing apparatus 1. This request packet is transmitted via a port "P5" of the communication processing apparatus 2 on the side of the communication line 100 to a port "P6" of the server apparatus 3. In this case, the port P2 must be necessarily different from the port P5. This reason is given: For example, in such a case that the request packet is transmitted via the port P2 from the transmission of the history packet until the transmission of the return packet, the port keeping time cannot be correctly detected. In order to make the port P2 different from the port P5, for instance, both the port P1 and the port P4 of the information processing apparatus 1 may be made different from each other. Alternatively, depending upon a sort of port allocation rule of the communication processing apparatus 2, even when the port P1 and the port P4 are the same ports, there are some cases that the port P3 may be merely made different from the port P6. On the other hand, when the port P1 is different from the port P4, even if the port P3 and the port P6 are the same ports, then both the port P2 and the port P5 become different ports.

A return packet is transmitted from the port P3 at which the history packet has been received. In such a case that the port keeping time has not yet elapsed, this transmitted return packet passes through the port P2 of the communication processing apparatus 2, and then, is received at the port P1 of the information processing apparatus 1. On the other hand, in the case that the port keeping time has elapsed, the return packet is not transmitted from the communication processing apparatus 2 to the information processing apparatus 1. As apparent from FIG. 2, in the information processing system according to the embodiment mode 1, both the history packet and the return packet pass through one port "P2" of the communication processing apparatus 2. It should also be noted that when the history packet has been transmitted from the port P1 to the port P3 after the port keeping time related to the port P2 has elapsed, there are some possibilities that a new port (for example, port "P7" different from this port "P2") may be allocated in the communication processing apparatus 2. Otherwise, the port P2 may be again employed. This allocation depends upon the specification of the communication processing apparatus 2. However, even in any of the above-described cases, there is no large difference in the processing operations themselves (namely, port P2 is merely replaced by port P7). Accordingly, for the sake of convenient explanations, the below-mentioned explanation is made based upon such an assumption that the port P2 is allocated with respect to a history packet transmitted from the port P1 of the information processing apparatus 1 after the port keeping time has elapsed.

The above description has been made of such a case that the return packet is transmitted from the port P3 at which the history packet has received. Alternatively, the return packet may not be transmitted from the port P3, depending upon a reception filter rule of the communication processing apparatus 2.

Also, the above description has been made of such a case that the history packet is transmitted to the server apparatus 3. Alternatively, the history packet may be transmitted not to the server apparatus 3, but to another server apparatus, depending upon the sort of the communication processing apparatus 2. In the alternative case, information related to a position of a history port may be alternatively transferred to the server apparatus 3 from the server apparatus which has received this history packet.

Next, a description is made of detecting process operations as to a port keeping time. Firstly, a "wait time" is defined as follows: That is, a "wait time" is defined as a time duration from a time instant when a return packet has reached the communication processing apparatus 2 until a time instant when a packet had passed through a history port immediately before the first-mentioned time instant. In this case, as to process operations performed in the communication processing apparatus 2 after the return packet has reached the communication processing apparatus 2, there are two cases: in one process operation, this return packet is address-translated by the communication processing apparatus 2, and then, the address-translated return packet is transmitted to the information processing apparatus 1; and in the other process operation, the port keeping time in the communication processing apparatus 2 has elapsed, so that the return packet is not address-translated in the communication processing apparatus 2. Also, the above-described wait time is mainly divided into two patterns 1 and 2. That is, the pattern 1 corresponds to such a case that a history packet passes through a history port in a beginning stage of the wait time, whereas the pattern 2 corresponds to such a case that a return packet passes through the history port in the beginning stage of the wait time. In this case, the beginning stage of the wait time implies a starting time instant of the wait time.

Figure 3A:
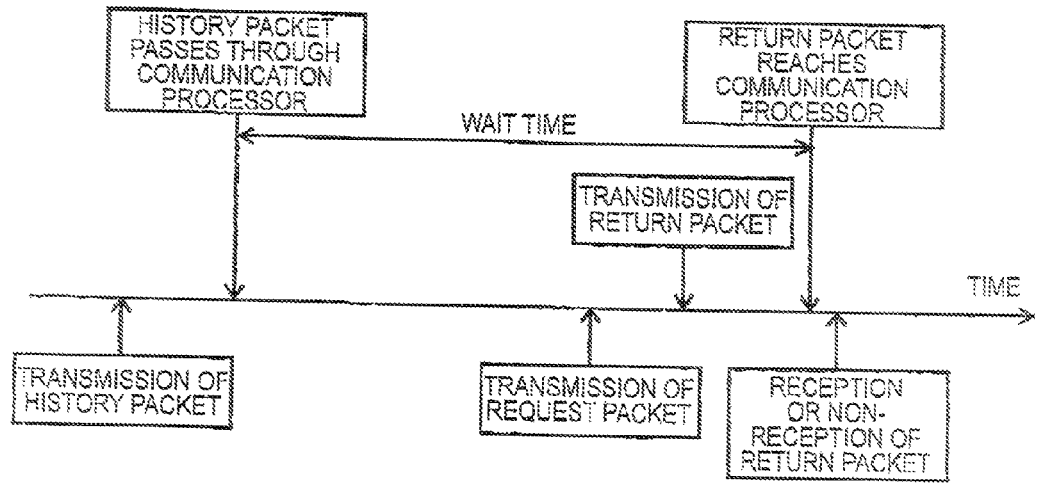
FIG. 3A is a diagram for explaining a wait time in the embodiment mode 1.

A first description is made of the pattern 1. FIG. 3A is a diagram for explaining the pattern 1. When a history packet is transmitted from the information processing apparatus 1, the transmitted history pattern passes through the history port of the communication processing apparatus 2. After a short time, if a request packet is transmitted from the information processing apparatus 1, then the request packet is received by the server apparatus 3, and a return packet is transmitted from the server apparatus 3 to the history port of the communication apparatus 2. This return packet reaches the history port of the communication processing apparatus 2, and if the port keeping time has not yet elapsed, then the reached return packet is transmitted to the information processing apparatus 1, whereas if the port maintaining time has already elapsed, then this reached return packet is not transmitted to the information processing apparatus 1. In this case, such a time period after the history packet has passed through the communication processing apparatus 2 until the return packet reaches the communication processing apparatus 2 constitutes a wait time.

Figure 3B:
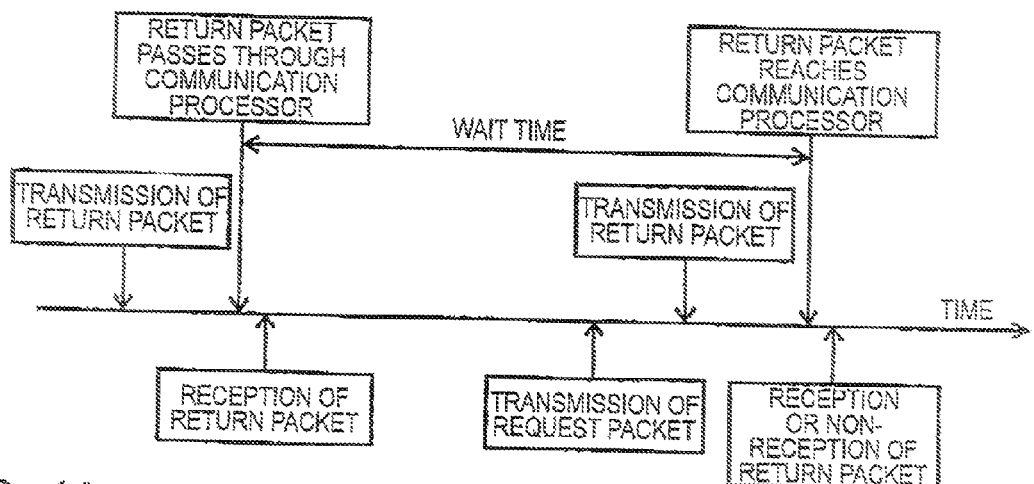
FIG. 3B is a diagram for explaining a wait time in the embodiment mode 1.

Next, a description is made of the pattern 2. FIG. 3B is a diagram for explaining the pattern 2. In response to a request packet transmitted from the information processing apparatus 1, a return packet is transmitted from the server apparatus 3. Assuming now that the port keeping time related to the history port has not yet elapsed, the transmitted return packet passes through the history port of the communication processing apparatus 2, and then, is received by the information processing apparatus 1. Thereafter, such a process operation that a request packet is transmitted from the information processing apparatus 1 after a short time and a return packet is transmitted from the server apparatus 3 in response to this transmitted request packet is carried out in a similar manner to that of the pattern 1. In this case, such a time period after the return packet has passed through the communication processing apparatus 2 until the next return packet reaches the communication processing apparatus 2 constitutes a wait time. Now, in a beginning stage of the wait time of the pattern 2, it is required that not only the return packet reaches the communication processing apparatus 2, but also the return packet is transmitted from the communication processing apparatus 2 to the information processing apparatus 1.

In the case that the return packet reached the communication processing apparatus 2 in an end stage of the wait time could be received by the information processing apparatus 1, it may be understood that the port keeping time of the communication processing apparatus 2 is longer than this wait time. On the other hand, in such a case that the return packet reached the communication processing apparatus 2 in the end stage of the wait time could not be received by the information processing apparatus 1, it may be understood that the port keeping time of the communication processing apparatus 2 is shorter than this wait time. In this case, the end stage of the wait time implies a time instant of an end of the wait time. As previously described, since a wait time is measured and a check is made whether or not the return packet reached the communication processing apparatus 2 in the end stage of the wait time can be received by the information processing apparatus 1, the port keeping time of the communication processing apparatus 2 can be measured. As a consequence, the port keeping time detecting unit 15 detects a port keeping time based upon such a wait time when the return packet reached the communication processing apparatus 2 in the end stage of the wait time could be received by the return packet receiving unit 14 among one, or more pieces of wait times. For example, alternatively, the port keeping time detecting unit 15 may detect the port keeping time based upon such a wait time when the return packet reached the communication processing apparatus 2 in the end stage of the wait time could be received by the return packet receiving unit 14 among one, or more pieces of wait times, and furthermore, the longest wait time. In this case, such an operation that "the port keeping time is detected based upon such a wait time when the return packet reached the communication processing apparatus 2 in the end stage of the wait time could be received by the return packet receiving unit 14" implies the following detecting operations: That is, this wait time may be detected as the port keeping time, or such a time different from this wait time may be detected as the port keeping time. As the latter case, there are some cases that a wait time obtained by subtracting a predetermined time (for example, approximately 2, or 3 seconds from the above-described wait time may be detected as the port wait time. It should be understood that the port keeping time detecting unit 15 may alternatively detect the port keeping time based upon such a wait time which is not the longest wait time among the wait times when the return packets reached the communication processing apparatus 2 in the end stages of the wait times can be received by the return packet receiving unit 14. Any of the following detecting methods may be employed. That is, for instance, the port keeping time detecting unit 15 may alternatively detect the port keeping time based upon such a wait time which is the second longest wait time among the wait times when the return packets reached the communication processing apparatus 2 in the end stages of the wait times could be received by the return packet receiving unit 14. Also, the port keeping time detecting unit 15 may alternatively detect the port keeping time based upon any one wait time among one, or more pieces of the wait times when the return packet reached the communication processing apparatus 2 in the end stages of the wait times could be received by the return packet receiving unit 14.

Next, a description is made of a beginning stage of a wait time. As indicated in FIG. 3A and FIG. 3B, as to packets which pass through a history port in the beginning stage of the wait time, there are a history packet and a return packet. As a consequence, the below-mentioned three patterns will now be considered: That is, when a wait time is measured, such a pattern (this is assumed as "pattern A") is present that packets which every time pass through the history port in the beginning stage of the wait time correspond to history packets; another pattern (this is assumed as "pattern B") is present in which when a return packet could be received by the information processing apparatus 1, this return packet is assumed as such a packet which passes through the history port in the beginning stage of the wait time, whereas when a return packet could not be received by the information processing apparatus 1, a new history packet is transmitted and this new history packet is assumed as such a packet which passes through the history port in the beginning stage of the wait time; and also, such a pattern (this is assumed as "pattern C") is present that packets which every time pass through the history port in the beginning stage of the wait time correspond to return packets. It should also be understood that the present invention may be applied to any other patterns than these patterns A, B, C, and is not limited only to these three patterns A, B, C.

[Pattern A]

Figure 4A:
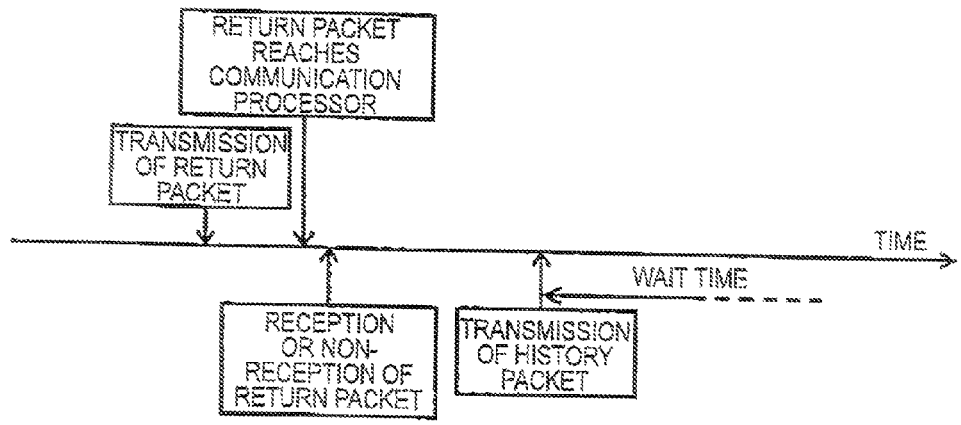
FIG. 4A is a diagram for describing a starting period of the wait time in the embodiment mode 1.

FIG. 4A is a diagram for explaining the pattern A. As shown in FIG. 4A, in the pattern A, the information processing apparatus 1 transmits a history packet in the beginning stage of the wait time irrespective of such a fact for indicating whether or not a return packet could be received by the information processing apparatus 1. As a consequence, such a packet which passes through the history port in a beginning stage of a wait time corresponds to a history packet. It should be noted that even in the case of a wait time in a first time, it is only natural that the history packet is transmitted in the beginning stage of this first wait time. Also, the packet transmission control unit 13 controls a transmission of a request packet, and further, controls the transmission of the history packet by the history packet transmitting unit 11 in the beginning stage of the waiting time. In other words, the packet transmission control unit 13 controls the history packet transmitting unit 11 in such a manner that the history packet is transmitted in the beginning stage of the wait time.

Also, in the pattern A, the port keeping time detecting unit 15 detects a port keeping time of the communication processing apparatus 2 based upon a reception of a return packet by the return packet receiving unit 14, and a transmission of a history packet by the history packet transmitting unit 11. Precisely speaking, as indicated in FIG. 3A, the beginning stage of the wait time becomes such a time instant when the history packet passes through the communication processing apparatus 2. However, the information processing apparatus 1 can hardly grasp the time instant when the history packet passes through the communication processing apparatus 2. As a consequence, as indicated in FIG. 4A, in the port keeping time detecting unit 15, the time instant when the history packet passes through the communication processing apparatus 2 in the beginning stage of the wait time is defined as a transmission time instant of the history packet. It should also be noted that although FIG. 4A is the diagram which assumes such a case that 2, or more pieces of the request packets are transmitted, only 1 piece of request packet may be alternatively transmitted by the information processing apparatus 1.

[Pattern B]

Figure 4B:
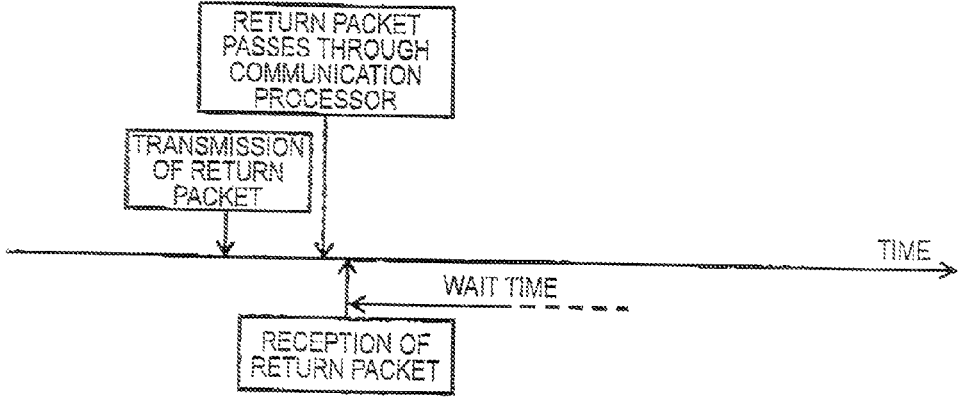
FIG. 4B is a diagram for describing a starting period of the wait time in the embodiment mode 1.
Figure 4C:
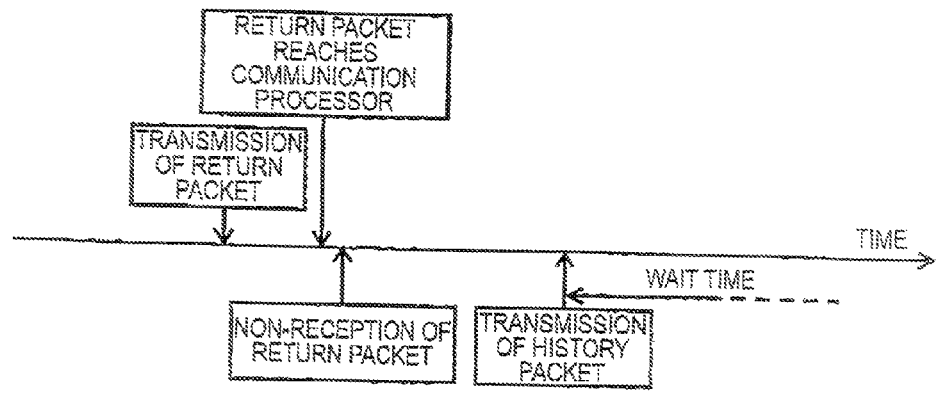
FIG. 4C is a diagram for describing a starting period of the wait time in the embodiment mode 1.

FIG. 4B and FIG. 4C are diagrams for explaining the pattern B. In the pattern B, a packet which passes through a history port in a beginning stage of a wait time corresponds to either a history packet or a return packet. In the case that the return packet could be received by the information processing apparatus 1, as indicated in FIG. 4B, the information processing apparatus 1 does not transmit the history packet in the beginning stage of the wait time, but the return packet thereof constitutes such a packet which passes through the history port in the beginning stage of the wait time. On the other hand, in the case that the return packet cannot be received by the information processing apparatus 1, as indicated in FIG. 4C, the information processing apparatus 1 transmits the history packet in the beginning stage of the wait time, but the return packet thereof constitutes such a packet which passes through the history port in the beginning stage of the wait time. It is so assumed that in the case of a wait time of a first time, the history packet is transmitted in the beginning stage of this wait time. Also, the packet transmission control unit 13 controls a transmission of a request packet, and further, controls the history packet transmitting unit 11 in such a manner that a history packet is transmitted in a beginning stage of a next wait time when a return packet responding to the request packet could not be received by the return packet receiving unit 14.

Also, in the pattern B, the port keeping time detecting unit 15 detects a port keeping time of the communication processing apparatus 2 based upon a reception of a return packet by the return packet receiving unit 14, and a transmission of a history packet by the history packet transmitting unit 11. Precisely speaking, as indicated in FIG. 3A and FIG. 3B, the beginning stage of the wait time becomes such a time instant when either the history packet or the return packet passes through the communication processing apparatus 2. However, the information processing apparatus 1 can hardly grasp the time instant when either the history packet or the return packet passes through the communication processing apparatus 2. As a consequence, as indicated in FIG. 4B and FIG. 4C, in the port keeping time detecting unit 15, in such a case that a packet which passes through the history port in the beginning stage of the wait time corresponds to the history packet, such a time instant equal to the beginning stage of the wait time when the packet passes through the history port is assumed as a transmission time instant of the history packet, whereas in such a case that a packet which passes through the history port in the beginning stage of the wait time corresponds to the return packet, such a time instant equal to the beginning stage of the wait time when the packet passes through the history port is assumed as a reception time instant of the return packet.

[Pattern C]

Referring now to FIG. 4B, the pattern C will be described. In the pattern C, a packet which passes through the history port in the beginning stage of the wait time corresponds to the return packet. Also, the packet transmission control unit 13 controls a transmission of a request packet in such a way that every time the request packet is transmitted, a wait time is increased. In this pattern C, the return packet must pass through the history port in the beginning stage of the wait time. As a result, if the return packet cannot be received by the information processing apparatus 1, then the detecting process operation for the port keeping time is accomplished. It should be noted that precisely speaking, as indicated in FIG. 3B, the beginning stage of the wait time becomes such a time instant when the return packet passes through the communication processing apparatus 2. However, the information processing apparatus 1 can hardly grasp the time instant when the return packet passes through the communication processing apparatus 2. As a consequence, as indicated in FIG. 4B, in the port keeping time detecting unit 15, such a time instant equal to the beginning stage of the wait time when the packet passes through the history port is assumed as a transmission time instant of the return packet. It should also be understood that in the case of the pattern C, the following initial condition is established. That is, the information processing apparatus 1 transmits 2, or more pieces of the request packets.

Figure 5A:
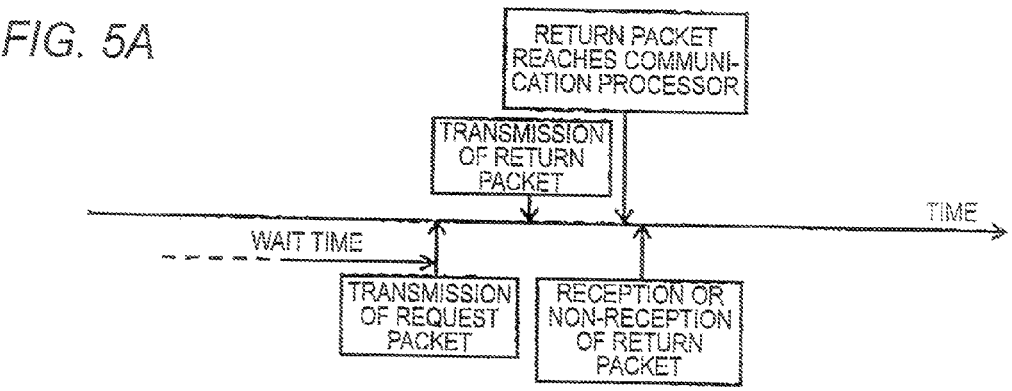
FIG. 5A is a diagram for explaining an end term of the wait time in the embodiment 1.
Figure 5B:
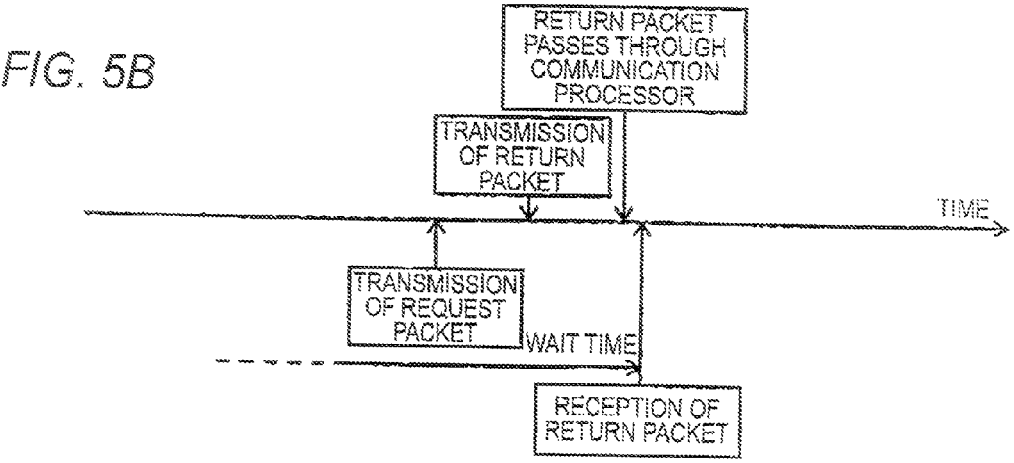
FIG. 5B is a diagram for explaining an end term of the wait time in the embodiment 1.
Figure 5C:
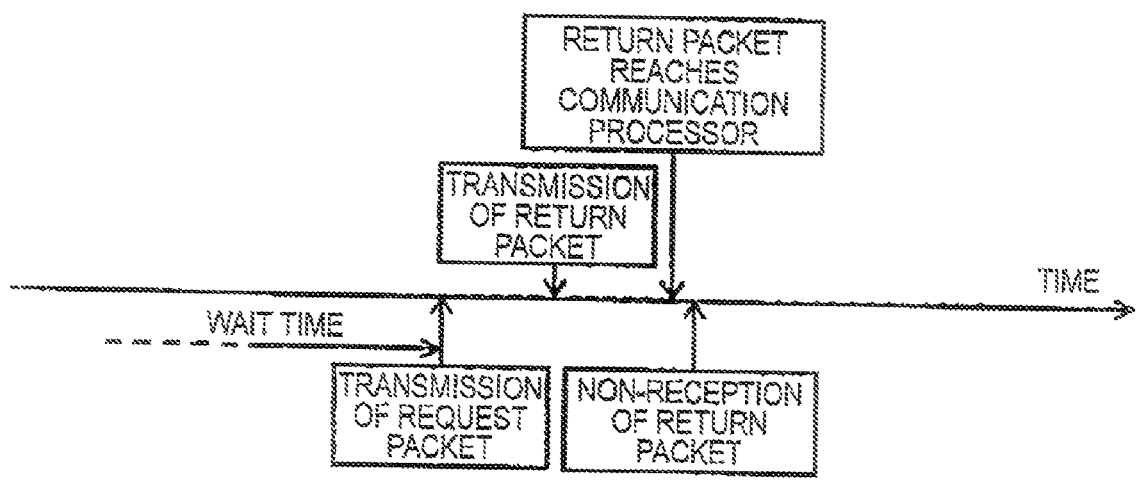
FIG. 5C is a diagram for explaining an end term of the wait time in the embodiment 1.

Next, a description is made of an end stage of a wait time. As shown in FIG. 3A and FIG. 3B, the end stage of the wait time corresponds to a time instant when a return packet reaches the communication processing apparatus 2. However, the information can hardly grasp such a time instant when the return packet has reached the communication processing apparatus 2. As a consequence, as indicated in FIG. 5A, when a measurement of a wait time is carried out, in the port keeping time detecting unit 15, the time instant equal to the end stage of the wait time when the return packet has reached the communication processing apparatus 2 may be alternatively assumed as a time instant when a request packet is transmitted, while the request packet requests the transmission of this return packet (this pattern is assumed as "pattern D"). Also, as indicated in FIG. 5B, when a measurement of a wait time is carried out, in the port keeping time detecting unit 15, the time instant equal to the end stage of the wait time when the return packet has reached the communication processing apparatus 2 may be alternatively assumed as a time instant when a return packet is received by the information processing apparatus 1 (this pattern is assumed as "pattern E"). Also, when a measurement of a wait time is carried out, in the port keeping time detecting unit 15, the time instant equal to the end stage of the wait time when the return packet has reached the communication processing apparatus 2 may be alternatively assumed as a time instant when this return packet is received, as shown in FIG. 5B, in such a case that the information processing apparatus 1 could receive the return pattern, whereas in such a case that the information processing apparatus 1 could not receive the return packet, as shown in FIG. 5C, the time instant equal to the end stage of the wait time when the return packet has reached the communication processing apparatus 2 may be alternatively assumed as a time instant when a request packet is transmitted, while the request packet requests the transmission of this return packet (this pattern is assumed as "pattern E"). It should also be understood that the present invention may be alternatively applied to any other patterns other than these 3 patterns, and is not limited only to these patterns. Also, the port keeping times are detected based upon the wait times when the return packets transmitted in the end stages thereof could be received. As a result, the port keeping time to be detected in the pattern E is made equal to the port keeping time to be detected in the pattern F.

Next, a description is made of a transmission control of a request packet by the packet transmission control unit 13. For instance, the packet transmission control unit 13 may control the transmission of the request packet in such a manner that every time the request packet is transmitted, a wait time is increased, or every time the request packet is transmitted, a wait time is decreased. Also, the packet transmission control unit 13 may alternatively control the transmission of the request packet in such a manner that every time the request packet is transmitted, a wait time is increased until a return packet responding to the request packet could not be received. In such a case that the return packet responding to the request packet could not be received, the packet transmission control unit 13 may alternatively control the transmission of the request packet in such a manner that it becomes such a wait time between a wait time when a return packet cannot be received and the longest wait time among wait times when return packets could be received. The wait time when the return packet could not received implies such a wait time when the return packet transmitted in the end stage thereof could not received. The wait time when the return packet could be received implies such a wait time when the return packet transmitted in the end stage thereof could be received. In this case, in such a case where the packet transmission control unit 13 controls the transmission of the request packet in such a manner that every time the request packet is transmitted, when the return packet responding to the transmitted request packet could not be received by the return packet receiving unit 14, the port keeping time detecting unit 15 may alternatively detect a port keeping time. Alternatively, when a return packet transmitted in an end stage of a predetermined wait time could be received by the information processing apparatus 1, the transmission of the request packet may be accomplished, and the port keeping time detecting unit 15 may detect this predetermined wait time as the port keeping time. The transmission control of the request packet by the packet transmission control unit 13 may be alternatively carried out based upon any algorithms other than the above-described algorithm. If the port keeping time of the communication processing apparatus 2 may be properly detected by certain algorithms, then the present invention is not limited to the sorts of these algorithms.

It should be understood that although the beginning stage of the wait time employed by the packet transmission control unit 13 is similar to the above-described beginning stage of the wait time employed by the port keeping time detecting unit 15, the end stage of the wait time employed by the packet transmission control unit 13 may be such a time instant when the request packet for requesting the transmission of the return packet is transmitted. In other words, in the packet transmission control unit 13, a time instant equal to the end stage of the wait time when a return packet reaches the communication processing apparatus 2 may be such a time instant when a request packet for requesting the transmission of this return packet is transmitted. This reason is given as follows: That is, at the stage when the packet transmission control unit 13 controls the transmission of the request packet, it is unclear that the return packet transmitted in response to this request packet can be received by the information processing apparatus 1, and also, it is not possible to grasp the time instant when this return packet is received. As previously explained, there are some cases that a wait time which is employed by the packet transmission control unit 13 is different from a wait time which is employed by the port keeping time detecting unit 15.

Next, operations of the information processing apparatus 1 according to the embodiment mode 1 will now be described with reference to flow charts. It should be understood that in this embodiment mode 1, the flow charts are different from each other in response to the patterns as to the beginning stages of the wait times. As a consequence, descriptions are made of the respective flow charts in accordance with the patterns A to C.

Figure 6:
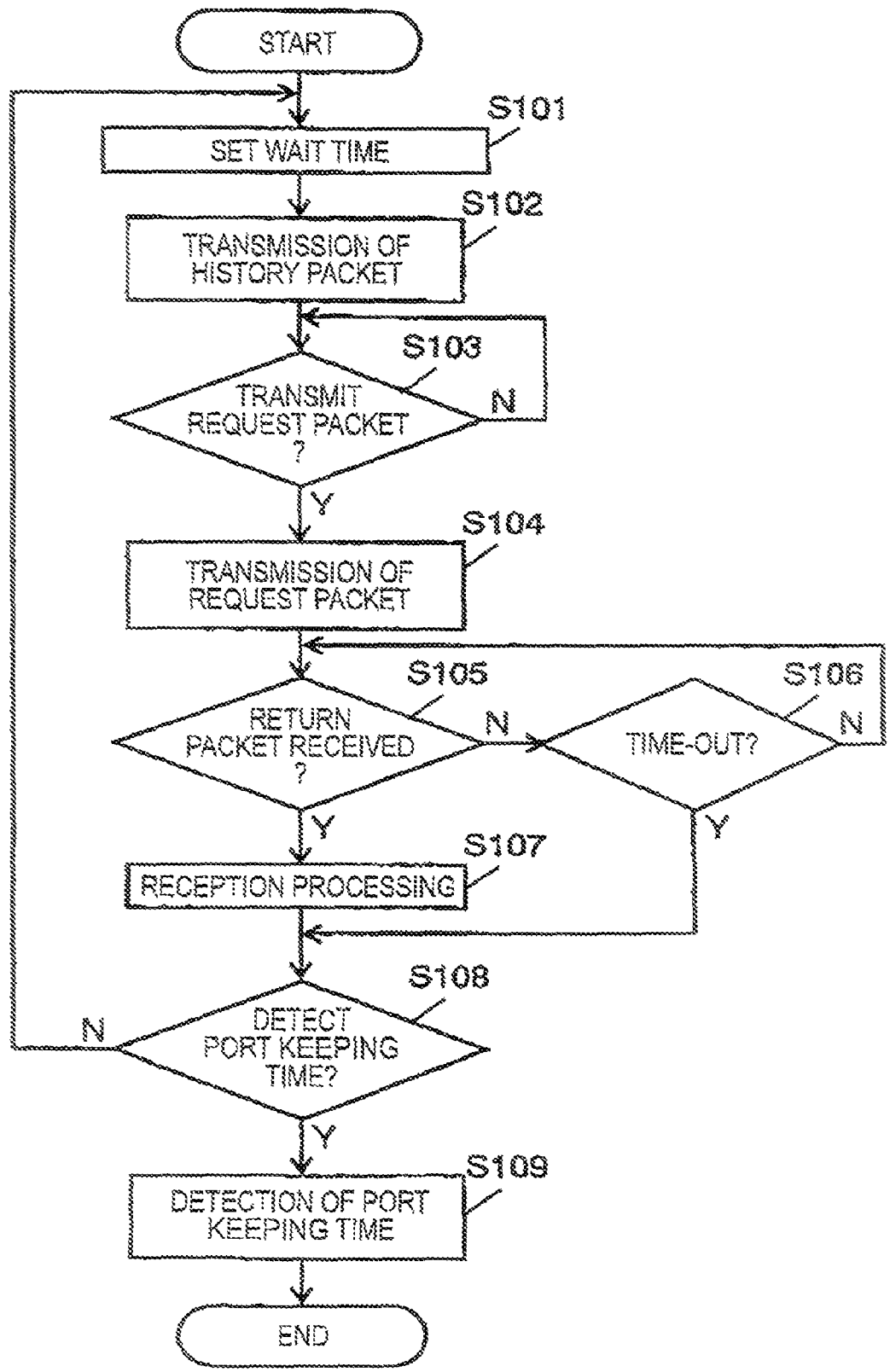
FIG. 6 is a flow chart for describing operations of an information processing apparatus according to the embodiment mode 1.

FIG. 6 is a flow chart for describing operations in the case of the pattern "A" of the information processing apparatus 1 according to this embodiment mode 1.

(step S101) The packet transmission control unit 13 sets a wait time corresponding to a time duration after a history packet has been transmitted until a request packet is transmitted. In this case, setting of the wait time implies the following operations: That is, for instance, the wait time may be recorded in a predetermined memory, and the like. Alternatively, while information indicative of a plurality of wait times has been previously stored in a predetermined recording medium, a flag may be set in correspondence with a predetermined wait time. Any other methods may be alternatively employed without any limitation.

(step S102) The packet transmission control unit 13 controls the history packet transmitting unit 11 in such a manner that a history packet is transmitted to the server apparatus 3. As a result, the history packet is transmitted from the history packet transmitting unit 11 via the communication processing apparatus 2 to the server apparatus 3. The history packet transmitting unit 11 transmits, for example, the history packet produced in the history packet transmitting unit 11.

(step S103) The packet transmission control unit 13 judges whether or not present timing is such a timing for transmitting a request packet. Then, when the present timing is the timing for transmitting the request packet, the process operation is advanced to a step S104. When the present timing is not the timing for transmitting the request packet, the packet transmission control unit 13 repeats the process operation of the step S103 until the present timing becomes such a timing for transmitting the request packet. In this case, the packet transmission control unit 13 judges whether or not the present timing is the timing for transmitting the request packet by checking whether or not the wait time set in the step S101 has elapsed after the history packet has been transmitted.

(step S104) The packet transmission control unit 13 controls the request packet transmitting unit 12 in such a manner that a request packet is transmitted to the server apparatus 3. As a result, the request packet is transmitted from the request packet transmitting unit 12 to the server apparatus 3. The request packet transmitting unit 12 transmits, for example, the request packet produced in the request packet transmitting unit 12.

(step S105) The return packet receiving unit 14 judges whether or not the return packet receiving unit 14 receives a return packet transmitted from the server apparatus 3 with respect to the request packet transmitted in the step S104. Then, when the return packet is received, the process operation is advanced to a step S107. When the return packet is not received, the process operation is advanced to a step S106.

(step S106) The return packet receiving unit 14 judges whether or not the present time becomes a time out. In this case, a time out implies such a fact that after the request packet transmitting unit 12 has transmitted the request packet, for example, a predetermined time period (for example, 10 seconds) has elapsed. When the present time is the time out, the process operation is advanced to a step S108, whereas when the present time is not the time out, the process operation is returned to the step S105.

(step S107) The port keeping time detecting unit 15 performs a predetermined receiving process operation based upon the received return packet. In this step, the predetermined receiving process operation implies the following process operation: That is, for example, while a time duration from a time instant when a history packet is transmitted up to a time instant when a return packet is received is defined as a wait time, the wait time is stored in a predetermined memory, or the like.

(step S108) The packet transmission control unit 13 judges whether or not a port keeping time is detected. When the port keeping time is detected, the process operation is advanced to a step S109, whereas when the port keeping time is not detected, the process operation is returned to the step S101.

(step S109) The port keeping time detecting unit 15 detects the port keeping time based upon the wait time during which the return packet could be detected. Then, a series of process operations for detecting the port keeping time of the communication processing apparatus 2 is accomplished.

It should also be noted that in the flow chart of FIG. 6, the sequence of the process operations defined in the step S101 and the step S102 may be alternatively reversed. In other words, after the history packet has been transmitted, the wait time may be alternatively set. As explained above, in this flow chart, the sequence of the process operations may be arbitrarily changed to some extent. This arbitrary sequence change may be similarly applied to the below-mentioned flow charts.

Also, the flow chart of FIG. 6 has described the following case. That is, the history packet which is transmitted in the first time, and the history packets which are transmitted in the second time and the succeeding times thereof are transmitted under control by the packet transmission control unit 13. Alternatively, the history packet which will be transmitted in the first time may be transmitted not by the control operation of the packet transmission control unit 13, but by the judging operation of the history packet transmitting unit 11.

Figure 7:
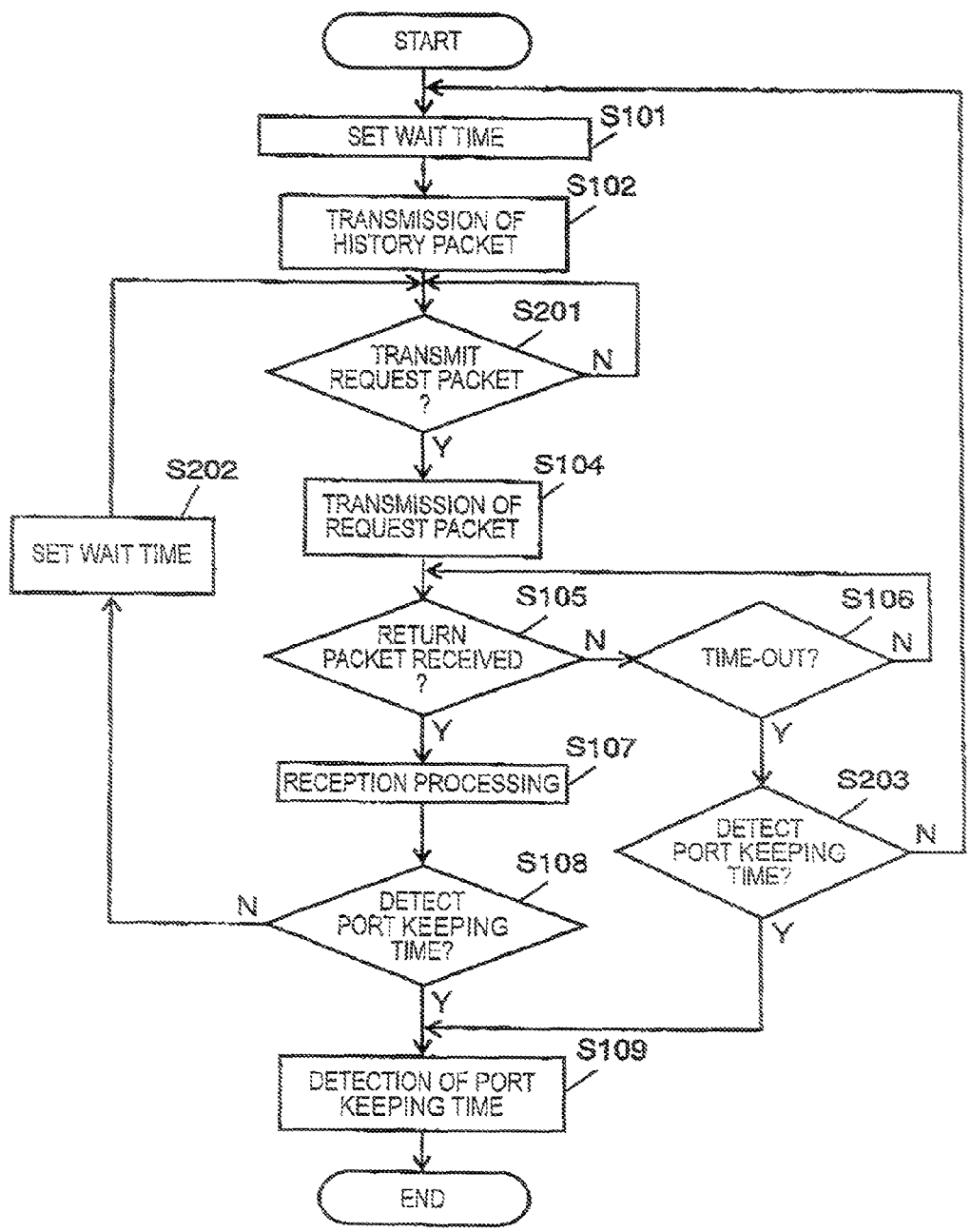
FIG. 7 is a flow chart for describing operations of the information processing apparatus according to the embodiment mode 1.

FIG. 7 is a flow chart for describing operations in the case of the pattern "B" of the information processing apparatus 1 according to the embodiment mode 1. It should be understood that process operations except for steps S201 to S203 are similar to those of the above-described flow chart shown in FIG. 6, and thus, descriptions thereof are omitted. It should also be noted that the predetermined receiving process operation of the step S107 may be alternatively carried out as follows: That is, for example, in such a case that a beginning stage of a wait time corresponds to a reception of a return packet, while a time duration from a time instant when a certain return packet is received until another time instant when a next return packet is received is defined as a wait time, this wait time may be alternatively stored in a predetermined memory, or the like.

(step S201) The packet transmission control unit 13 judges whether or not present timing becomes such a timing for transmitting a request packet. Then, when the present timing is the timing for transmitting the request packet, the process operation is advanced to a step S104. When the present timing is not the timing for transmitting the request packet, the packet transmission control unit 13 repeats the process operation of the step S201 until the present timing becomes such a timing for transmitting the request packet. In this case, the packet transmission control unit 13 judges whether or not the present timing is the timing for transmitting the request packet by checking whether or not the wait time set in the step S101 has elapsed after the history packet had been transmitted in a step S102 in such a case that the process operation is advanced from the step S102 to the step S201, or by checking whether or not the wait time set in the step S202 has elapsed after the return packet had been received in a step S105 in such a case that the process operation is advanced from the step S202 to the step S201.

(step S202) The packet transmission control unit 13 sets such a wait time corresponding to a time duration after the return packet has been received until the request packet is transmitted. In this case, the process operation for setting the wait time is similar to that of the step S101, and thus, explanations thereof are omitted.

(step S203) The packet transmission control unit 13 judges whether or not a port keeping time is detected. When the port keeping time is detected, the process operation is advanced to a step S109, whereas when the port keeping time is not detected, the process operation is returned to the step S101.

Figure 8:
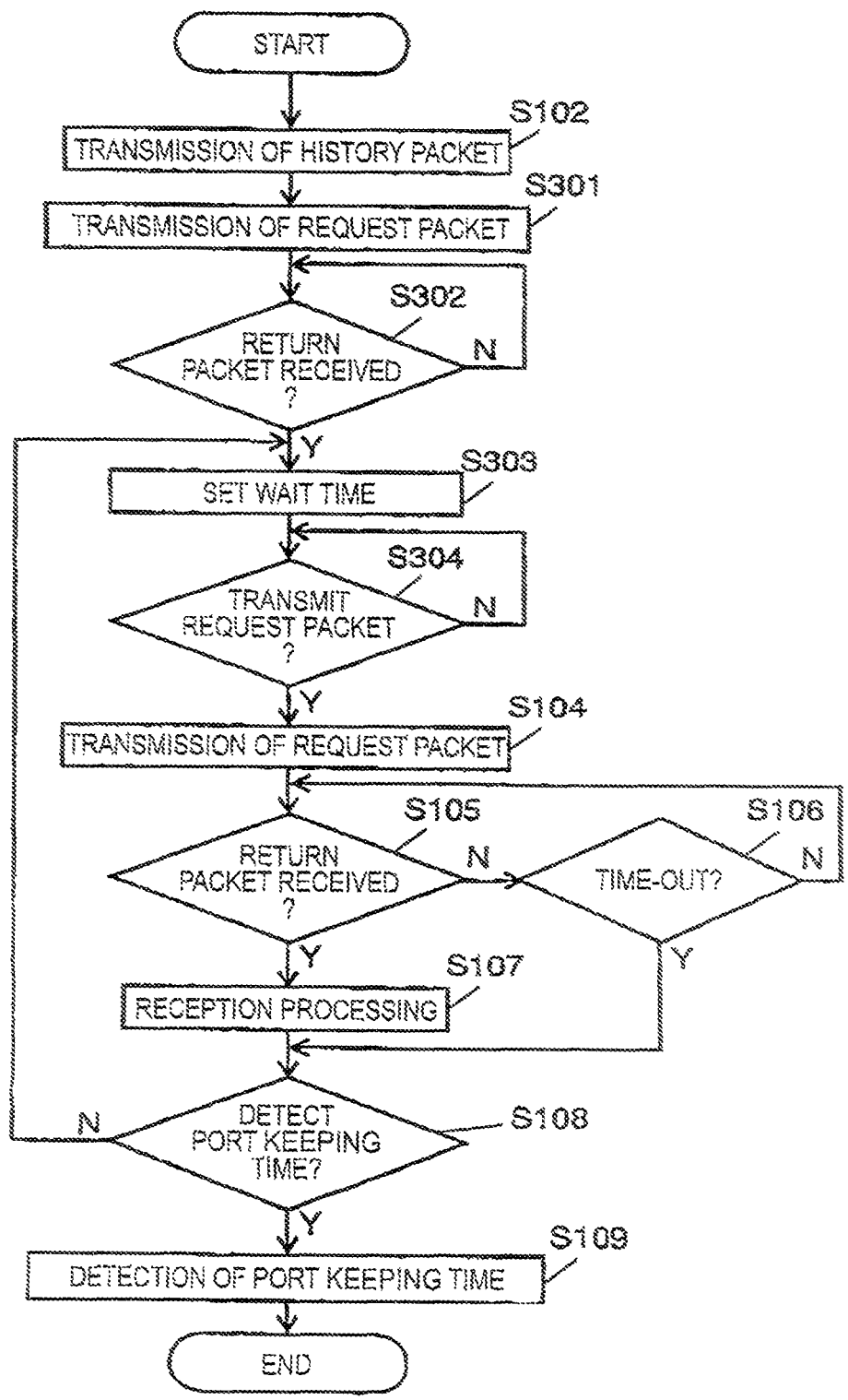
FIG. 8 is a flow chart for describing operations of the information processing apparatus according to the embodiment mode 1.

FIG. 8 is a flow chart for describing operations in the case of the pattern "C" of the information processing apparatus 1 according to the embodiment mode 1. It should be understood that process operations except for steps S301 to S304 are similar to those of the above-described flow chart shown in FIG. 6, and thus, descriptions thereof are omitted. It should also be noted that the predetermined receiving process operation of the step S107 may be alternatively carried out as follows: That is, for example, while a time duration from a time instant when a certain return packet is received until another time instant when a next return packet is received is defined as a wait time, this wait time may be alternatively stored in a predetermined memory, or the like.

(step S301) The packet transmission control unit 13 controls the request packet transmitting unit 12 in such a manner that a request packet is transmitted to the server apparatus 3. As a result, the request packet is transmitted from the request packet transmitting unit 12 to the server apparatus 3.

(step S302) The return packet receiving unit 14 judges whether or not the return packet receiving unit 14 receives the return packet transmitted from the server apparatus 3 with respect to the request packet transmitted in the step S301. Then, when the return packet is received, the process operation is advanced to a step S303. When the return packet is not received, the process operation of the step S301 is repeatedly carried out until the return packet is received. In such a case that the return packet cannot be received due to such a reason when the server apparatus 3 is shut down, the return packet receiving unit 14 may judge that the present time becomes a time out after a predetermined time (for example, 1 minute) has elapsed since the request packet had been transmitted, and thus, may alternatively accomplish a series of the process operations.

(step S303) The packet transmission control unit 13 sets such a wait time corresponding to a time duration after the return packet has been received until the request packet is transmitted. In this case, the process operation for setting the wait time is similar to that of the step S101, and thus, explanations thereof are omitted.

(step S304) The packet transmission control unit 13 judges whether or not present timing becomes such a timing for transmitting a request packet. Then, when the present timing is the timing for transmitting the request packet, the process operation is advanced to a step S104. When the present timing is not the timing for transmitting the request packet, the packet transmission control unit 13 repeats the process operation of the step S304 until the present timing becomes such a timing for transmitting the request packet. In this case, the packet transmission control unit 13 judges whether or not the present timing is the timing for transmitting the request packet by checking whether or not the wait time set in the step S303 has elapsed after the history packet had been transmitted in either the step S302 or the step S105.

When it is so judged that the present time becomes the time out in the step S106 of the flow charts shown in FIG. 6 to FIG. 8, for example, the port keeping time detecting unit 15 and the like may alternatively perform a certain process operation in the case that the present time is the time out.

Next, operations of the server apparatus 3 according to the embodiment mode 1 will now be described with reference to a flow chart of FIG. 9.

(step S401) The history packet receiving unit 33 judges whether or not a history packet transmitted from the information processing apparatus 1 is received. Then, when the history packet receiving unit 33 receives the history packet, the process operation is advanced to a step S402, whereas when the history packet receiving unit 33 does not receive the history packet, the process operation is advanced to a step S403.

(step S402) The transmission destination information storage unit 34 reads out both a transmission source address and a transmission source port number from a header of the history packet received by the history packet receiving unit 33, and then, stores transmission destination information containing the read transmission source address and the read transmission source port number in a predetermined recording medium. Then, the process operation is returned to the step S401.

(step S403) The request packet receiving unit 31 judges whether or not a request packet is received. Then, when the request packet receiving unit 31 receives the request packet, the process operation is advanced to a step S404, whereas when the request packet receiving unit 31 does not receive the request packet, the process operation is returned to the step S401.

(step S404) The return packet transmitting unit 32 reads out the transmission destination information stored by the transmission destination storage unit 34.

(step S405) The return packet transmitting unit 32 transmits a return packet based upon the transmission destination information read out in the step S404. A transmission destination of this return destination packet corresponds to an address and a port number, which are indicated by the read transmission destination information. The return packet transmitting unit 32 transmits, for example, the return packet produced by the return packet transmitting unit 32. Then, the process operation is returned to the step S401.

Figure 9:
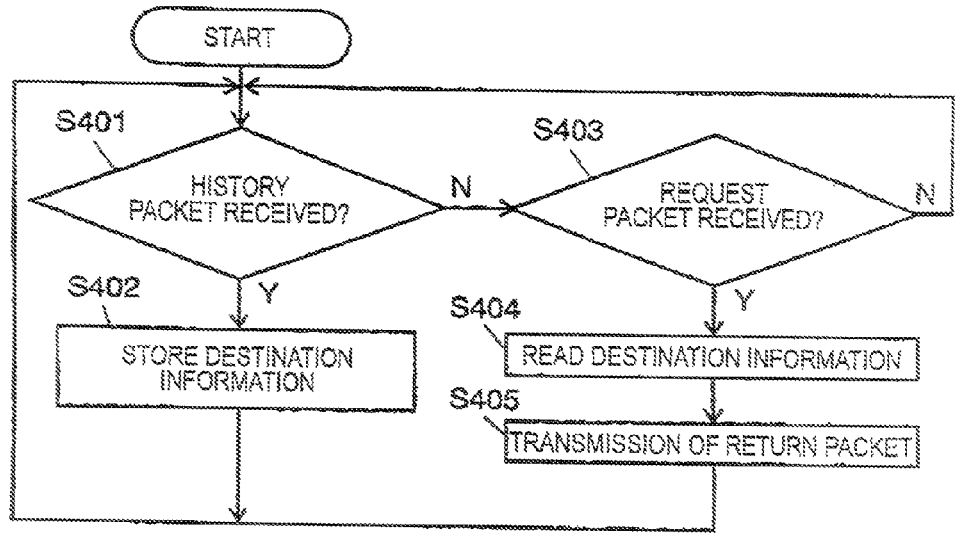
FIG. 9 is a flow chart for describing operations of a server apparatus according to the embodiment mode 1.

It should also be understood that in the flow chart of FIG. 9, the process operation is accomplished when the power supply is turned OFF, or when a process end interrupt is issued.

Next, a description is made of operations of the information processing system according to the embodiment mode 1 with employment of concrete examples. Each of these concrete examples will now be described as follows: That is, the information processing system is operated in the case that in the pattern A, a wait time is increased every time a request packet is transmitted so as to detect a port keeping time (concrete example 1); and in the pattern A, a wait time is increased every time a request packet is transmitted, and request packets are transmitted in a further precise manner between a wait time when a return packet could be received, and another wait time when a return packet could not be received so as to detect a port keeping time (concrete example 2). Also, the information processing system is operated in the case that in the pattern A, a wait time is decreased every time a request packet is transmitted so as to detect a port keeping time (concrete example 3); in the pattern B, a wait time is increased every time a request packet is transmitted, and request packets are transmitted in a further precise mariner between a wait time when a return packet could be received, and another wait time when a return packet could not be received so as to detect a port keeping time (concrete example 4); and in the pattern C, a wait time is increased every time a request packet is transmitted so as to detect a port keeping time (concrete example 5).

In the below-mentioned concrete examples, it is so assumed that the port keeping time of the communication processing apparatus 2 is "1 minute 18 seconds." Also, in such a case that even if 10 seconds have elapsed from a time instant when a request packet was transmitted, a return packet is not received, this condition is assumed as a time out. Also, IP addresses as to the information processing apparatus 1, the communication processing apparatus 2, and the server apparatus 3 are given as follows: It should be understood that the IP address of the communication processing apparatus 2 is an address on the side of the communication line 100.

Information processing apparatus 1: 192.168.0.1

Communication processing apparatus 2: 202.224.135.10

Server apparatus 3: 155.32.10.10

Figure 10A:
FIG. 10A is a diagram for representing an example as to a structure of a packet in the embodiment mode 1.
Figure 10B:
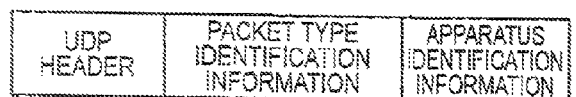
FIG. 10B is a diagram for representing an example as to a structure of a packet in the embodiment mode 1.
Figure 10C:
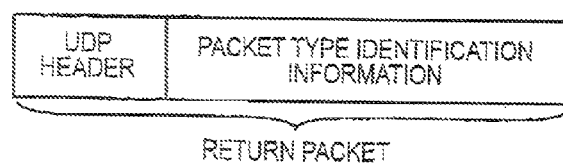
FIG. 10C is a diagram for representing an example as to a structure of a packet in the embodiment mode 1.

FIG. 10A to FIG. 10C are diagrams for indicating structures of a history packet, a request packet, and a return packet in the below-mentioned concrete examples. Each of the history packet, the request packet, and the return packet has a UDP header, while packet sort identification information has been contained in a payload thereof. The packet sort identification information is information for identifying a sort of a packet. Both the information processing apparatus 1 and the server apparatus 3 can identify whether a packet corresponds to a history packet, a request packet, or a return packet based upon packet sort identification information. Apparatus identification information is contained in payloads of the history packet and the request packet. This apparatus identification information corresponds to information for identifying such an information processing apparatus which transmits these packets. In accordance with apparatus identification information contained in a history packet, the transmission destination information storage unit 34 of the server apparatus 3 can store transmission destination information in correspondence with this apparatus identification information. Also, in accordance with apparatus identification information contained in a request packet, the transmission packet transmitting unit 32 of the server apparatus 3 can read out transmission destination information corresponding to the apparatus identification information contained in this request packet, and can transmit a return packet to a history port through which a history packet transmitted from the information processing apparatus which had transmitted this request packet has passed.

Concrete Example 1

This concrete example 1 describes operations in such a case where in the pattern A, the packet transmission control unit 13 controls a transmission of a request packet in such a manner that a wait time is increased every time the request packet is transmitted. Also, it is so assumed that when the return packet receiving unit 14 cannot receive a return packet responding to the transmitted request packet, the port keeping time detecting unit 15 detects a port keeping time. It is so assumed that the longmost port keeping time detected by the port keeping time detecting unit 15 is "5 minutes." In other words, even if a port keeping time of the communication processing apparatus 2 is longer than, or equal to 5 minutes, the information processing apparatus 1 detects the port keeping time of the communication processing apparatus 2 as 5 minutes. Also, as to an end stage of the wait time, it is so assumed as the pattern D.

FIG. 11 indicates wait time setting information which has been held by the packet transmission control unit 13 of the information processing apparatus 1. In this wait time setting information, wait times have been set in correspondence with flags. The wait time corresponding to the flag "1" is equal to such a wait time which has been set as timing for transmitting a request time. The packet transmission control unit 13 sets a wait time by changing the flag of this wait time setting information. Since the wait times only up to "5 minutes" may be set, but cannot be set longer than "5 minutes" in the wait time setting information of FIG. 11, in such a case that the information processing apparatus 1 can receive such a return packet responding to the request packet transmitted in the wait time of "5 minutes", it is so assumed that a port keeping time is detected without transmitting more pieces of request packets.

Firstly, the packet transmission control unit 13 sets "1" to the flag corresponding to the shortmost wait time of "30 seconds" in the wait time setting information shown in FIG. 11 (step S101). Thereafter, under control of the packet transmission control unit 13, the history packet transmitting unit 11 transmits a history packet having a structure shown in FIG. 10A to an IP address of "155.32.10.10" of the server apparatus 3 (step S102). In this case, it is so assumed that the apparatus identification information "AAA" has been contained in a payload of the history packet. It is also assumed that this history packet is transmitted via a port (will be referred to as "port 12345", and similarly other ports will be referred to as other port numbers) of a port number of "12345" of the communication processing apparatus 2 to the server apparatus 3. It should be understood that both the packet transmission control unit 13 and the port keeping time detecting unit 15 commence time measuring operations respectively by employing timers from time instants when the history packets are transmitted.

The history packet receiving unit 33 of the server apparatus 3 receives this history packet, and then, transfers the received history packet to the transmission destination information storage unit 34 (step S401). The transmission destination information storage unit 34 reads out the apparatus identification information of "AAA" from the payload of the transferred history packet, and also, reads out both the transmission source address of "202.224.135.10" and the transmission source port number of "12345" from the header of this history packet. Then, the transmission destination information storage unit 34 stores the transmission destination information containing the transmission source address and the transmission source port number in correspondence with the apparatus identification information of "AAA" (step S402). FIG. 12 is a diagram for showing a correspondence relationship between apparatus identification information and transmission destination information, which have been stored by the transmission destination storage apparatus 34. A first record of FIG. 12 is the apparatus identification information and the transmission destination information, which correspond to the information processing apparatus 1.

Thereafter, the packet transmission control unit 13 judges whether or not only the wait time of "30 seconds" corresponding to the flag "1" of the wait time setting information shown in FIG. 11 has elapsed after the time measuring operation had been commenced, and judges that the present timing is such a timing for transmitting a request packet at a time instant when the value of the timer indicates 30 seconds (step S103). Then, the packet transmission control unit 13 controls the request packet transmitting unit 12 in such a manner that a request packet is transmitted. As a result, the request packet having the structure shown in FIG. 10B is transmitted from the request packet transmitting unit 12 to the server apparatus 3 (step S104). The apparatus identification information contained in this request packet corresponds to "AAA." It should be noted that as previously explained, this request packet is transmitted from such a different part from the port of the information processing apparatus 1 from which the history packet was transmitted. In this case, it is so assumed that the request packet has been transmitted via a "port 12355" of the communication processing apparatus 2. Also, the port keeping time detecting unit 15 similarly stops the time measuring operation at the timing for transmitting the request, and holds the count value of "30 seconds" of the timer at this time instant as a wait time.

The above-described request packet is received by the request packet receiving unit 31 of the server apparatus 3, and then, is transferred to the return packet transmitting unit 32 (step S403). The return packet transmitting unit 32 reads out the apparatus identification information of "AAA" contained in the payload of the request packet, and also reads out the transmission destination information stored in correspondence with this read apparatus identification information, namely reads out the IP address of "202.224.235.10" and the port number of "12345" (step S404). Then, the return packet transmitting unit 32 transmits the return packet having the structure shown in FIG. 10C to both the read IP address and the read port number (step S405).

This return packet reaches the port 12345 of the communication processing apparatus 2, and since a port keeping time of "1 minute 18 seconds" related to this port 12345 has not yet elapsed, the address of the return packet is translated and the address-translated return packet is transmitted to the information processing apparatus 1.

The return packet receiving unit 14 of the information processing apparatus 1 receives the above-described return packet (step S105), and transfers such a message that this return packet could be received to the port keeping time detecting unit 15. Accordingly, the port keeping time detecting unit 15 holds such a message that the return packet related to the wait time of "30 seconds" could be received (step S107). Also, since the return packet has been received, the packet transmission control unit 13 judges that the transmission of the request packet is continued (step S108), sets "0" to the above-described flag corresponding to the wait time of "30 seconds" in the wait time setting information shown in FIG. 11, and also, sets "1" to a flag corresponding to a wait time of "1 minute" (step S101). Thereafter, a history packet is transmitted to the server apparatus 3 in a manner similar to the above-explained manner (step S102). Then, although transmission destination information is stored in the server apparatus 3, in this case, since the transmission destination information corresponding to the apparatus identification information of "AAA" has already been stored, it is so assumed that the already stored transmission destination information is overwritten by the first-described transmission destination information for the storage purpose. It should also be noted that since the port keeping time related to the history port has not yet elapsed, the transmission destination information which has been stored by the overwrite manner may be handled similar to the first record of FIG. 12.

At such a time instant when the wait time of "1 minute" has elapsed after the history packet had been transmitted, a request packet is transmitted (steps S103 and S104). In response to the transmission of this request packet, a return packet is transmitted from the server apparatus 3 to the communication processing apparatus 2 in a manner similar to the above-described manner (steps S403 to S405). Also, in this case, since the port keeping time of "1 minute 18 seconds" of the communication processing apparatus 2 has not yet elapsed, this return packet can be received by the return packet receiving unit 14 (step S105), and the port keeping time detecting unit 15 holds such a message that the return packet related to the wait time of "1 minute" could be received (step S107).

Thereafter, the wait time is set to "1 minute 30 seconds" (step S101), and a history packet is transmitted, and subsequently, a request packet is transmitted (steps S102 to S104). In response to the transmission of this request packet, a return packet is transmitted from the server apparatus 3 to the communication processing apparatus 2 in a manner similar to the above-described manner (steps S403 to S405). However, in this case, since the port keeping time of "1 minute 18 seconds" related to the history packet of the communication processing apparatus 2 has already elapsed, the return packet transmitted to the history port is not transmitted to the information processing apparatus 1. As a consequence, the return packet receiving unit 14 of the information processing apparatus 1 judges that the present time is a time out at a time instant when 10 seconds have passed after the request packet had been transmitted (step S106), and transfers such a message that the return packet could not be received to the port keeping time detecting unit 15. The port keeping time detecting unit 15 holds such a message that the return packet related to the wait time of "1 minute 30 seconds" could not be received.

Thereafter, since the return packet has not be received, the packet transmission control unit 13 judges that the present timing is such a timing for detecting a port keeping time (step S108), and transfers an instruction for performing the detection of the port keeping time to the port keeping time detecting unit 15. In response to this instruction, the port keeping time detecting unit 15 detects the longest wait time of "1 minute" within the wait times of "30 seconds" and "1 minute" during which the return packet could be received as the port keeping time of the communication processing apparatus 2 (step S109).

It should also be noted that thereafter, this detected port keeping time is employed in, for example, a process operation executed in a predetermined processing unit (not shown) of the information processing apparatus 1. The above-described process operation executed in the predetermined processing unit may be conceived as follows: That is, for instance, the detected port keeping time may be stored in a predetermined recording medium (not shown); while the detected port keeping time may be employed as a periodic transmission time period of packets, the packets may be transmitted to the server apparatus 3, and the like in a periodic manner; in such a case that an apparatus connected to the local network side of the communication processing apparatus 2 transmits a packet in a periodic manner, the detected port keeping time may be transmitted to this apparatus; otherwise, other process operations may be carried out. As previously described, the apparatus which employs the detected port keeping time may be realized by the information processing apparatus 1, or by another information processing apparatus, and the like, which are connected to the local network side of the communication processing apparatus 2. Also, a transmission destination of the packet which is transmitted in a periodic manner by employing this port keeping time may be the server apparatus 3, or other server apparatuses. Alternatively, a time which is shorter than the detected port keeping time may be employed as the transmission time period of the packet transmitted in the periodic manner.

Figure 13:
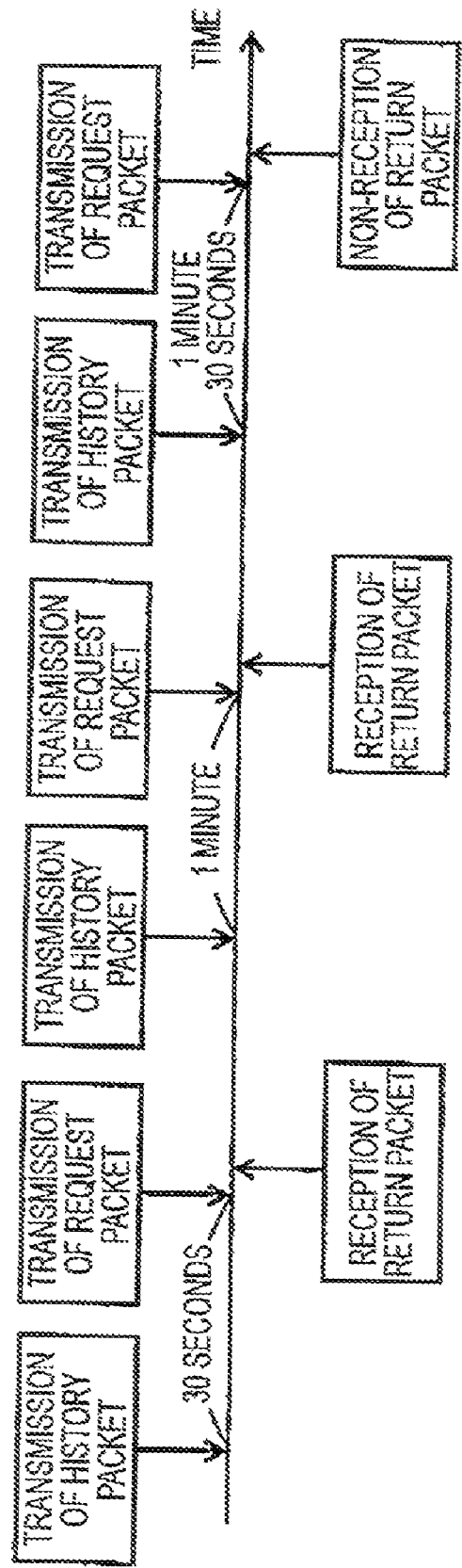
FIG. 13 is a diagram for describing transmissions and receptions of packets executed in the embodiment mode 1.

FIG. 13 is a diagram for explaining the transmissions of the history packets, the transmissions of the request packets, and the receptions of the return packets (or return packets are not received) in this concrete example 1. In this case, the return packets corresponding to the wait times of "30 seconds" and "1 minute" could be received, but the return packet corresponding to the wait time of "1 minute 30 seconds" could not be received, so that the port keeping time was detected as 1 minute.

The concrete example 1 has described such a case that when the server apparatus 3 receives the history packet, the transmission destination information corresponding to the apparatus identification information is stored in the overwriting manner. Alternatively, when there is no change in the transmission destination information, the storing operation of the transmission destination information by the overwriting manner may not be carried out.

Concrete Example 2

This concrete example 2 describes operations in such a case where in the pattern A, the packet transmission control unit 13 controls a transmission of a request packet in such a manner that a wait time is increased every time the request packet is transmitted until a return packet responding to the request packet cannot be received; and when the return packet responding to the request packet could not be received, the packet transmission control unit 13 controls a transmission of the return packet in such a manner that a wait time becomes such a wait time between a wait time when the return packet could not be received, and the longest wait time among wait times when return packets could be received. That is to say, in this concrete example 2, a wait time is divided into 2 stages, and the divided wait times are increased. Concretely speaking, in such a case that the transmission of the request packet is firstly carried out, and the return packet responding to the transmitted request packet could not be returned, the transmission of the request packet is controlled in such a manner that the wait time is increased every time 10 seconds elapse during a time duration between the wait time when the return packet could not be received and the longest wait time when the return packet could be received. Then, it is so assumed that when the return packet could not be received in a second time, the port keeping time detecting unit 15 detects a port keeping time. Also, as to an end stage of the wait time, it is so assumed as the pattern F.

Firstly, the packet transmission control unit 13 sets "1" to the flag corresponding to the shortest wait time of "30 seconds" in the wait time setting information shown in FIG. 11 (step S101). Thereafter, under control of the packet transmission control unit 13, the history packet transmitting unit 11 transmits a history packet having a structure shown in FIG. 10A to an IP address of "155.32.10.10" of the server apparatus 3 (step S102). In this case, it is so assumed that the apparatus identification information "AAA" has been contained in a payload of the history packet. It is also assumed that this history packet is transmitted via the port 12345 to the server apparatus 3. It should be understood that both the packet transmission control unit 13 and the port keeping time detecting unit 15 commence time measuring operations respectively by employing timers from time instants when the history packets are transmitted.

The history packet transmitted from the information processing apparatus 1 is received by the history packet receiving unit 33 of the server apparatus 3, and the transmission destination information is stored in a similar manner to that of the concrete example 1 (steps S401 and S402). It is also assumed that the transmission destination information of this case corresponds to that shown in FIG. 12.

Thereafter, the packet transmission control unit 13 judges whether or not only the wait time of "30 seconds" has elapsed after the time measuring operation had been commenced, and judges that the present timing is such a timing for transmitting a request packet at a time instant when the value of the timer indicates 30 seconds (step S103). As a result, the request packet containing the apparatus identification information of "AAA" is transmitted from the request packet transmitting unit 12 to the server apparatus 3 (step S104). It should also be understood that the port keeping time detecting unit 15 acquires a value of "30 seconds" of the timer at such a timing when the request packet is transmitted, and temporarily holds the acquired timer value. In this case, it is so assumed that the time measuring operation by the port keeping time detecting unit 15 is continuously carried out.

The request packet transmitted from the information processing apparatus 1 is received by the request packet receiving unit 31 of the server apparatus 3, and a return packet is transmitted from the server apparatus 3 in a similar manner to that of the concrete example 1 (steps S403 to S405). This return packet reaches the port 12345 of the communication processing apparatus 2, and since a port keeping time of "1 minute 18 seconds" related to this port 12345 has not yet elapsed, the address of the return packet is translated and the address-translated return packet is transmitted to the information processing apparatus 1.

The return packet receiving unit 14 of the information processing apparatus 1 receives the above-described return packet (step S105), and transfers such a message that this return packet could be received to both the packet transmission control unit 13 and the port keeping time detecting unit 15. Accordingly, the packet transmission control unit 13 holds the wait time of "30 seconds" as a wait time when the return packet could be received. Further, the port keeping time detecting unit 15 accomplishes the time measuring operation by the timer at this time instant, and holds a value of "31 seconds" of the timer at this time instant as a wait time when the return packet could be received. It should also be noted that the port keeping time detecting unit 15 discards the wait time of "30 seconds" which has been temporarily held at the transmission time instant of the request packet (step S107). In this concrete example 2, although the time duration from the transmitting time instant of the request packet until the receiving time instant of the return packet is equal to "1 second", this time is changed such as, for instance, 0.5 seconds, 2 seconds, and 3 seconds in response to conditions of the communication line 100, processing speeds of the server apparatus 3, and the like. However, also in the below-mentioned concrete examples, it is so assumed that the time duration from the transmitting time instant of the request packet until the reception time instant of the return packet is "1 second."

Figure 14:
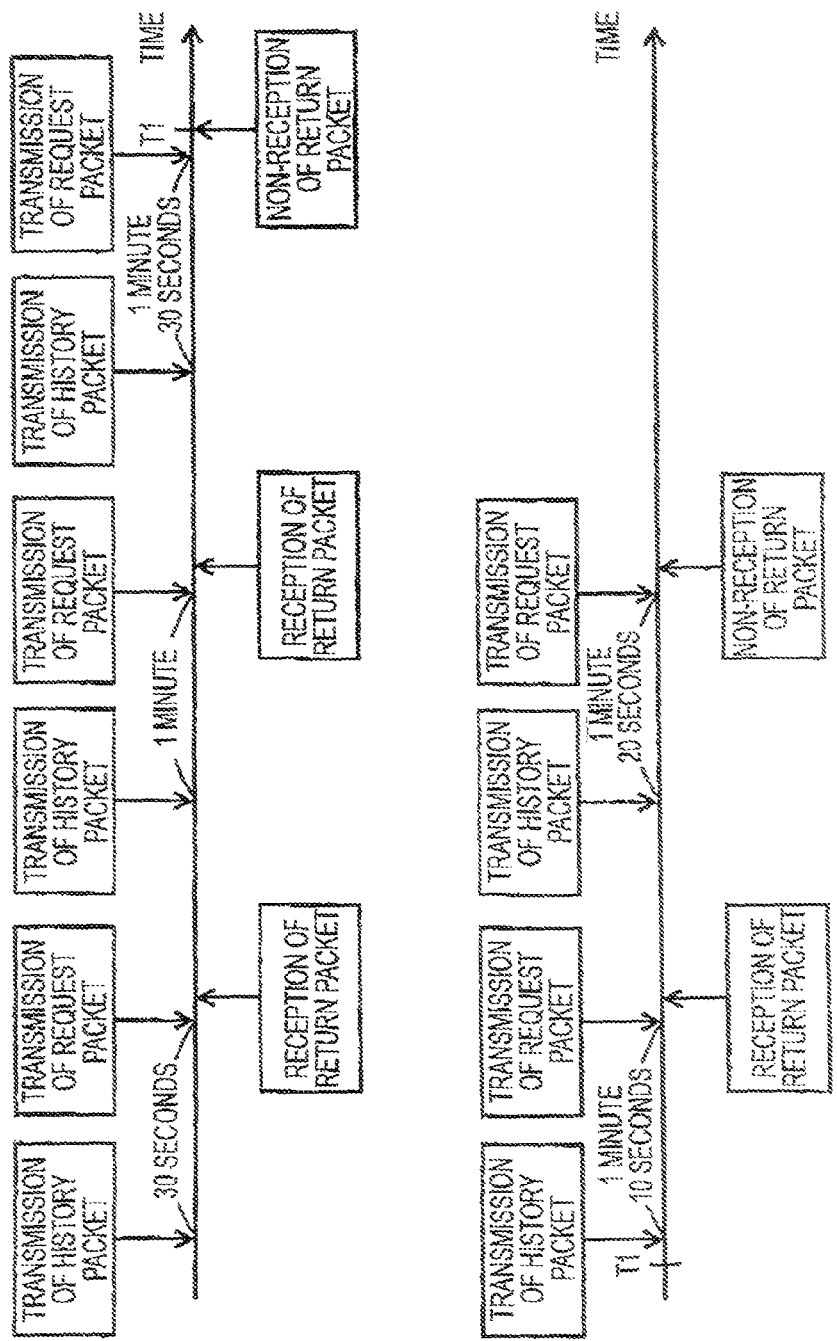
FIG. 14 is a diagram for describing transmissions and receptions of packets performed in the embodiment mode 1.

Thereafter, since the return packet has been received, the packet transmission control unit 13 judges that the transmission of the request packet is continued (step S108), and changes the wait time setting information in such a manner that only the above-described flag corresponding to the wait time of "1 minute" becomes "1" in the wait time setting information shown in FIG. 11 (step S101). Subsequently, similar to the concrete example 1, a history packet is transmitted (step S102). FIG. 14 is a diagram for explaining transmissions of history packets, transmissions of request packets, and receptions of return packets (or return packets are not received) in this concrete example 2. Similar to the concrete example 1, a return packet responding to the request packet transmitted for the wait time of 1 minute is also received by the information processing apparatus 1 (steps S103 to S105). Then, the packet transmission control unit 13 holds, the wait time of "1 minute" as such a wait time when the return packet could be received. Also, the port keeping time detecting unit 15 holds a wait time of "1 minute 1 second" as such a wait time when the return packet could be received (step S107).

Thereafter, a wait time is set to "1 minute 30 seconds" (steps S108 and S101), and a history packet is again transmitted (step S102). Since the port keeping time of the communication processing apparatus 2 is "1 minute 18 seconds", such a return packet responding to a request packet transmitted for the wait time of "1 minute 30 seconds" is not address-translated in the communication processing apparatus 2. As a result, the return packet is not received by the information processing apparatus 1 (step S106), but the port keeping time detecting unit 15 holds the wait time of "1 minute 30 seconds" which has been temporarily held during the transmission of the request packet as a wait time when the return packet could not be received.

Since a total number of operations when the return packet could not be received is still 1 time, the packet transmission control unit 13 judges that the transmission of the request packet is continued (step S108), and sets such a wait time as a new wait time (step S101). The new wait time is calculated by adding "10 seconds" to the longest wait time of "1 minute" among the wait times when the return packets could be received. It is also assumed that this new wait time of "1 minute 10 seconds" is stored in a memory (not shown) contained in the packet transmission control unit 13, while the wait time setting information is separately stored thereinto. Thereafter, similar to the above explanation, a history packet is transmitted to the server apparatus 3 (step S102), and then, a request packet is transmitted after 1 minute 10 seconds have elapsed since the history packet had been transmitted (steps S103 and S104). In this case, the wait time is shorter than the port keeping time of "1 minute 18 seconds" of the communication processing apparatus 2, so that the return packet is received in the information processing apparatus 1 (step S105). As a result, the port keeping time detecting unit 15 holds a wait time of "1 minute 11 seconds" when the return packet could be received (step S107).

Thereafter, the packet transmission control unit 13 judges that the transmission of the request packet is continued (step S108), and sets such a time of "1 minute 20 seconds" calculated by adding "10 seconds" to the previous wait time of "1 minute 10 seconds" as a new wait time (step S101). Then, a history packet is transmitted (step S102), and a request packet is transmitted after 1 minute 20 seconds have elapsed since this history packet had been transmitted (steps S103 and S104). In this case, since the wait time is longer than the port keeping time of the communication processing apparatus 2, the return packet transmitted from the server apparatus 3 is not address-translated in the communication processing apparatus 2, but also is not transmitted to the information processing apparatus 1. As a consequence, the return packet receiving unit 14 of the information processing apparatus 1 cannot receive the return packet (step S106), and the port keeping time detecting unit 15 holds the wait time of "1 minute 20 seconds" when the return packet could not be received. In the information processing apparatus 1, since a total number of operations when the return packets could not be received becomes 2 times, the packet transmission control unit 13 judges that the present timing is such a timing when a port keeping time is detected (step S108), and transfers such an instruction for detecting the port keeping time to the port keeping time detecting unit 15. In response to this instruction, the port keeping time detecting unit 15 detects the longest wait time of "1 minute 11 seconds" as the port keeping time of the communication processing apparatus 2 among the wait times of "31 seconds", "1 minute 1 second", and "1 minute 11 seconds" when the return packets could be received (step S109).

It should also be noted that this concrete example 2 has described such a case that the wait time is divided into 2 stages and the divided wait times are increased. Alternatively, the packet transmission control unit 13 may control a transmission of a request packet until a return packet responding to the request packet cannot be received in such a manner that a wait time is increased every time the request packet is transmitted. In such a case that the return packet responding to the request packet could not be received, the packet transmission control unit 13 may alternatively control a transmission of the request packet in such a manner that the wait time is decreased between the time when the return packet could not be received, and the longest wait time among the wait times when the return packets could be received. There is no question when the wait time is changed by employing which algorithm between the time when the return packet could not be received, and the longest wait time among the wait times when the return packets could be received in such a case that the return packet responding to the request packet could not be received.

Concrete Example 3

This concrete example 3 describes operations in such a case where in the pattern A, the packet transmission control unit 13 controls a transmission of a request packet in such a manner that a wait time is decreased every time the request packet is transmitted. Also, it is so assumed that when the return packet receiving unit 14 could receive a return packet, the port keeping time detecting unit 15 detects a port keeping time. Also, as to an end stage of the wait time, it is so assumed as the pattern E. The packet transmission control unit 13 is assumed to set a wait time based upon wait time setting information of FIG. 15. It should also be noted that the wait time setting information of FIG. 15 is similar to the wait time setting information of FIG. 11 except that sequences of waiting times are different between them, and thus, explanations thereof are omitted. It should also be noted that operations of the concrete example 3 are similar to those of the above-described concrete examples 1 and 2 except that the request packet is transmitted in such a manner that the wait time is decreased, and the end of the wait time is the pattern E, and thus, detailed descriptions thereof are omitted.

Figure 16:
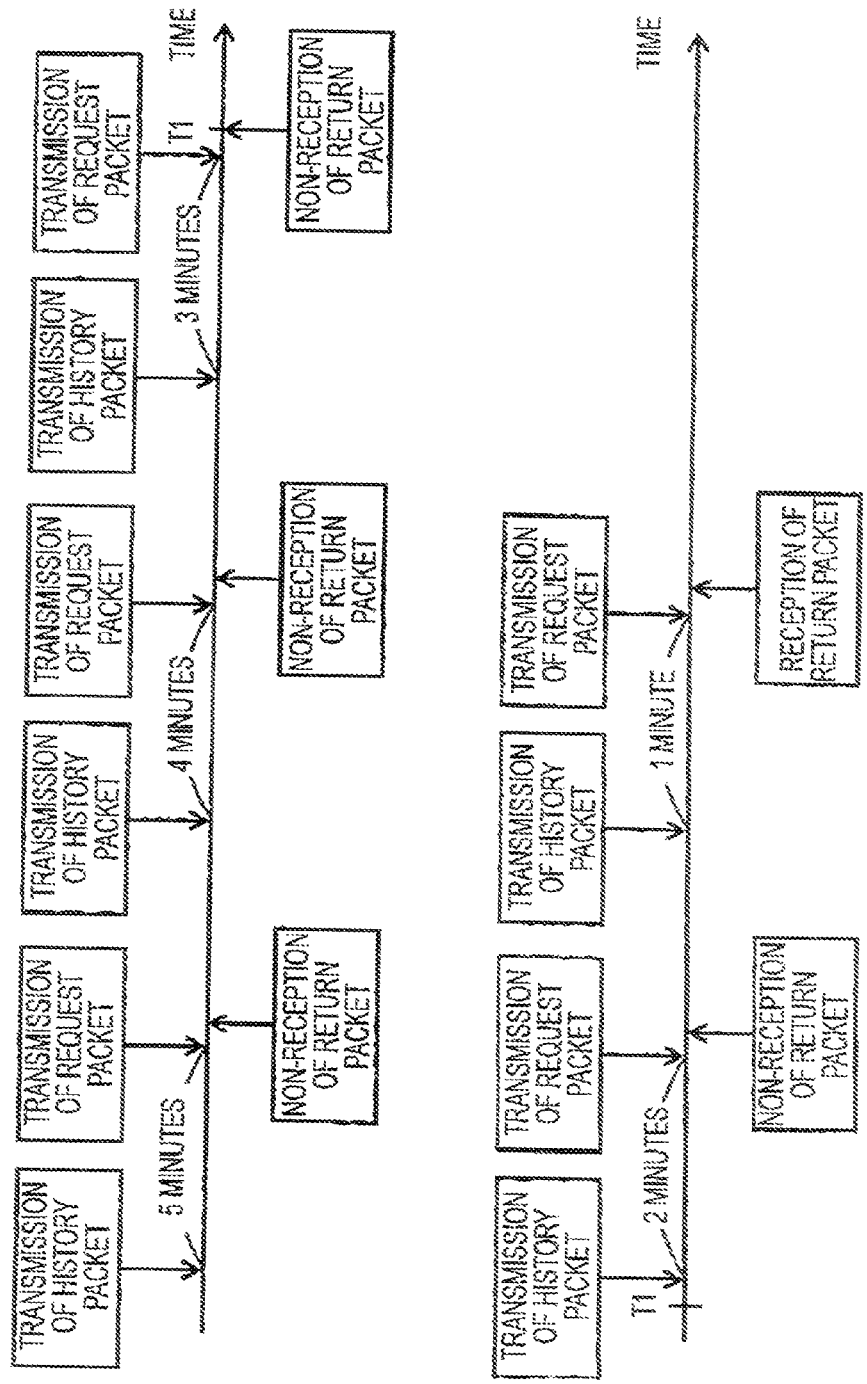
FIG. 16 is a diagram for describing transmissions and receptions of packets executed in the embodiment mode 1.

FIG. 16 is a diagram for explaining transmissions of history packets, transmission of request packets, and receptions of return packets (or return packets are not received) in this concrete example 3. Similar to the concrete example 1, first of all, in the wait time setting information shown in FIG. 15, a wait time of "5 minutes" is set, and both a history packet is transmitted, and a request packet is transmitted after 5 minutes have elapsed since this history packet had been transmitted (steps S101 to S104). This wait time is longer than the port keeping time of the communication processing apparatus 2, so that the information processing apparatus 1 cannot receive the return packet transmitted from the server apparatus 3 (step S106). As a consequence, in this case, a wait time is not defined in the port keeping time detecting unit 15. Thereafter, the packet transmission control unit 13 judges that the transmission of the request packet is continued (step S108), a new wait time of "4 minutes" is set, and both a history packet is transmitted, and a request packet is transmitted after 4 minutes have elapsed since this history packet had been transmitted (steps S101 to S104). Also, in this case, this wait time is longer than the port keeping time of the communication processing apparatus 2, so that the information processing apparatus 1 does not receive the return packet transmitted from the server apparatus 3. Such a process operation is repeatedly carried out, so that it is assumed that the wait time set by the packet transmission control unit 13 becomes "1 minute" (step S101). Then, both a history packet is transmitted, and a request packet is transmitted after 1 minute has elapsed since this history packet had been transmitted (steps S102 to S104). In this case, the wait time is shorter than the port keeping time of the communication processing apparatus 2, so that the return packet transmitted from the server apparatus 3 is address-translated in the communication processing apparatus 2, and then, the address-translated return packet is received by the return packet receiving unit 14 of the information processing apparatus 1 (step S105). Since the return packet is received, the port keeping time detecting unit 15 stops the time measuring operation commenced at the timing when the history packet was transmitted, and a count value "1 minute 1 second" of the timer is held as such a wait time when the return packet could be received (step S107). It should also be understood that in this concrete example 3, such a wait time which has been held by the port keeping time detecting unit 15 is only this wait time of "1 minute 1 second." Thereafter, since the return packet is received, the packet transmission control unit 13 judges that the present timing is such a timing for detecting a wait time (step S108), and then, transfers an instruction for performing the detection of the port keeping time to the port keeping time detecting unit 15. In response to this instruction, the port keeping time detecting unit 15 detects the wait time of "1 minute 1 second" when the return packet could be received as the port keeping time of the communication processing apparatus 2 (step S109).

Concrete Example 4

In this concrete example 4, similar to the concrete example 2, it is so assumed that in the pattern B, a wait time is divided into 2 stages, and to divided wait times are increased. Also, it is so assumed that an end stage of a wait time corresponds to the pattern F.

Similar to the concrete example 2, in this concrete example 4, first of all, the wait time is set to "30 seconds", and a history packet is transmitted to the server apparatus 3 (steps S101 and S102). It should be understood that both the packet transmission control unit 13 and the port keeping time detecting unit 15 commence time measuring operations respectively by employing timers from time instants when the history packets were transmitted.

The history packet is received by the server apparatus 3, and the transmission destination information is stored (steps S401 and S402). It is also assumed that the transmission destination information of this case is similar to that shown in FIG. 12.

Thereafter, the packet transmission control unit 13 judges whether or not only the wait time of "30 seconds" has elapsed after the time measuring operation had been commenced, and judges that the present timing is such a timing for transmitting a request packet at a time instant when the value of the timer indicates 30 seconds (step S201). As a result, the request packet containing the apparatus identification information of "AAA" is transmitted from the request packet transmitting unit 12 to the server apparatus 3 (step S104). It should also be understood that the port keeping time detecting unit 15 acquires a value of "30 seconds" of the timer at such a timing when the request packet is transmitted, and temporarily holds the acquired timer value. In this case, it is so assumed that the time measuring operation by the port keeping time detecting unit 15 is continuously carried out.

The request packet is received by the server apparatus 3, and a return packet is transmitted from the server apparatus 3 in a similar manner to that of the concrete example 1 (steps S403 to S405). This return packet reaches the port 12345 of the communication processing apparatus 2, and since a port keeping time of "1 minute 18 seconds" related to this port 12345 has not yet elapsed, the address of the return packet is translated and the address-translated return packet is transmitted to the information processing apparatus 1.

The return packet receiving unit 14 of the information processing apparatus 1 receives the above-described return packet (step S105), and transfers such a message that this return packet could be received to the port keeping time detecting unit 15. Accordingly, the port keeping time detecting unit 15 accomplishes the time measuring operation by the timer at this time instant, and holds a value of "31 seconds" of the timer at this time instant as a wait time when the return packet could be received. It should also be noted that the port keeping time detecting unit 15 discards the wait time of "30 seconds" which has been temporarily held at the transmission time instant of the request packet (step S107). Also, both the packet transmission control unit 13 and the port keeping time detecting unit 15 newly commence time measuring operations respectively at time instants when return have been received. In this concrete example 4, it is also assumed that the packet transmission control unit 13 similarly holds the wait time of "30 seconds" as the wait time when the return packet could be received.

Thereafter, since the return packet has been received, the packet transmission control unit 13 judges that the transmission of the request packet is continued (step S108), and sets the wait time to "1 minute" (step S207). Subsequently, the packet transmission control unit 13 judges whether or not only the wait time of "1 minute" has elapsed after the time measuring operation had been commenced, and also judges that the present timing is such a timing for transmitting a request packet at a time instant when a value of the timer indicates "1 minute" (step S201). As a result, a request packet is transmitted from the request packet transmitting unit 12 (step S104). As previously described, in this concrete example 4, when the return packet is received, such a time instant when this return packet is received constitutes a beginning stage of the wait time. Also, in this case, the return packet transmitted from the server apparatus 3 in response to the request packet transmitted from the information processing apparatus 1 reaches the history port of the communication processing apparatus 2, and is transmitted to the information processing apparatus 1.

The return packet receiving unit 14 of the information processing apparatus 1 receives the above-described return packet (step S105), and transfers such a message that this return packet could be received to the port keeping time detecting unit 15. Accordingly, the port keeping time detecting unit 15 accomplishes the time measuring operation by the timer at this time instant, and holds a value of "1 minute 1 second" of the timer at this time instant as a wait time when the return packet could be received. It should also be noted that the port keeping time detecting unit 15 discards the wait time of "1 minute" which has been temporarily held at the transmission time instant of the request packet (step S107). Also, both the packet transmission control unit 13 and the port keeping time detecting unit 15 newly commence time measuring operations respectively at time instants when return packets were received. Also, the packet transmission control unit 13 holds the wait time of "1 minute" as the wait time when the return packet could be received.

Figure 17:
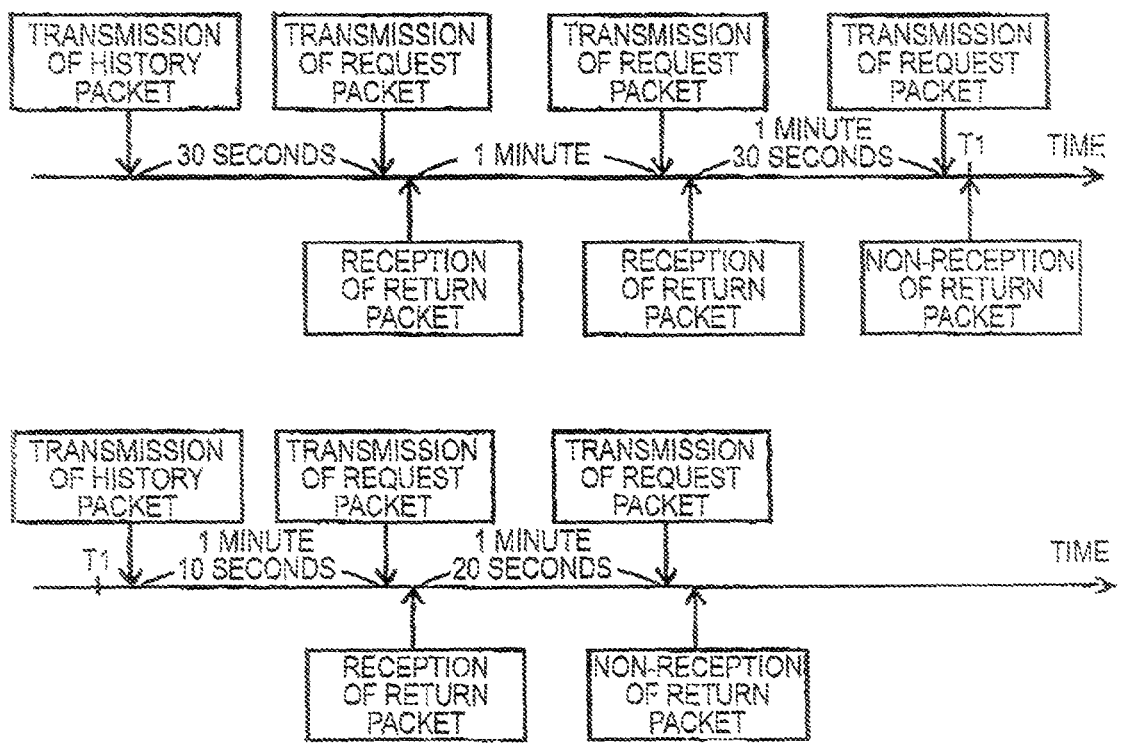
FIG. 17 is a diagram for describing transmissions and receptions of packets performed in the embodiment mode 1.

FIG. 17 is a diagram for explaining transmissions of history packets, transmissions of request packets, and receptions of return packets (or return packets are not received) in this concrete example 4. As indicated in FIG. 17, in the case that a wait time set by the packet transmission control unit 13 is "1 minute 30 seconds", since the port keeping time of the communication processing apparatus 2 is "1 minute 18 seconds", such a return packet responding to a request packet transmitted for the wait time of "1 minute 30 seconds" is not address-translated in the communication processing apparatus 2. As a result, the return packet is not received by the information processing apparatus 1 (step S106), but the port keeping time detecting unit 15 holds the wait time of "1 minute 30 seconds" which has been temporarily held during the transmission of the request packet as a wait time when the return packet could not be received. Also, the packet transmission control unit 13 similarly holds the wait time of "1 minute 30 seconds" as a wait time when the return packet could not be received.

Since a total number of operations when the return packet could not be received is still 1 time, the packet transmission control unit 13 judges that the transmission of the request packet is continued (step S203), and sets such a wait time as a new wait time (step S101). The new wait time is calculated by adding "10 seconds" to the longest wait time of "1 minute" when the return packet could be received. It is also assumed that this new wait time of "1 minute 10 seconds" is stored in a memory (not shown) contained in the packet transmission control unit 13, while the wait time setting information is separately stored thereinto. Thereafter, a history packet is transmitted to the server apparatus 3 (step S102), and then, a request packet is transmitted after 1 minute 10 seconds have elapsed since the history packet had been transmitted (steps S201 and S104). In this case, the wait time is shorter than the port keeping time of "1 minute 18 seconds" of the communication processing apparatus 2, so that the return packet is received in the information processing apparatus 1 (step S105). As a result, the port keeping time detecting unit 15 holds a wait time of "1 minute 11 seconds" when the return packet could be received (step S107).

Thereafter, the packet transmission control unit 13 judges that the transmission of the request packet is continued (step S108), and sets such a time of "1 minute 20 seconds" calculated by adding "10 seconds" to the previous wait time of "1 minute 10 seconds" as a new wait time (step S202). Then, a request packet is transmitted after 1 minute 20 seconds have elapsed since the return packet had been received (steps S201 and S104). In this case, since the wait time is longer than the port keeping time of the communication processing apparatus 2, the return packet transmitted from the server apparatus 3 is not address-translated in the communication processing apparatus 2, but also is not transmitted to the information processing apparatus 1. As a consequence, the return packet receiving unit 14 of the information processing apparatus 1 cannot receive the return packet (step S106), and the port keeping time detecting unit 15 holds the wait time of "1 minute 20 seconds" when the return packet could not be received. In the information processing apparatus 1, since a total number of operations when the return packets could not be received becomes 2 times, the packet transmission control unit 13 judges that the present timing is such a timing when a port keeping time is detected (step S203), and transfers such an instruction for detecting the port keeping time to the port keeping time detecting unit 15. In response to this instruction, the port keeping time detecting unit 15 detects the longest wait time of "1 minute 11 seconds" as the port keeping time of the communication processing apparatus 2 among the wait times of "31 seconds", "1 minute 1 second", and "1 minute 11 seconds" when the return packets could be received (step S109).

Concrete Example 5

This concrete example 5 describes operations in such a case where in the pattern C, the packet transmission control unit 13 controls a transmission of a request packet in such a manner that a wait time is increased every time the request packet is transmitted. Also, it is so assumed that when the return packet receiving unit 14 could not receive a return packet, the port keeping time detecting unit 15 detects a port keeping time. Also, as to an end stage of the wait time, it is so assumed as the pattern E. The packet transmission control unit 13 is assumed to set a wait time based upon the wait time setting information of FIG. 11.

Figure 18:
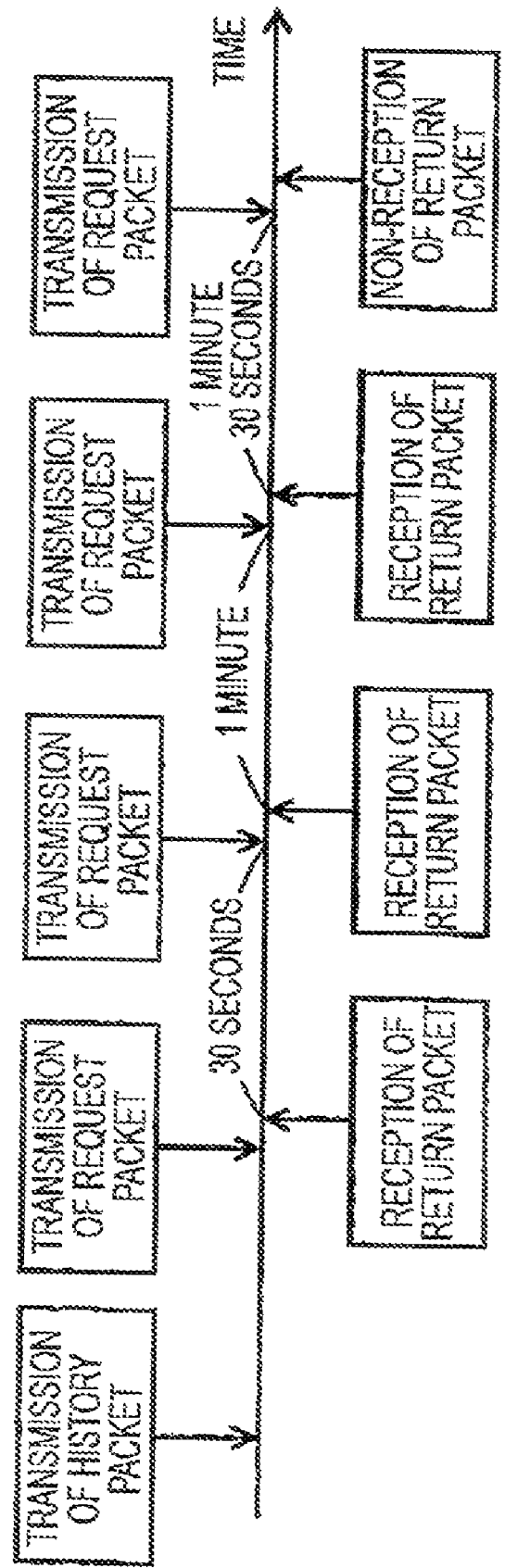
FIG. 18 is a diagram for describing transmissions and receptions of packets executed in the embodiment mode 1.

FIG. 18 is a diagram for explaining transmissions of history packets, transmission of request packets, and receptions of return packets (or return packets are not received) in this concrete example 5. First of all, as shown in FIG. 18, the packet transmission control unit 13 controls the history packet transmitting unit 11 in such a manner that a history packet is transmitted. As a result, the history packet from the history packet transmitting unit 11 is transmitted to the server apparatus 3 (step S102). This history packet is received by the server apparatus 3, and the transmission destination information indicated in a first record of FIG. 12 is stored, which is similar to the concrete example 1 (steps S401 and S402). The packet transmission control unit 13 controls the request packet transmitting unit 12 so as to transmit a request packet immediately after the history packet is transmitted (step S301). Upon receipt of this request packet, the server apparatus 3 transmits a return packet (steps S403 to S405). The return packet reaches the history port of the communication processing apparatus 2, and is address-translated, and then, the address-translated return packet is transmitted to the information processing apparatus 1. When the return packet receiving unit 14 receives the transmitted return packet, both the packet transmission control unit 13 and the port keeping time detecting unit 15 commence time measuring operations by employing timers respectively.

Thereafter, the packet transmission control unit 13 sets a wait time of "30 seconds" (step S303). Then, the packet transmission control unit 13 judges whether or not only the wait time of "30 seconds" has elapsed after the time measuring operation had been commenced, and judges that the present timing is such a timing for transmitting a request packet at a time instant when the value of the timer indicates 30 seconds (step S304). As a result, the request packet containing the apparatus identification information of "AAA" is transmitted from the request packet transmitting unit 12 to the server apparatus 3 (step S104).

A return packet transmitted from the server apparatus 3 in response to this request packet reaches the history port of the communication processing apparatus 2, the address of the return packet is translated, and the address-translated return packet is transmitted to the information processing apparatus 1. When the return packet receiving unit 14 receives the above-described return packet (step S105), the port keeping time detecting unit 15 accomplishes the time measuring operation by the timer at this time instant, and holds a value of "31 seconds" of the timer at this time instant as a wait time when the return packet could be received (step S107). It should also be noted that both the packet transmission control unit 13 and the port keeping time detecting unit 15 again commence time measuring operations respectively by operating the timers.

Thereafter, similar to the above-described case as to the wait time of "30 seconds", a wait time of "1 minute" is set (step S303), a transmission of a request packet and a reception of a return packet are carried out (steps S304, S104, and S105). When the return packet receiving unit 14 receives this return packet, the port keeping time detecting unit 15 accomplishes the time measuring operation by the timer at this time instant, and holds a value of "1 minute 1 second" of the timer at this time instant as a wait time when the return packet could be received (step S107). It should also be noted that both the packet transmission control unit 13 and the port keeping time detecting unit 15 again commence time measuring operations respectively by operating the timers.

Thereafter, similar to the above-described case as to the wait time of "30 seconds", a wait time of "1 minute 30 seconds" is set (step S303), a transmission of a request packet is carried out (steps S304 and S104). In this case, however, a return packet transmitted from the server apparatus 3 is not address-translated in the communication processing apparatus 2. As a consequence, the return packet is not received by the information processing apparatus 1 (step S106). As a result, the packet transmission control unit 13 judges that the present timing is such a timing when a port keeping time is detected (step S108), and transfers such an instruction for detecting the port keeping time to the port keeping time detecting unit 15. In response to this instruction, the port keeping time detecting unit 15 detects the longest wait time of "1 minute 1 second" as the port keeping time of the communication processing apparatus 2 among the wait times of "31 seconds" and "1 minute 1 second", when the return packets could be received (step S109).

It should also be noted that the respective concrete examples have described such a case that both the packet transmission control unit 13 and the port keeping time detecting unit 15 contain the timers respectively. Alternatively, the packet transmission control unit 13 and the port keeping time detecting unit 15 may perform time measuring operations of wait times by employing a single timer.

As previously described, in the information processing system according to the embodiment mode 1, in the information processing apparatus 1, a wait time is set, and a transmission of a return packet is requested with respect to the server apparatus 3 in the end stage of this wait time. As a result, the information processing apparatus 1 can judge whether or not a port keeping time of the communication processing apparatus 2 is longer than the wait time, and can detect the port keeping time of the communication processing apparatus 2. In the detecting process operation of this port keeping time, the server apparatus 3 may merely store transmission destination information based upon a history packet, and also may merely transmit a return packet in response to a reception of a request packet. As a consequence, as compared with such a case that the server apparatus 2 controls the transmission timing of the return packet based upon the wait time, the processing workload given to the server apparatus 3 can be reduced, and also, such an information processing system without giving a heavy processing load to the server apparatus 3 can be realized.

Also, a changing width of a wait time set to the information processing apparatus 1 is properly set, so that the port keeping times of the communication processing apparatus 2 can be detected within a sufficiently necessary range. For instance, in such a case that port keeping times may be merely detected in the unit of 10 seconds, the port keeping times may be detected in the unit of 10 seconds, and also, in the case where port keeping times should be detected in the unit of 1 second, the port keeping times may be detected in the unit of 1 second.

Further, the packet transmission control unit 13 can determine whether or not a request packet is transmitted by checking whether or not a return packet could be received. As a result, it is possible to avoid that an unnecessary request packet related to a detection of a port keeping time is transmitted (for example, although return packet corresponding to wait time of "1 minute 30 seconds" could not be received, such a request packet having wait time information indicative of wait time of "2 minutes" is transmitted). Alternatively, since a width of increasing a wait time is set in a step manner, port keeping times may be efficiently detected.

It should also be understood that the present embodiment mode 1 has described such a case that a port number of a history port and an address of the communication processing apparatus 2 on the side of the communication line 100 are contained in the transmission destination information stored in the transmission destination information storage unit 34. Alternatively, only the port number of the history port may be contained in the transmission destination information. In this alternative case, the server apparatus 3 may acquire the address of the communication processing apparatus 2 on the side of the communication line 100 from a transmission source address contained in a header of a request packet.

Embodiment Mode 2

Referring now to drawings, a description is made of an information processing system according to an embodiment mode 2 of the present invention. In the information processing system of the embodiment mode 2, transmission destination information corresponding to information related to a transmission destination of a return packet is contained in a request packet which is transmitted from an information processing apparatus to a server apparatus.

Figure 19:
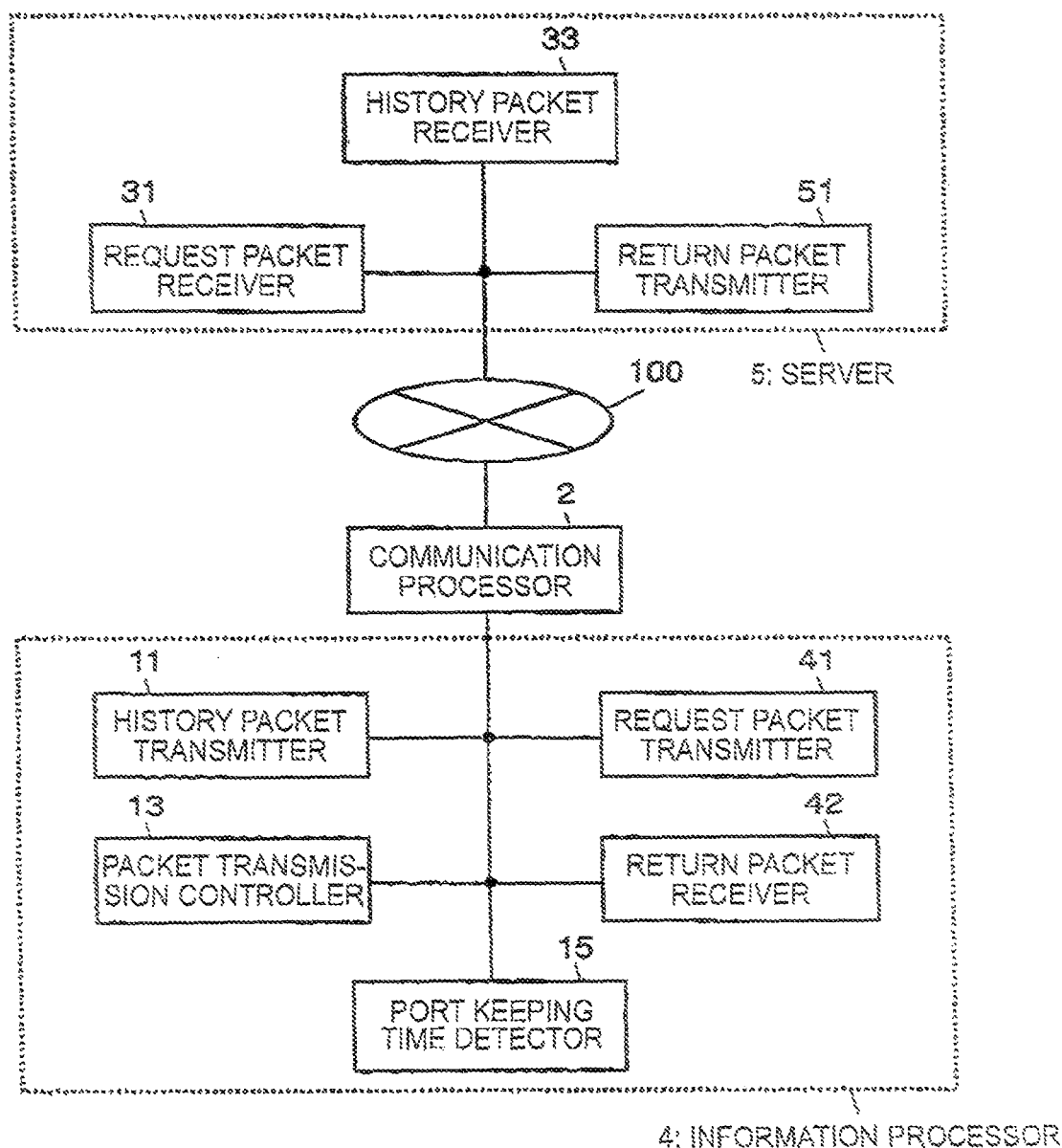
FIG. 19 is a block diagram for indicating an arrangement of an information processing system according to an embodiment mode 2 of the present invention.

FIG. 19 is a block diagram for showing an arrangement of the information processing system according to the embodiment mode 2. In FIG. 19, the information processing system of this embodiment mode 2 is equipped with an information processing apparatus 4, a communication processing apparatus 2, and a server apparatus 3. It should be understood that the information processing system according to this embodiment mode 2 is similar to the information processing system according to the embodiment mode 1 except that the information processing apparatus 1 becomes the information processing apparatus 4, and the server apparatus 3 becomes the server apparatus 5.

The information processing apparatus 4 is equipped with a history packet transmitting unit 11, a request packet transmitting unit 41, a packet transmission control unit 13, a return packet receiving unit 42, and a port keeping time detecting unit 15. It should be understood that the history packet transmitting unit 11, the packet transmission control unit 13, and the port keeping time detecting unit 15 are similar to those of the embodiment mode 1, and thus, explanations thereof are omitted.

The request packet transmitting unit 41 is similar to the request packet transmitting unit 12 according to the embodiment mode 1. It should be noted that transmission destination information corresponding to information related to a transmission destination of a return packet is contained in a request packet which is transmitted by the request packet transmitting unit 41. This transmission destination information is constituted by employing information indicative of a position of a history packet, and information representative of an address of the communication processing apparatus 2 on the side of the communication line 100, which are contained in a return packet received by the return packet receiving unit 42.

The return packet receiving unit 42 is similar to the return packet receiving unit 14 according to the embodiment mode 1. It should also be noted that the return packet receiving unit 42 also receives a return packet which contains information indicative of a position of a history packet, and information representative of an address of the communication processing apparatus 2 on the side of the communication line 100, which is transmitted from the server apparatus 5.

In the case that two, or more pieces of arbitrary structural elements among the history packet transmitting unit 11, the request packet transmitting unit 41, and the return packet receiving unit 42 contain devices related to communications, these structural elements may be made of the same means, or different means.

The server apparatus 5 is equipped with a request packet receiving unit 31, a return packet transmitting unit 51, and a history packet receiving unit 33. It should also be noted that the request packet receiving unit 31 and the history packet receiving unit 33 are similar to those of the embodiment mode 1, and thus, descriptions thereof are omitted.

The return packet transmitting unit 51 is similar to the return packet transmitting unit 32 according to the embodiment mode 1. It should also be noted that the return packet transmitting unit 51 transmits a return packet based upon transmission destination information contained in a request packet received by the request packet receiving unit 31. In other words, the return packet transmitting unit 51 transmits a return packet to an address and a port number, which are indicated by the transmission destination information contained in the request packet. Also, the return packet transmitting unit 51 transmits a return packet to the information processing apparatus 4 in such a case that the history packet receiving unit 33 receives a history packet, while this return packet contains both information indicative of a position of a history port corresponding to such a port of the communication processing apparatus 2 through which the received history packet has passed, and information indicative of an address of the communication processing apparatus 2 on the side of the communication line 100. In this case, the return packet transmitting unit 51 can define that a transmission source address and a transmission source port, which are contained in a header of a history packet, are handled as the information indicative of the position of the history port and the address of the communication processing apparatus 2 on the side of the communication line 100. It should also be understood that a return packet transmitted when a request packet is received will be referred to as a "return packet responding to request packet", whereas a return packet transmitted when a history packet is received will be referred to as a "return packet responding to history packet."

In the case that two, or more pieces of arbitrary structural elements among the request packet receiving unit 31, the history packet receiving unit 33, and the return packet transmitting unit 51 contain devices related to communications, these structural elements may be made of the same means, or different means.

Figure 20:
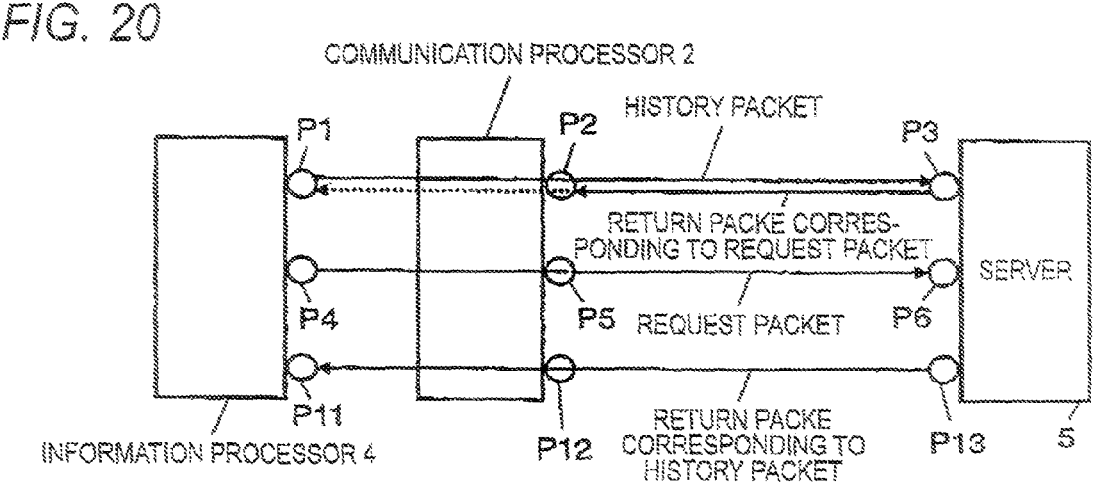
FIG. 20 is a diagram for explaining transmissions and receptions of packets executed in the information processing system of the embodiment mode 2.

Next, a concrete description is made of ports through which a history packet, a request packet, and a return packet pass. The below-mentioned two patterns may be conceived: That is, in this embodiment mode 2, one pattern is such a case where "a return packet responding to a history packet" passes through a history port, and the other pattern is such a case where "the return packet responding to the history packet" does not pass through the history port. Such a case where the return packet responding to the history packet passes through the history port will be referred as a "pattern X", whereas another case where the return packet responding to the history packet does not pass through the history port will be referred as a "pattern Y." In the case of the pattern X, the port through which the history packet, the request packet, and the return packet pass through, are similar to that shown in FIG. 2 of the embodiment mode 1. On the other hand, in the case of the pattern Y, as shown in FIG. 20, the return packet responding to the history packet is transmitted via a port P12 to the information processing apparatus 4. In this case, the port P12 is different from the port P2. As previously explained, the embodiment mode 1 has described such a case that all of the return packets are transmitted to the history port, whereas in the embodiment mode 2, such a return packet responding to the history packet among return packets may be transmitted to the history port, or may not be sent to the history port. In order that the information processing apparatus 4 can receive the return packet responding to the history packet, the return packet transmitted from the server apparatus 5 to the port P12 must be address-translated in the communication processing apparatus 2. As a consequence, for instance, the information processing apparatus 4 may transmit a predetermined packet via the port P12 to the server apparatus 5, so that the return packet responding to the history packet may be received; the information processing apparatus 4 may set port mapping with respect to the communication processing apparatus 2 by employing a function such as a UPnP (Universal Plug and Play) in such a manner that a packet transmitted to the port P12 is transmitted to a port P11 of the information processing apparatus 4; or alternatively, the information processing apparatus 4 may employ other methods. Also, FIG. 20 has explained such a case that the return packet responding to the history packet is transmitted via the communication processing apparatus 2 to the information processing apparatus 4. Alternatively, the return packet responding to the history packet may be transmitted to the information processing apparatus 4 without via the communication processing apparatus 2. For example, in the case that the information processing apparatus 4 may also be communicated with the server apparatus 5 via another communication line other than the communication line 100, the return packet responding to the history packet may be alternatively transmitted to the information processing apparatus 4 via a communication line different from the communication line 100 without through the communication processing apparatus 2.

Next, a description is made of a detecting process operation as to a port keeping time. A definition as to a "wait time" is similar to that of the embodiment mode 1. It should be understood that in the case of the above-described pattern "X", since a return packet is transmitted from the server apparatus 5 just after a history packet is transmitted from the information processing apparatus 4, a wait time becomes only the case of the pattern 2 shown in FIG. 3B. It should also be noted that a return packet which passes through the communication processing apparatus 2 in a beginning stage of this pattern 2 is not equal to a return packet responding to a request packet, but such a return packet responding to a history packet. On the other hand, in the case of the above-described pattern "Y", since a return packet responding to a history packet does not pass through a history port, wait times are present in the case of the pattern 1 shown in FIG. 3A, and in the case of the pattern 2 indicated in FIG. 3B.

Next, a beginning stage of a wait time is described. In the case of the above-described pattern "Y" shown in FIG. 20, since the return packet responding to the history packet does not pass through the history port, the patterns A to C explained in the embodiment mode 1 may be conceived as patterns of the beginning stage of the wait time. On the other hand, in the case of the above-described pattern "X" shown in FIG. 2, since the return packet responding to the history packet also passes through the history port, patterns of the beginning stage of the wait time are different from the patterns A and B. That is say, the below-mentioned three patterns may be conceived, namely, such a pattern (will be defined as "pattern G") that a packet which passes through the history port in the beginning stage of the wait time every time corresponds to a return packet responding to a history packet; another pattern (will be defined as "pattern H") in which when a return packet responding to a request packet can be received by the information processing apparatus 4, this return packet is employed as the packet which passes through the history port in the beginning stage of the wait stage, whereas when a return packet responding to a request packet cannot be received by the information processing apparatus 4, a new history packet is transmitted, and such a return packet responding to this history packet is employed as the packet which passes through the history port in the beginning stage of the wait stage; and a pattern "C" which is similar to that of the embodiment mode 1. It should also be noted that as to the pattern "C", since the packet which passes through the history port in the beginning stage of the wait time corresponds to the return packet responding to the request packet, this pattern "C" becomes similar to that of the embodiment mode 1 even in this embodiment mode 2. Alternatively, the present invention may employ any other patterns than these patterns "G", "H", "C", and is not limited to these patterns.

[Pattern G]

Figure 21A:
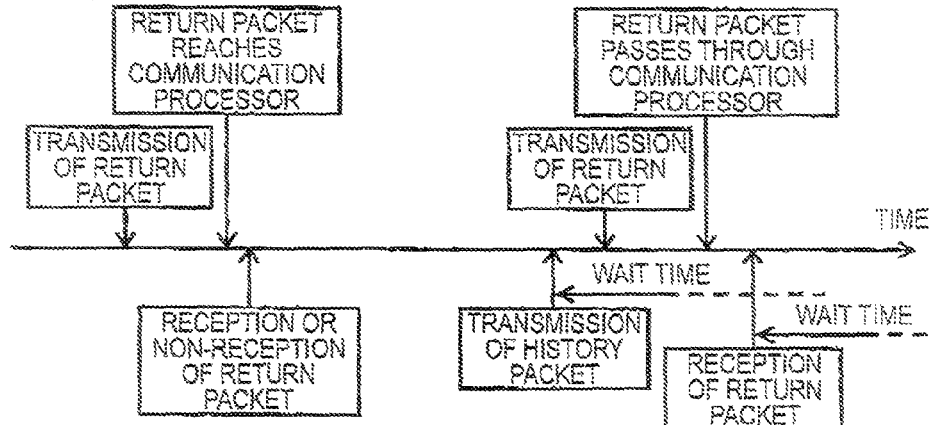
FIG. 21A is a diagram for describing a starting period of a wait time in the embodiment mode 2.

FIG. 21A is a diagram for explaining the pattern G. As explained in FIG. 4A, in the pattern G, the information processing apparatus 4 transmits a history packet in the beginning stage of the wait time irrespective of such a fact for indicating whether or not a return packet could be received by the information processing apparatus 4. It should be noted that in the pattern G, such a packet which passes through a history port in a beginning stage of a wait time corresponds to a return packet responding to the transmitted history packet. Also, the packet transmission control unit 13 controls a transmission of a request packet, and further, controls the transmission of the history packet by the history packet transmitting unit 11 in the beginning stage of the waiting time. In other words, the packet transmission control unit 13 controls the history packet transmitting unit 11 in such a manner that the history packet is transmitted in the beginning stage of the wait time.

Also, precisely speaking, as indicated in FIG. 3B, the beginning stage of the wait time becomes such a time instant when a return packet responding to the history packet passes through the communication processing apparatus 2. However, the information processing apparatus 4 can hardly grasp the time instant when the return packet passes through the communication processing apparatus 2. As a consequence, as indicated in FIG. 21A, in the port keeping time detecting unit 15, the time instant when the return packet responding to the history packet passes through the communication processing apparatus 2 in the beginning stage of the wait time is defined as a transmission time instant of the history packet. Otherwise, this time instant may be alternatively defined as a time instant when the return packet responding to the history packet is received. It should also be noted that although FIG. 21A is the diagram which assumes such a case that 2, or more pieces of the request packets are transmitted, only 1 piece of request packet may be alternatively transmitted by the information processing apparatus 4.

[Pattern H]

Figure 21B:
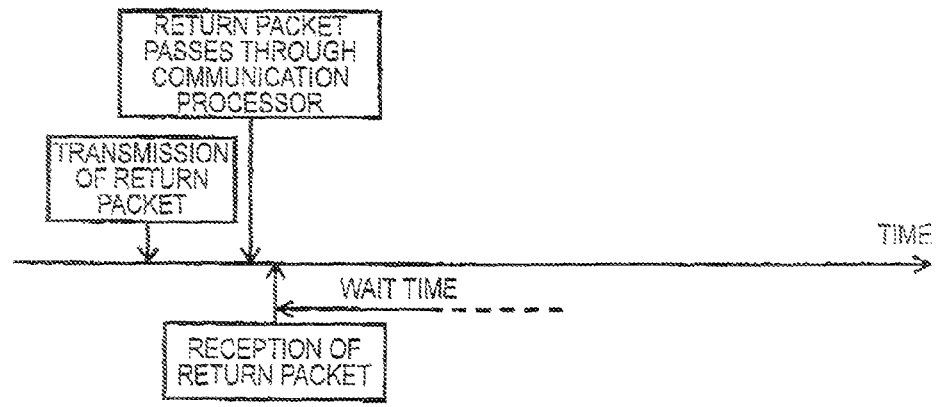
FIG. 21B is a diagram for describing a starting period of the wait time in the embodiment mode 2.
Figure 21C:
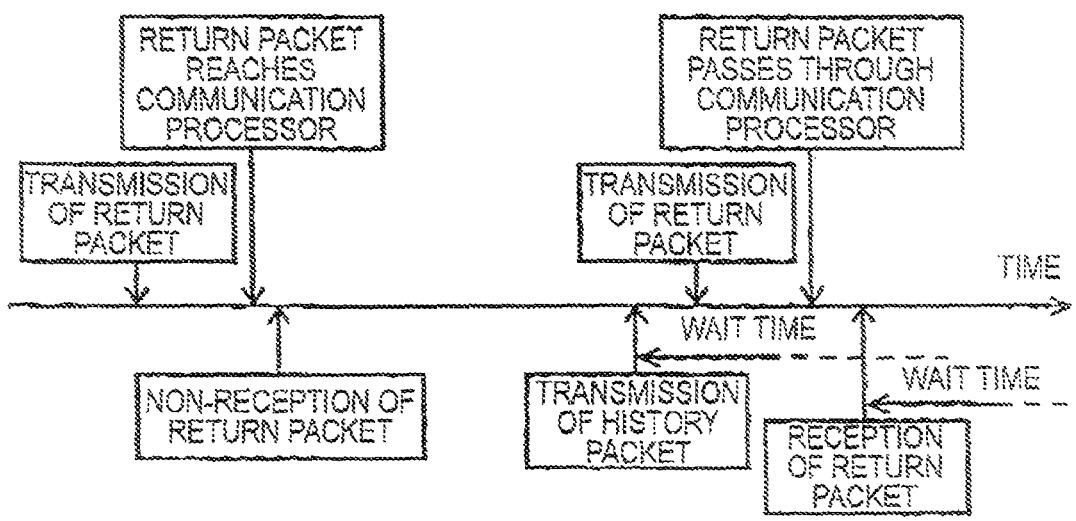
FIG. 21C is a diagram for describing a starting period of the wait time in the embodiment mode 2.

FIG. 21B and FIG. 21C are diagrams for explaining the pattern H. In the pattern H, a packet which passes through a history port in a beginning stage of a wait time corresponds to either a return packet responding to a history packet or a return packet responding to a request packet. In the case that the return packet responding to the request packet could be received by the information processing apparatus 4, as indicated in FIG. 21B, the information processing apparatus 4 does not transmit the history packet in the beginning stage of the wait time, but the return packet thereof constitutes such a packet which passes through the history port in the beginning stage of the wait time. On the other hand, in the case that the return packet responding to the request packet cannot be received by the information processing apparatus 4, as indicated in FIG. 21C, the information processing apparatus 4 transmits the history packet in the beginning stage of the wait time, and the return packet responding to this history packet constitutes such a packet which passes through the history port in the beginning stage of the wait time. Also, the packet transmission control unit 13 controls a transmission of a request packet, and further, controls the history packet transmitting unit 11 in such a manner that a history packet is transmitted in a beginning stage of a next wait time when a return packet responding to the request packet could not be received by the return packet receiving unit 14.

Also, precisely speaking, as indicated in FIG. 3B, the beginning stage of the wait time becomes such a time instant when a return packet passes through the communication processing apparatus 2. However, the information processing apparatus 4 can hardly grasp the time instant when the return packet passes through the communication processing apparatus 2. As a consequence, as indicated in FIG. 21B and FIG. 21C, in the port keeping time detecting unit 15, in such a case that a packet which passes through the history port in the beginning stage of the wait time corresponds to the return packet responding to the history packet, such a time instant corresponding to the beginning stage of the wait time when the packet passes through the history port is assumed as a transmission time instant of the history packet, otherwise, assumed as a reception time instant of the return packet responding to the history packet. Also, in the case that a packet which passes through the history port in the beginning stage of the wait time corresponds to the return packet responding to the request packet, such a time instant corresponding to the beginning stage of the wait time when the packet passes through the history port is assumed as a reception time instant of the return packet responding to the request packet. It should also be understood that in this case, the following initial condition is established. That is, the information processing apparatus 4 transmits 2, or more pieces of the request packets.

It should also be understood that with respect to an end stage of the wait time, similar to the embodiment mode 1, the patterns "D" to "F" may be conceived. Since these patterns have already been described in the embodiment mode 1, descriptions thereof are omitted. Alternatively, the present invention may employ any other patterns than these three patterns, and is not limited only to these patterns.

Next, operations of the information processing apparatus 4 according to the embodiment mode 2 will now be described with reference to flow charts. It should be understood that in this embodiment mode 2, similar to the embodiment mode 1, the flow charts are different from each other in response to the patterns as to the beginning stages of the wait times. As a consequence, descriptions are made of the respective flow charts in accordance with the patterns A to C, G, and H.

Figure 22:
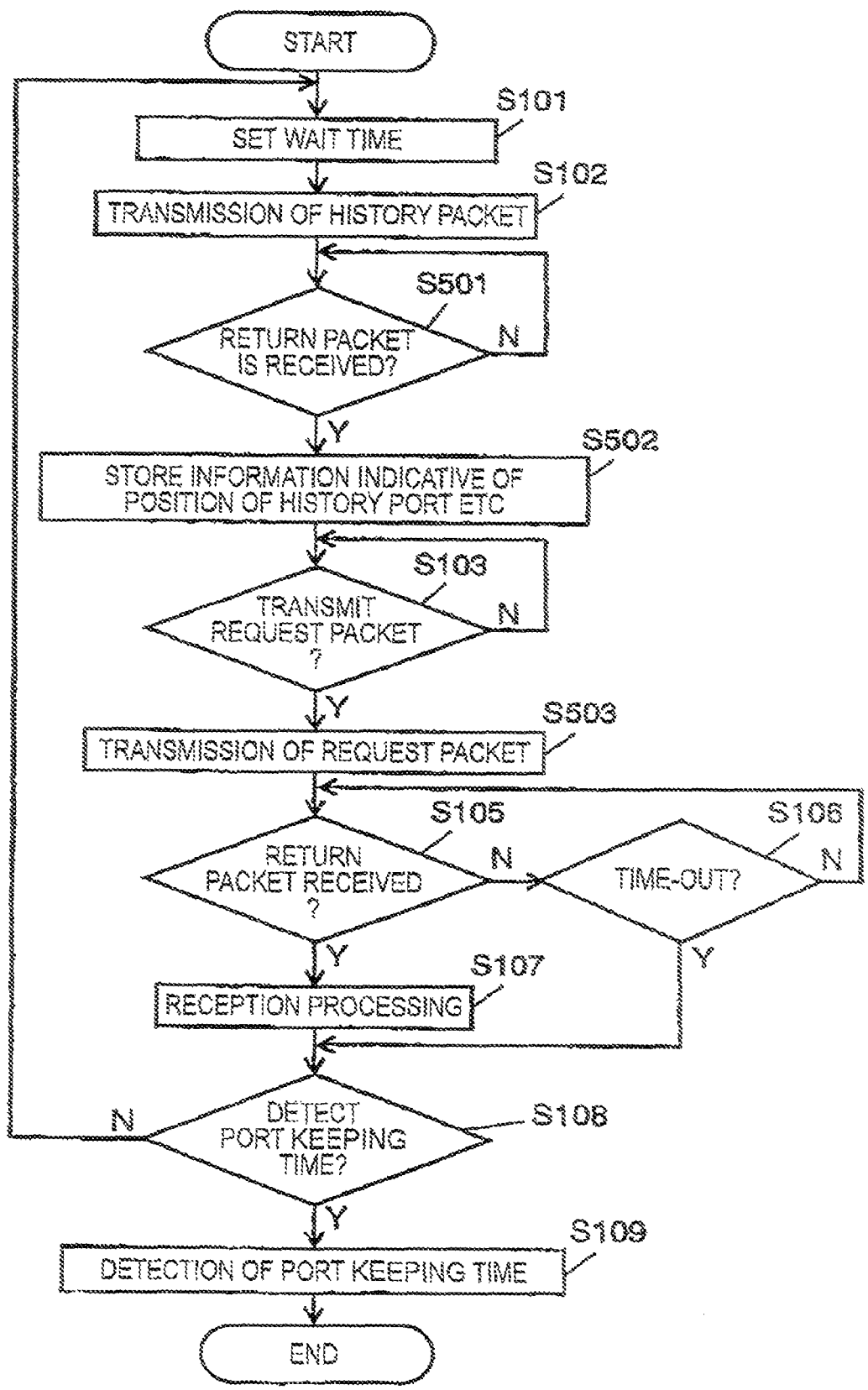
FIG. 22 is a flow chart for describing operations of the information processing apparatus according to the embodiment mode 2.

FIG. 22 is a flow chart for describing operations in the case of the pattern "A" and the pattern "G" of the information processing apparatus 4 according to the embodiment mode 2. It should be understood that process operations except for steps S501 to S503 are similar to those of the above-described flow chart shown in FIG. 6 of the embodiment mode 1, and thus, descriptions thereof are omitted. It should also be noted that when the pattern "G" is processed, in a judging operation as to transmission timing of a request packet in the step S103 and in a process operation for measuring a wait time by the port keeping time detecting unit 15, a beginning stage of the wait time may be set to a transmission time instant when a history packet is transmitted, or may be alternatively set to a time instant when a return packet responding to the history packet is received.

(step S501) The return packet receiving unit 42 judges whether or not a return packet responding to a history packet is received. Then, when the return packet receiving unit 42 receives the return packet, the process operation is advanced to a step S502, whereas if the return packet receiving unit 42 does not receive the return packet, then the return packet receiving unit 42 repeatedly performs the process operation of the step S501. In such a case that the return packet cannot be received due to such a reason when the server apparatus 5 is shut down, the return packet receiving unit 42 may judge that the present time becomes a time out after a predetermined time (for example, 1 minute) has elapsed since the request packet had been transmitted, and thus, may alternatively accomplish a series of the process operations.

(step S503) The request packet transmitting unit 41 temporarily stores thereinto both information indicative of a position of a history port and information indicative of an address of the communication processing apparatus 2 on the side of the communication line 100, which are contained in the return packet received by the return packet receiving unit 42. It should be noted that when the return packet receiving unit 42 newly receives a return packet responding to a history packet, it is so assumed that the request packet transmitting unit 41 temporarily stores thereinto both information indicative of a position of a latest history port, and the information of the communication processing apparatus 2 on the side of the communication line 100 in such a manner that these stored information can be discriminated from each other. For example, the request packet transmitting unit 41 may store thereinto the above-described information in an overwriting manner.

(step S503) The packet transmission control unit 13 controls the request packet transmitting unit 41 in such a manner that a request packet is transmitted to the server apparatus 5. As a result, the request packet is transmitted from the request packet transmitting unit 41 to the server apparatus 5. The request packet contains such a transmission destination information which contains the information indicative of the position of the history packet and the address of the communication processing apparatus 2 on the side of the communication line 100, which have been temporarily stored by the request packet transmitting unit 41.

It should also be noted that in this flow chart, the description has been made of such a case that both the information indicative of the position of the history packet and the address of the communication processing apparatus 2 on the side of the communication line 100 are temporarily stored by the request packet transmitting unit 41. This case is one example, and therefore, these information may be alternatively and temporarily stored in any structural element other than the request packet transmitting unit 41. However, when request packet transmitting unit 41 transmits a request packet, this request packet transmitting unit 41 must be capable of accessing these stored information in the alternative case.

Figure 23:
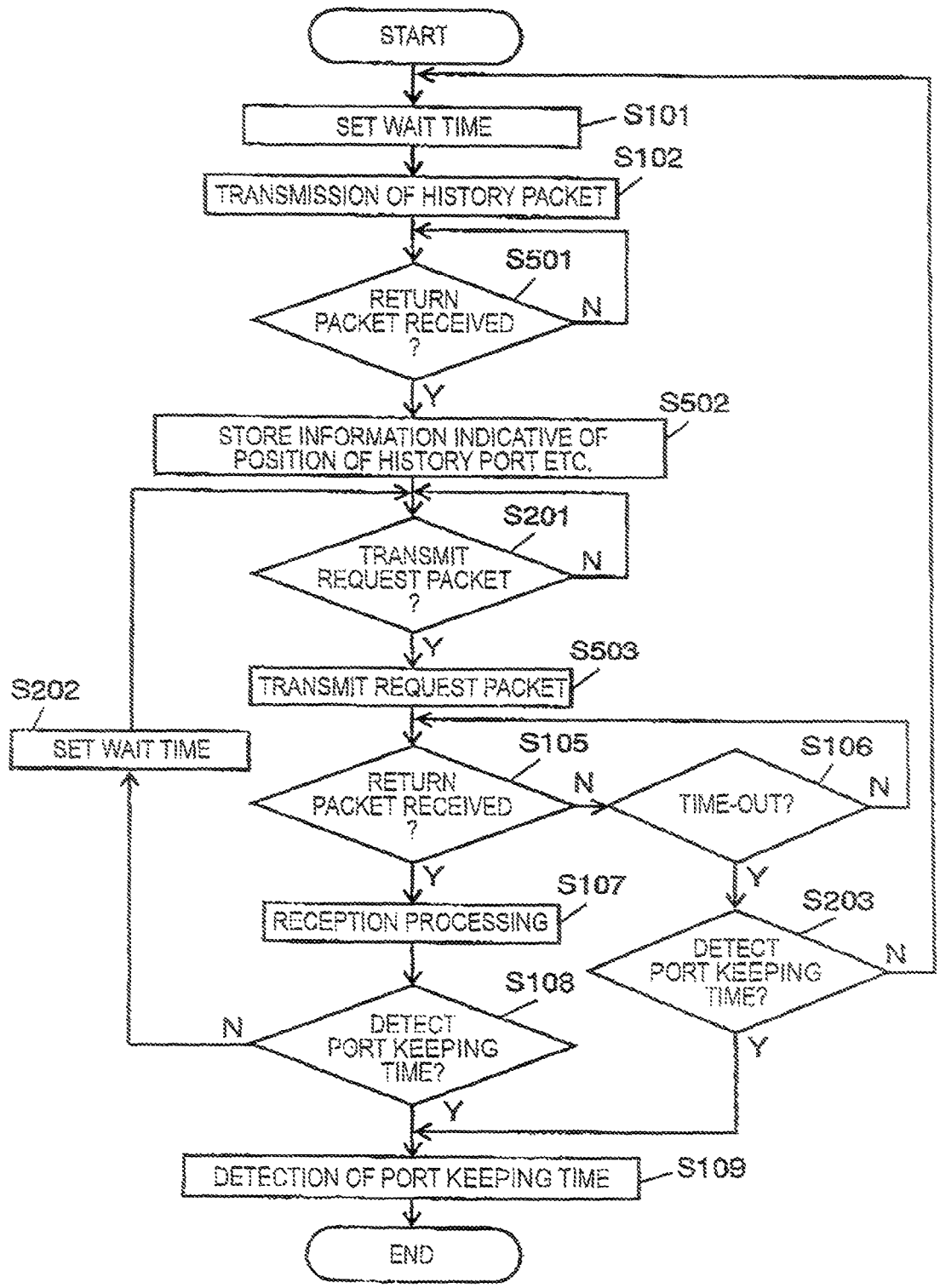
FIG. 23 is a flow chart for describing operations of the information processing apparatus according to the embodiment mode 2.

FIG. 23 is a flow chart for describing operations in the case of the pattern "B" and the pattern "H" of the information processing apparatus 4 according to the embodiment mode 2. It should be understood that process operations except for steps S501 to S503 are similar to those of the above-described flow chart shown in FIG. 7 of the embodiment mode 1, and thus, descriptions thereof are omitted. It should also be noted that the process operations of the steps S501 to S503 are similar to those of the flow chart shown in FIG. 22, and thus, explanations thereof are omitted. Alternatively, in the case of the above-described pattern "H", in a judging operation as to transmission timing of a request packet after a history packet has been transmitted in a beginning stage of a wait time in the step S201, and in a process operation for measuring a wait time by the port keeping time detecting unit 15, the beginning stage of the wait time may be set to a transmission time instant when a history packet is transmitted, or may be alternatively set to a time instant when a return packet responding to the history packet is received.

Figure 24:
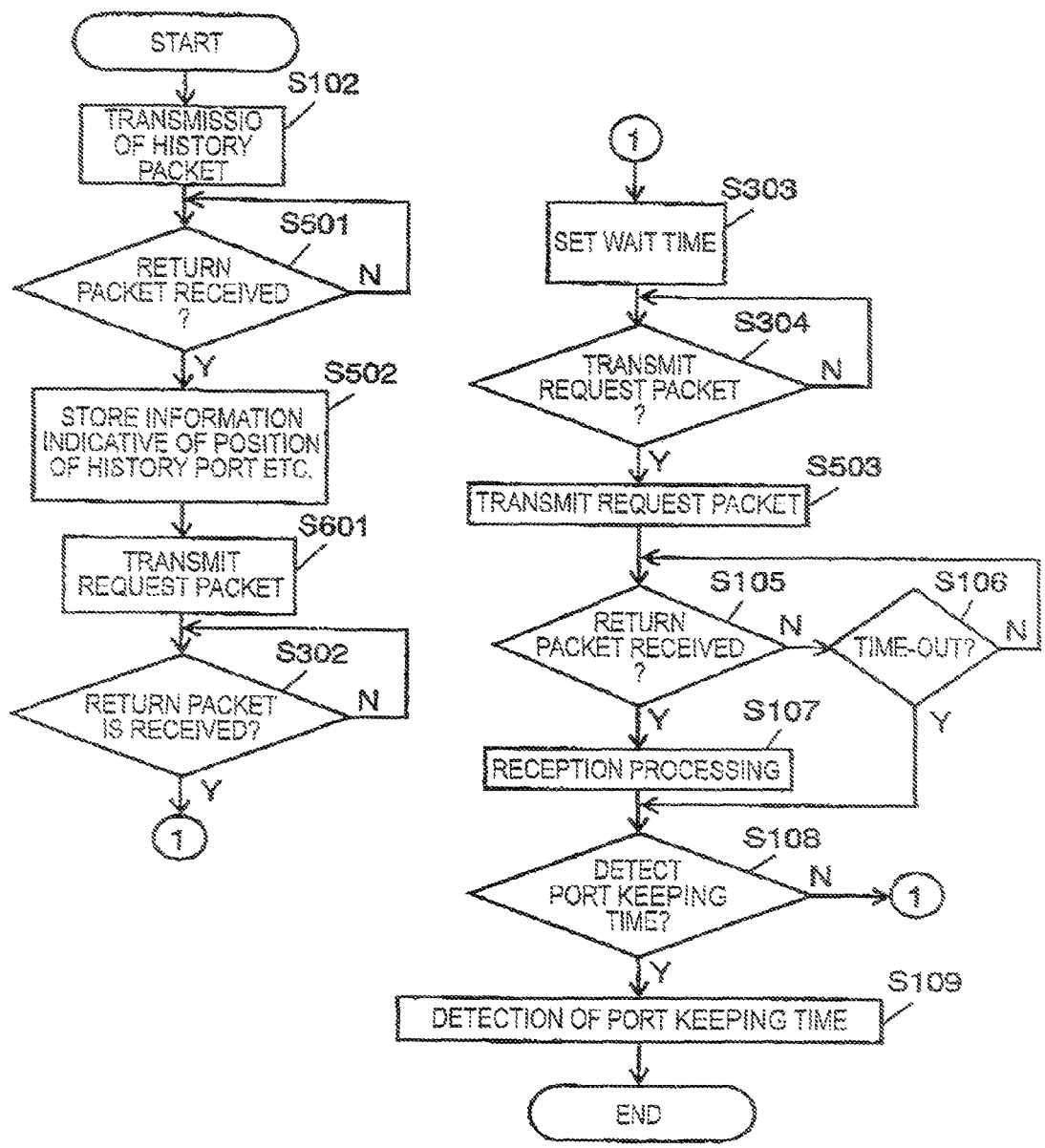
FIG. 24 is a flow chart for describing operations of the information processing apparatus according to the embodiment mode 2.

FIG. 24 is a flow chart for describing operations in the case of the pattern "C" of the information processing apparatus 4 according to the embodiment mode 2. It should be understood that process operations except for steps S501 to S503, and S601 are similar to those of the above-described flow chart shown in FIG. 8 of the embodiment mode 2, and thus, descriptions thereof are omitted. It should also be understood that process operations except for steps S501 to S503 are similar to those of the above-described flow chart shown in FIG. 22, and thus, descriptions thereof are omitted.

(step S601) The packet transmission control unit 13 controls the request packet transmitting unit 41 in such a manner that a request packet is transmitted to the server apparatus 5. As a result, the request packet is transmitted from the request packet transmitting unit 12 to the server apparatus 5. The request packet contains such a transmission destination information which contains the information indicative of the position of the history packet and the address of the communication processing apparatus 2 on the side of the communication line 100, which have been temporarily stored by the request packet transmitting unit 41.

It should also be noted that in the flow chart of FIG. 24, after the return packet responding to the history packet has been received (step S501), the transmission of the request packet is again performed (step S601), and the reception of the return packet responding to the request packet is carried out (step S302). Alternatively, the process operations with respect to the transmission (step S601) of the request packet, and the reception (step S302) of the return packet responding to the request packet may be omitted.

Next, operations of the server apparatus 5 according to the embodiment mode 2 will now be described with reference to a flow chart of FIG. 25. It should be understood that process operations of steps S401 and S403 are similar to those of the flow chart of FIG. 9 of the embodiment mode 1, and thus, descriptions thereof are omitted.

(step S701) The return packet transmitting unit 51 reads out both a transmission source address and a transmission source port number, which are contained in a header of a history packet received by the history packet receiving unit 33, and then, transmits a return packet containing the read transmission source address and the read transmission source port number to the information processing apparatus 4. Then, the process operation is returned to the step S401. It should also be understood that the return packet transmitting unit 51 transmits the above-described return packet to a history port, namely a transmission source port of the history port in the case of the pattern "X", and transmits this return packet to the information processing apparatus 4 without via the history port in the case of the pattern "Y."

(step S702) The return packet transmitting unit 51 reads out the transmission destination information from a payload of a request packet received by the request packet receiving unit 31.

(step S703) The return packet transmitting unit 51 transmits a return packet to an address and a port number, which are indicated by the read transmission destination information. Then, the process operation is returned to the step S401.

Figure 25:
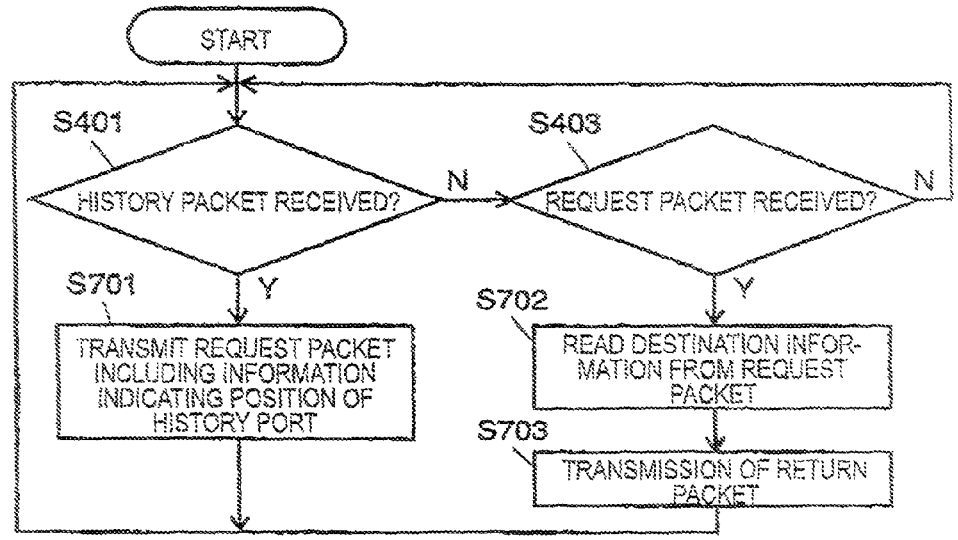
FIG. 25 is a flow chart for describing operations of a server apparatus according to the embodiment mode 2.
Figure 26A:
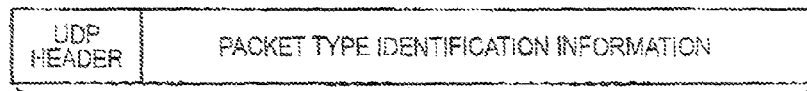
FIG. 26A is a diagram for representing an example as to a structure of a packet in the embodiment mode 2.
Figure 26B:
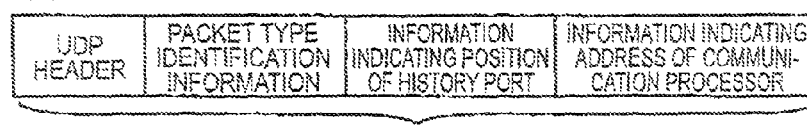
FIG. 26B is a diagram for representing an example as to a structure of a packet in the embodiment mode 2.
Figure 26C:
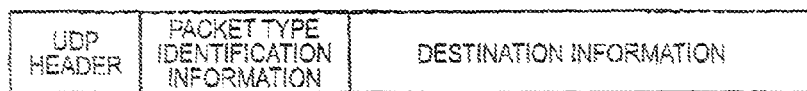
FIG. 26C is a diagram for representing an example as to a structure of a packet in the embodiment mode 2.
Figure 26D:
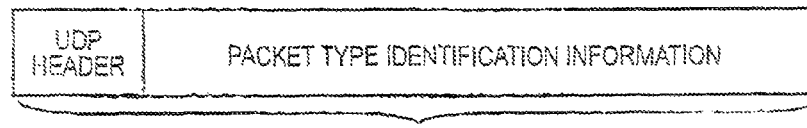
FIG. 26D is a diagram for representing an example as to wait structure of a packet in the embodiment mode 1.

It should also be understood that in the flow chart of FIG. 25, the process operation is accomplished when the power supply is turned OFF, or when a process end interrupt is issued.

Next, a description is made of operations of the information processing system according to the embodiment mode 2 with employment of concrete examples. Each of these concrete examples will now be described as follows: That is, the information processing system is operated in the case that in the pattern G, a wait lime is increased every time a request packet is transmitted so as to detect a port keeping time. It is so assumed that a beginning stage of the wait time corresponds to such a time instant when a return packet responding to a history packet is received, and also, an end stage of the wait time corresponds to the pattern "E."

In the below-mentioned concrete examples, it is so assumed that similar to the concrete examples of the embodiment mode 1, the port keeping time of the communication processing apparatus 2 is "1 minute 18 seconds." Also, IP addresses as to the information processing apparatus 4, the communication processing apparatus 2, and the server apparatus 5 are similar to those of the concrete examples according to the embodiment mode 1 except that the information processing apparatus 1 becomes the information processing apparatus 4, and the server apparatus 3 becomes the server apparatus 5. It should also be noted that when a return packet responding to a request packet cannot be received, the port keeping time detecting unit 15 detects a port keeping time.

FIG. 26A to FIG. 26D are diagrams for indicating structures of a history packet, a request packet, and a return packet in the below-mentioned concrete example. Each of the history packet, the request packet, and the return packet has a UDP header, while packet sort identification information has been contained in a payload thereof. Both information indicative of a position of a history port and information indicative of an address of the communication processing apparatus 2 on the side of the communication line 100 have been contained in a payload of a return packet responding to a history packet. Also, transmission destination information has been contained in the payload of the request packet.

Also, in this concrete example, it is so assumed that a wait time is set by employing the wait time setting information of FIG. 11. Firstly, the packet transmission control unit 13 sets "30 seconds" as the wait time by employing the wait time setting information indicated in FIG. 11 (step S101). Thereafter, a history packet is transmitted from the information processing apparatus 4 to the server apparatus 5 under control of the packet transmission control unit 13 (step S102).

The history packet receiving unit 33 of the server apparatus 5 receives this history packet, and then, transfers the received history packet to the return packet transmitting unit 51 (step S401). The return packet transmitting unit 51 reads out both the transmission source address of "202.224.135.10" and the transmission source port number of "12345" from the header of this history packet. Then, the return packet transmitting unit 51 constitutes such a return packet containing the transmission source address and the transmission source port number, and then, transmits the constituted return packet to the transmission source address and the transmission source port (step S701).

This return packet responding to the history packet reaches the history port of the communication processing apparatus 2, the address of the return packet is translated, and the address-translated return packet is transmitted to the information processing apparatus 4. The return packet receiving unit 42 of the information processing apparatus 4 receives the above-described return packet, and transfers this return packet to the request packet transmitting unit 41 (step S501). It should also be noted that both the packet transmission control unit 13 and the port keeping time detecting unit 15 commence time measuring operations by using timers from such a time instant when the return packet responding to this history packet is received. The request packet transmitting unit 41 reads out the address "202.224.135.10" of the communication processing apparatus 2 on the side of the communication line 100, and the port number "12345" of the history port from the return packet accepted from the return packet receiving unit 42, and then, temporarily stores the read information in a memory (not shown) (step S502).

Thereafter, the packet transmission control unit 13 judges whether or not only the wait time of "30 seconds" corresponding to the flag "1" of the wait time setting information shown in FIG. 11 has elapsed after the time measuring operation had been commenced, and judges that the present timing is such a timing for transmitting a request packet at a time instant when the value of the timer indicates 30 seconds (step S103). Then, the packet transmission control unit 13 controls the request packet transmitting unit 41 in such a manner that a request packet is transmitted. As a result, the request packet having the transmission destination information is transmitted from the request packet transmitting unit 41 to the server apparatus 5 (step S503). It should also be understood that both the address "202.224.135.10" of the communication processing apparatus 2 on the side of the communication line 100, and the port number "12345" of the history port have been contained in this transmission destination information.

The above-described request packet is received by the request packet receiving unit 31 of the server apparatus 5, and then, is transferred to the return packet transmitting unit 51 (step S403). The return packet transmitting unit 51 reads out the transmission destination information from the payload of the request packet (step S702), and transmits a return packet to the address of "202.224.135.10" and the port number of "12345" (step S703), which are indicated by this transmission destination information. This return packet reaches the port 12345 of the communication processing apparatus 2, and since a port keeping time of "1 minute 18 seconds" related to this port 12345 has not yet elapsed, the address of the return packet is translated and the address-translated return packet is transmitted to the information processing apparatus 4.

The return packet receiving unit 42 of the information processing apparatus 4 receives the above-described return packet (step S105), and transfers such a message that this return packet could be received to the port keeping time detecting unit 15. Accordingly, the port keeping time detecting unit 15 holds such a message that the return packet related to the wait time of "31 seconds" could be received (step S107). Also, since the return packet has been received, the packet transmission control unit 13 judges that the transmission of the request packet is continued (step S108), and sets the wait time to "1 minute." Thereafter, similar to the above description, a transmission of a history packet, a reception of a return packet responding to the history packet, a storing operation of a port number of a history port, and the like are carried out (steps S102, S501, S502). It is so assumed that in this case, while the same address and the same port number as those when the history packet in the first time was transmitted are contained in the return packet transmitted from the server apparatus 5, the request packet transmitting unit 41 stores the address and the like in an overwriting manner. Thereafter, a transmission of the request packet is repeatedly carried out.

Figure 27:
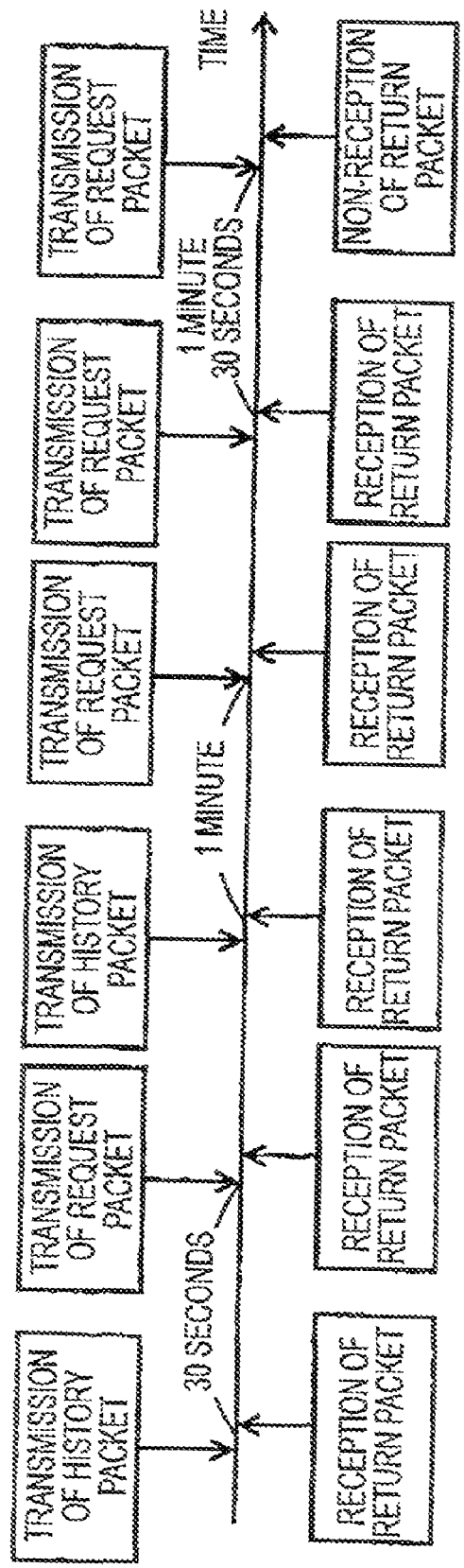
FIG. 27 is a diagram for describing transmissions and receptions of packets performed in the embodiment mode 2.

FIG. 27 is a diagram for explaining transmissions of history packets, transmission of request packets, and receptions of return packets (or return packets are not received) in this concrete example 3. In this concrete example, although a return packet transmitted in an end stage of the wait time of "1 minute" is received by the information processing apparatus 4, another return packet transmitted in an end stage of the wait time of "1 minute 30 seconds" is not address-translated by the communication processing apparatus 2 since the port keeping time of the communication processing apparatus 2 has elapsed, so that the address-not-translated return packet is not received by the information processing apparatus 4. As a result, the packet transmission control unit 13 judges that the present timing is such a timing when a port keeping time is detected (step S108), and transfers such an instruction for detecting the port keeping time to the port keeping time detecting unit 15. In response to this instruction, the port keeping time detecting unit 15 detects the longest wait time of "1 minute 1 second" as the port keeping time of the communication processing apparatus 2 among the wait times of "31 seconds" and "1 minute 1 second" when the return packets could be received (step S109). It should also be noted that thereafter, this detected port keeping time is stored in a predetermined recording medium (not shown), and is employed as a transmission time period for transmitting a packet to the server apparatus 5 in a periodic manner, which is similar to that of the embodiment mode 1.

It should be understood that although only the above-described concrete example corresponding to the concrete example 1 according to the embodiment mode 1 has been described, concrete examples of this embodiment mode 2, which correspond to the concrete examples 2 through 5 of the embodiment mode 1, are similar to the concrete examples 2 through 5 of the embodiment mode 1 except that transmission destination information is contained in a request packet and a beginning stage of a wait time may be such a time instant when a return packet responding to a history packet is received, and thus, descriptions thereof are omitted.

As previously described, in the information processing system according to this embodiment mode 2, in the server apparatus 5, the port keeping time of the communication processing apparatus 2 can be detected in a manner similar to the embodiment mode 1 without storing the transmission destination information.

It should also be understood that this embodiment mode 2 has described such a case that both the information for indicating the position of the history port and the information for indicating the address of the communication processing apparatus 2 on the side of the communication line 100 are contained in the return packet responding to the history packet. Alternatively, only the information for representing the position of the history port may be contained in the return packet responding to the history packet. In this alternative case, the information indicative of the address of the communication processing apparatus 2 on the communication line 100 may not be contained, or may be contained in the transmission destination information included in the request packet. In the former case, the transmission source address is acquired from the header of the request packet, so that the server apparatus 5 may grasp the address of the communication processing apparatus 2 on the side of the communication line 100. Also, in the latter case, it is so assumed that the information processing apparatus 4 acquires the address of the communication processing apparatus 2 on the side of the communication line 100 by another method different from that of the return packet responding to the history packet. For instance, the information processing apparatus 4 may acquire the above-described address by employing the function of UPnP, or the like. Alternatively, while a packet is arranged by containing a transmission source address of a received packet is contained in a payload, in such a case that a predetermined server apparatus is present which transmits this constructed packet to a transmission source address of the received packet, the information processing apparatus 4 may transmit the packet to this server apparatus and may receive the packet transmitted from this server apparatus so as to acquire the address of the communication processing apparatus 2 on the side of the communication line 100. It should also be understood that the above-described predetermined sever apparatus may be realized by employing the server apparatus 5, or another server apparatus.

In the concrete examples of the above-described respective embodiment modes, the descriptions have been made of such a case that the wait times are set by employing the wait time setting information shown in FIG. 11, and the like. Alternatively, the wait times may be set without employing the wait time setting information. For example, while the packet transmission control unit 13 may have an algorithm for setting wait times, the packet transmission control unit 13 may determine a wait time in response to the algorithm, and the determined wait time may be recorded on a predetermined recording medium, or the like so as to set the wait time. Alternatively, the wait time may be set by performing other methods. In the alternative case, the above-described algorithm may be realized by, for example, such an algorithm that the wait time is increased by "30 seconds" every time a request packet is transmitted, another algorithm that the wait time is increased twice every time the request packet is transmitted, or by other algorithm.

Also, the respective embodiment modes have described the following case: That is, since the information processing apparatus can hardly grasp a beginning stage and an end stage of an ideal wait time, the beginning stage and the end stage of the wait time are approximated so as to be measured. The approximation method is not limited only to the above description. For example, while a return packet transmitted from the server apparatus has contained information indicative of a transmission time instant of the transmitted return packet, the above-explained transmission time instant may be alternatively employed as such a time instant when the return packet reaches the communication processing apparatus 2 in the information processing apparatus.

Alternatively, in the respective embodiment modes, the packet transmission control unit 13 may control a transmission of a request packet by considering such a time duration from a time instant when a request packet is transmitted up to a time instant when a return packet reaches the communication processing apparatus 2. Assuming now that such a time duration from the time instant when the request packet is transmitted up to the time instant when the return packet reaches the communication processing apparatus 2 is equal to "T seconds", in the case where a wait time is "30 seconds", the packet transmission control unit 13 may alternatively control the transmission of the request packet at a time instant when, for example, such a time duration of "30-T seconds" has elapsed from the time instant when the history packet had been transmitted.

Also, in the description about the pattern "C" in the respective embodiment modes, the return packet which has been transmitted in the end stage of the wait time is used as the packet which passes through the history port in the beginning stage of the next wait time. Alternatively, such a time instant that the information processing apparatus had transmitted the request packet to the server apparatus before the beginning stage of the wait time, and then, the return packet transmitted from the server apparatus in response to this request packet has passed the history port may be defined as the beginning stage of the wait time. In this alternative case, the transmission of the request packet may not be controlled in such a manner that the wait time is increased.

Also, the respective embodiment modes have described such a case that when the transmission destination information is stored based upon the history packet in the server apparatus, the transmission destination information related to the transmission destination of the return packet is contained in the request packet. Alternatively, the server apparatus may be capable of acquiring the information related to the transmission destination of the return packet by performing any other methods than the above-explained method. For instance, a user may set both the information indicative of the position of the history port and the information indicative of the address of the communication processing apparatus 2 on the side of the communication line 100 to the server apparatus in a manual manner. In this alternative case, the history packet need not reach the server apparatus. As a consequence, since a lifetime of a history packet, for example, TT (Time To Live) is adjusted, the history packet need not reach the server apparatus. However, since a transmission history must be left in a history port by transmitting the history packet, it is so assumed that the history packet reaches at least the communication line 100. In the case that the history packet does not reach the server apparatus, the server apparatus need not be equipped with the history packet receiving unit. Alternatively, the server apparatus may transmit the return packets with respect to a plurality of ports of the communication processing apparatus 2 in such a manner that any one of the return packets is transmitted to the history port without limiting the transmission destinations of the return packets.

Also, there is no limitation with respect to data capacities and structures of the history packets, the request packets, and the return packets, which are transmitted and received in the communications in the respective embodiment modes.

Also, as shown in FIG. 2 and FIG. 20, the above-explained respective embodiment modes have described such a case where the history packet is transmitted by employing only one port P2 of the communication processing apparatus 2. Alternatively, every time a history packet is transmitted, a port of the communication processing apparatus 2, through which this history packet passes, may be changed. In other words, such an operation that the history packet is transmitted via one port of the communication processing apparatus 2 implies that a total number of ports of the communication processing apparatus 2, which are employed within one time, is equal to 1. Concretely speaking, when a plurality of history packets are transmitted, all of these plural history packets may be transmitted via a single port of the communication processing apparatus 2, or the plurality of history packets may be transmitted via two, or more pieces of the ports of the communication processing apparatus 2. It should be noted that even in the latter case, since such a port which is employed within one time is one port, 2, or more pieces of the history packets are not simultaneously transmitted by employing 2, or more pieces of the ports.

Figures 28, 29:
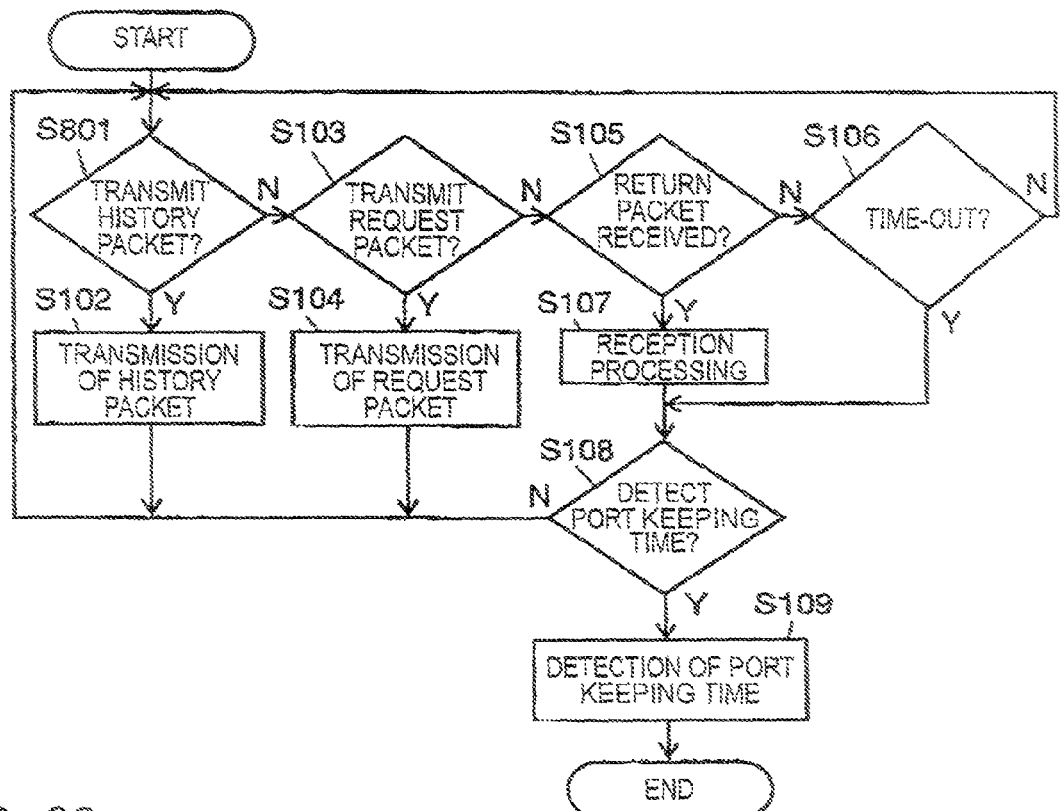
FIG. 28 is a flow chart for describing another example of the operations of the information processing apparatus.
FIG. 29 is a table diagram for showing one example as to transmission timing of a history packet and a request packet.

Further, the above-described respective embodiment modes have described such a case that the information processing apparatus sets the wait time, and controls the transmission timing of the request packet, and the like. Alternatively, the information processing apparatus may control the transmission timing of the request packet, and the like without setting the wait time. Referring now to a flow chart of FIG. 28, a brief description is made of such a case that the information processing apparatus 1 controls the transmission timing of the request packet and the like without setting the wait time. FIG. 28 is a flow chart for indicating operations of the information processing apparatus 1 according to the embodiment mode 1. It is so assumed that the flow chart of FIG. 28 corresponds to the pattern "A." Also, process operations except for a step S801 are similar to those of the flow chart shown in FIG. 6 of the embodiment mode 1, and thus, descriptions thereof are omitted.

(step S801) The packet transmission control unit 13 judges whether or not the present timing is such a timing for transmitting a history packet. Then, when the present timing is the timing for transmitting the history packet, the process operation is advanced to a step 3102, whereas when the present timing is not the timing for transmitting the history packet, the process operation is advanced to a step S103.

Figure 30:
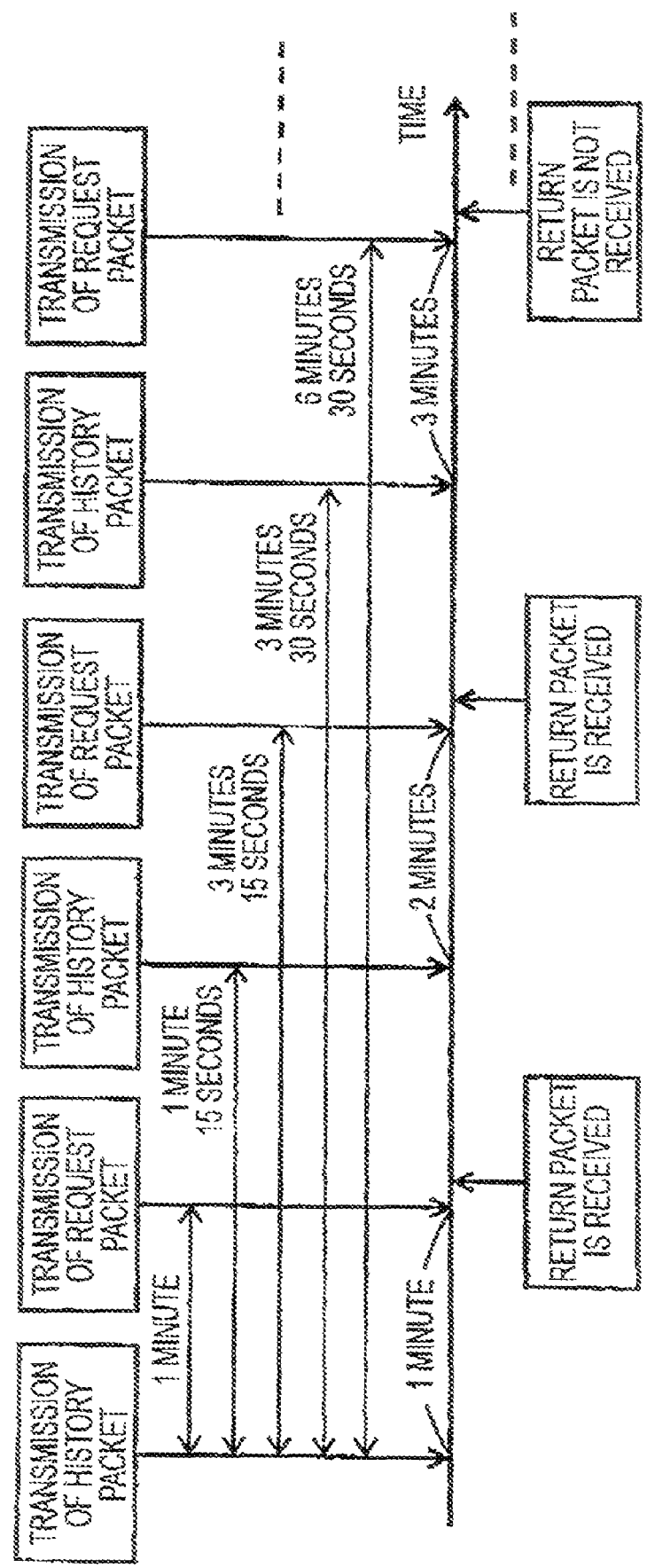
FIG. 30 is a diagram for describing transmissions of packets.

It is so assumed that the packet transmission control unit 13 contains, for instance, a timing table which represents both transmission timing of history packets and transmission timing of request packets as shown in FIG. 29. Then, when a series of the process operations indicated in FIG. 28 is commenced, the information processing apparatus 1 commences a time measuring operation by employing a timer, and the packet transmission control unit 13 judges that the present timing corresponds to timing for transmitting a history packet in the case that a value of the timer is coincident with the history packet transmitting timing shown in FIG. 29, whereas the packet transmission control unit 13 judges that the present timing corresponds to timing for transmitting a request packet in the case that a value of the timer is coincident with the request packet transmitting timing shown in FIG. 29. As a result, as shown in FIG. 30, both the history packet and the request packet are transmitted. It is so assumed that in FIG. 30, the wait time of the communication processing apparatus 2 is "2 minutes 30 seconds." As a consequence, the information processing apparatus 1 cannot receive such a return packet responding to a request packet transmitted at a time instant when a value of the timer indicates "6 minutes 30 seconds", but a port keeping time is detected as, for example, "2 minutes" (steps S108 and S109). Also, it is assumed that detailed process operations related to the transmissions of the history packets, the transmissions of the request packets, and the like are similar to those of the above descriptions in the embodiment mode 1. Similar to the above explanation, the information processing apparatus 4 according to the embodiment mode 2 may also perform a detecting process operation of a port keeping time without setting a wait time. Further, the method for detecting the port keeping time without setting the wait time is not limited to the method described in this explanation, but may be alternatively realized by employing other methods.

Also, the above-described respective embodiment modes have described such a case that the history packets, the request packets, and the return packets correspond to the packets of the UDP. Alternatively, these packets may be made of packets of the TCP, and may be realized by other packets if these packets are capable of detecting port keeping times.

Further, the above-described respective embodiment modes have described such a case that the transmission timing of the request packet is measured by employing the timer. Instead of the timer, a clock, a clock signal, and the like may be employed. Accordingly, there is no limitation as to means for measuring times.

Also, the above-described respective embodiment modes have described such a case that the information processing apparatus is connected via only one set of the communication processing apparatus 2 to the communication line 100. Alternatively, the information processing apparatus may be connected via a plurality of communication processing apparatuses to the communication line 100 (namely, communication processing apparatuses may be arranged in multi-stage connection manner). In this alternative case, the shortest port keeping time may be detected within these multi-staged communication processing apparatuses.

Also, the above-described respective embodiment modes have described such a case that the communication processing apparatus 2 has the NAT function (namely, communication processing apparatus 2 performs address translation). Alternatively, the communication processing apparatus 2 may have a firewall function of a packet filtering operation instead of the NAT function, or in combination with the NAT function. In this alternative case, a packet filtering operation implies that a reception packet is selected based upon, for example, the above-described reception filter rule. As to the communication processing apparatus 2 having such a firewall function, a port keeping time thereof may be detected by executing the methods according to the respective embodiment modes. In this case, a port keeping time in the case where the communication processing apparatus 2 has the firewall function implies a predetermined time in such a case that after this predetermined time has elapsed since a last packet had passed through a certain port of the above-described communication processing apparatus 2, a packet transmitted from the WAN side to this port is not transmitted to the LAN side of the communication processing apparatus 2.

Also, in the above-mentioned respective embodiment modes, the server apparatus may alternatively transmit a return packet after a predetermined time period has elapsed since a request packet had been received. For instance, the server apparatus may alternatively transmit the return packet after 5 seconds have elapsed since the request packet had been received. In this alternative case, in the information processing apparatus, while considering a time duration after this request packet has been received by the server apparatus until the return packet is transmitted, a wait time may be alternatively set. As previously explained, the return packet transmitting unit of the server apparatus may transmit the return packet after the predetermined time has elapsed since the request packet receiving unit had received the request packet or, as previously described in the respective embodiment modes, just after the request packet receiving unit has received the request packet.

Also, in the above-explained respective embodiment modes, when the history packet, the request packet, and the return packet of the UDP are transmitted, since the UDP is the connectionless type communication, there are some possibilities that a certain UDP packet among these UDP packets does not reach a communication destination. As a consequence, for example, when it is so judged that the present time is a time out after the information processing apparatus has transmitted the request packet, the request packet may alternatively be again transmitted so as to confirm whether or not the present time is really the time out. For example, when the history packet, the request packet, and the return packet of the UDP are transmitted, two, or more pieces of same packets may be transmitted at the substantially same time, while considering such a fact that a certain UDP packet among these UDP packets does not reach a communication destination.

Further, the above-described respective embodiment modes have described such a case that the server apparatus is specified based upon the IP address. Alternatively, the server apparatus may be specified based upon a domain name (for example, "server.pana.net" and the like). In this alternative case, this domain name is converted into an IP address by employing a DNS server, so that the server apparatus may be specified.

Also, the above-explained respective embodiment modes, the respective process operations (respective functions) may be realized by being intensively processed by a single apparatus single (system), or may be realized by being distributedly processed by a plurality of apparatuses.

Also, in the above-described respective embodiment modes, the respective structural elements may be arranged by employing exclusively-used hardware. Otherwise, structural elements realizable by software may be realized by executing a program. For example, a software program recorded on a recording medium such as a hard disk and a semiconductor memory is read to be executed by a program executing unit such as a CPU, so that the respective structural elements may be realized. It should also be understood that the software capable of realizing the information processing apparatuses in the above-described respective embodiment modes corresponds to the below-mentioned program: That is to say, this program is such a program which causes a computer to execute process operations in an information processing apparatus for constructing an information processing system, while the information processing system is equipped with the information processing apparatus, a server apparatus, and a communication processing apparatus which executes a process operation related to a communication between the information processing apparatus and the server apparatus. Then, this program causes the computer to execute a history packet transmitting step, a request packet transmitting step, a return packet receiving step, and a port keeping time detecting step. In the history packet transmitting step, a history packet is transmitted via one port of the communication processing apparatus, while the history packet corresponds to a packet for leaving a transmission history in the communication processing apparatus. In the request packet transmitting step, a request packet is transmitted via another port different from a history port to the server apparatus; the history port is a port of the communication processing apparatus, through which the history packet has passed; and the request packet is such a packet which requests a transmission of a return packet corresponding to the packet transmitted from the server apparatus. In the return packet receiving step, a return packet transmitted from the server apparatus via the history port is received. In the port keeping time detecting step, a port keeping time of the communication processing apparatus is detected based upon the reception of the return packet in the return packet receiving step.

Also, software capable of realizing the server apparatus employed in the above-described respective embodiment modes is the below-mentioned program. In the other words, this program is such a program which causes a computer to execute process operations in a server apparatus for constructing an information processing system, while the information processing system is equipped with the information processing apparatus, the server apparatus, and a communication processing apparatus which executes a process operation related to a communication between the information processing apparatus and the server apparatus. Then, this program causes the computer to execute a request packet receiving step, and a return packet transmitting step. In the request packet receiving step, a request packet is received, and the request packet is such a packet which requests a transmission of a return packet corresponding to a packet transmitted from the server apparatus. In the return packet transmitting step, a return packet is transmitted to a history port corresponding to such a port of the communication processing apparatus, through which a history packet has passed, while the history packet has been transmitted from the information processing apparatus in order to leave a transmission history in the communication processing apparatus.

It should be noted that in the above-described program, in the transmitting step for transmitting the information, and the receiving step for receiving the information, such a process operation executed by the hardware is not contained, for example, a process operation (namely, process operation which is exclusively performed only by hardware) which is carried out by a modem, an interface card, and the like in the transmitting step.

Also, this program may be executed by being downloaded from a server, or the like. Alternatively, this program may be executed by reading such a program recorded on a predetermined recording medium (for example, optical disk such as CD-ROM, magnetic disk, semiconductor memory etc.).

Also, the computers which execute the programs may be realized by employing a single computer, or a plurality of computers. In other words, single, or multiple computers may perform an intensive process operation, or distributed process operations.

Also, the present invention may be modified in various manners, and thus, is not limited only to the above-described embodiment modes.

INDUSTRIAL APPLICABILITY

As previously described, the information processing system, and the like, according to the present invention, can detect the port keeping times of the communication processing apparatus, and is useful as such an information processing system equipped with an information processing apparatus which transits a packet via the communication processing apparatus to a server apparatus, and the like.

The invention claimed is:

1. An information processing system comprising: an information processing apparatus; a server apparatus; and a communication processing apparatus for performing a process operation related to a communication between said information processing apparatus and said sever apparatus; wherein:

said information processing apparatus is comprised of:

a history packet transmitting unit for transmitting a history packet as part of said communication via a history port of said communication processing apparatus, said history packet corresponding to a packet for leaving a transmission history on said communication processing apparatus;

a request packet transmitting unit for transmitting as part of said communication a request packet to said server apparatus via a port different from the history port of said communication processing apparatus, through which said history packet has passed, said request packet requesting a transmission of a return packet from said server apparatus;

a packet transmission control unit for controlling transmission of the request packet by said request packet transmitting unit;

a return packet receiving unit for receiving the return packet transmitted to said history port of said communication processing apparatus from said server apparatus; and a port keeping time detecting unit for detecting a port keeping time of said communication processing apparatus based upon reception of the return packet by said return packet receiving unit; and wherein:

said server apparatus is comprised of:

a request packet receiving unit for receiving said request packet; and a return packet transmitting unit for transmitting said return packet to said history port when said request packet receiving unit receives the request packet, wherein the history packet is to be transmitted via said history port in a beginning stage of a wait time, wherein the wait time is a period of time between transmission of the history packet from the history port and an arrival of the return packet at said communication processing apparatus;

said packet transmission control unit controls the transmission of said request packet, and controls transmission of the history packet by said history packet transmitting unit;

said port keeping time detecting unit detects the port keeping time of said communication processing apparatus based upon the transmission of the history packet by said history packet transmitting unit; and in said port keeping time detecting unit, passage of the history packet through said history port, which corresponds to the beginning stage of said wait time, occurs when said history packet is transmitted.

2. The information processing system as claimed in claim 1 wherein:

said server apparatus is further comprised of:

a history packet receiving unit for receiving said history packet; and a transmission destination information storage unit for storing transmission destination information based upon the history packet received by said history packet receiving unit, said transmission destination information corresponding to information related to a transmission destination of said return packet; and wherein:

said return packet transmitting unit transmits said return packet based upon the transmission destination information stored by said transmission destination information storage unit.

3. The information processing system as claimed in claim 2 wherein:

said request packet has contained the transmission destination information corresponding to the information related to the transmission destination of said return packet; and said return packet transmitting unit transmits said return packet based upon the transmission destination information contained in the request packet received by said request packet receiving unit.

4. The information processing system as claimed in claim 3 wherein:

said server apparatus is further comprised of: a history packet receiving unit;

when said history packet receiving unit receives a history packet, said transmission packet transmitting unit transmits a return packet which contains at least information indicative of a position of said history port; and the information indicative of the position of said history port is contained in said transmission destination information.

5. The information processing system as claimed in claim 4 wherein:

said port keeping time detecting unit detects said port keeping time based upon a wait time when said return packet receiving unit is available to receive a return packet reached said communication processing apparatus in an end stage of said wait time within wait times corresponding to a time duration from a time instant when the return packet has reached said communication processing apparatus until a packet had passed through the history port before said reaching time instant.

6. The information processing system as claimed in claim 5 wherein:

said port keeping time detecting unit detects said port keeping time based upon a wait time when the return packet reached said communication processing apparatus is available to be reached by said return packet receiving unit in an end stage of said wait time, and also based upon the longest wait time within said wait times.

7. The information processing system as claimed in claim 5 wherein:

the return packet responding to said history packet is transmitted without via said history port;

the packet passed through said history port in a beginning stage of said wait time is said history packet; said packet transmission control unit controls the transmission of said request packet, and controls the transmission of the history packet by said history packet transmitting unit in the beginning stage of said wait time;

said port keeping time detecting unit detects the port keeping time of said communication processing apparatus based upon also the transmission of the history packet by said history packet transmitting unit; and in said port keeping time detecting unit, the time instant when the packet has passed through said history port, which corresponds to the beginning stage of said wait time, is a time instant when said history packet is transmitted.

8. The information processing system as claimed in claim 5 wherein:

the return packet responding to said history packet is transmitted without via said history port;

the packet passed through said history port in a beginning stage of said wait time is either said history packet or said return packet responding to said request packet;

said packet transmission control unit controls the transmission of said request packet, and controls said history packet transmitting unit in such a manner that when said return packet receiving unit cannot receive a return packet responding to the request packet, a history packet is transmitted in a beginning stage of a next wait time;

said port keeping time detecting unit detects the port keeping time of said communication processing apparatus based upon also the transmission of the history packet by said history packet transmitting unit; and in said port keeping time detecting unit, in such a case that the packet passed through said history port in the beginning stage of the wait time corresponds to said history packet, the time instant when the packet has passed through said history port, which is the beginning stage of said wait time, corresponds to a time instant when said history packet is transmitted, whereas in such a case that the packet passed through said history port in the beginning stage of the wait time corresponds to said return packet, the time instant when the packet has passed through said history port, which is the beginning stage of said wait time, corresponds to a time instant when said return packet is received.

9. The information processing system as claimed in claim 5 wherein:

the packet passed through said history port in a beginning stage of said wait time is said return packet; said packet transmission control unit controls the transmission of said request packet in such a manner that said wait time is increased every time the request packet is transmitted; and in said port keeping time detecting unit, the time instant when the packet has passed through said history port, which corresponds to the beginning stage of said wait time, is a time instant when said return packet is received.

10. The information processing system as claimed in claim 5 wherein:

the return packet responding to said history packet is transmitted via said history port;

the packet passed through said history port in a beginning stage of said wait time is a return packet responding to said history packet;

said packet transmission control unit controls the transmission of said request packet, and controls the transmission of the history packet by said history packet transmitting unit in the beginning stage of said wait time; and in said port keeping time detecting unit, the time instant when the packet has passed through said history port, which corresponds to the beginning stage of said wait time, is a time instant when said history packet is transmitted, or a time instant when said return packet responding to the history packet is received.

11. The information processing system as claimed in claim 5 wherein:

the return packet responding to said history packet is transmitted via said history port;

the packet passed through said history port in a beginning stage of said wait time is either a return packet responding to said history packet or a return packet responding to said request packet;

said packet transmission control unit controls the transmission of said request packet, and controls said history packet transmitting unit in such a manner that when said return packet receiving unit cannot receive the return packet responding to the request packet, a history packet is transmitted in a beginning stage of a next wait time; and in said port keeping time detecting unit, in such a case that the packet passed through said history port in the beginning stage of the wait time corresponds to the return packet responding to said history packet, the time instant when the packet has passed through said history port, which is the beginning stage of said wait time, corresponds to a time instant when said history packet is transmitted, or a time instant when the return packet responding to the history packet is received, whereas in such a case that the packet passed through said history port in the beginning stage of the wait time corresponds to said return packet responding to the request packet, the time instant when the packet has passed through said history port, which is the beginning stage of said wait time, corresponds to a time instant when said return packet responding to the request packet is received.

12. The information processing system according to claim 1 wherein:
said port keeping time detecting unit detects said port keeping time based upon a wait time when the return packet reached said communication processing apparatus in the end stage of said wait time could be received by said return packet receiving unit, and also based upon the longest wait time within said wait times.

13. The information processing system as claimed in claim 1 wherein:
said packet transmission control unit controls the transmission of said request packet, and controls said history packet transmitting unit in such a manner that when said return packet receiving unit cannot receive a return packet responding to the request packet, a history packet is transmitted in a beginning stage of a next wait time; and
in said port keeping time detecting unit, in such a case that the packet passed through said history port in the beginning stage of the wait time corresponds to said history packet, the time instant when the packet has passed through said history port, which is the beginning stage of said wait time, corresponds to a time instant when said history packet is transmitted, whereas in such a case that the packet passed through said history port in the beginning stage of the wait time corresponds to said return packet, the time instant when the packet has passed through said history port, which is the beginning stage of said wait time, corresponds to a time instant when said return packet is received.

14. The information processing system as claimed in claim 1 wherein:
the packet passed through said history port in a beginning stage of said wait time is said return packet; said packet transmission control unit controls the transmission of said request packet in such a manner that said wait time is increased every time the request packet is transmitted; and
in said port keeping time detecting unit, the time instant when the packet has passed through said history port, which corresponds to the beginning stage of said wait time, is a time instant when said return packet is received.

15. The information processing system as claimed in claim 1 wherein:
said packet transmission control unit controls the transmission of said request packet in such a manner that said wait time is increased every time the request packet is transmitted.

16. The information processing system as claimed in claim 15 wherein:
said port keeping time detecting unit detects said port keeping time in the case that the return packet responding to the transmitted request packet is not receivable by said return packet receiving unit.

17. The information processing system as claimed in claim 1 wherein:
said packet transmission control unit controls the transmission of said request packet in such a manner that said wait time is increased every time the request packet is transmitted until the return packet responding to the request packet is not receivable; and when the return packet responding to the request packet is not receivable, said packet transmission control unit controls the transmission of said request packet in such a manner that the present wait time becomes such a wait time between a wait time when the return packet is not receivable and the longest wait time among the wait times when the return packets are receivable.

18. The information processing system as claimed in claim 1 wherein:
said packet transmission control unit controls the transmission of said request packet in such a manner that said wait time is decreased every time the request packet is transmitted.

19. The information processing system as claimed in claim 1 wherein:
in said port keeping time detecting unit, a time instant when the return packet reaches said communication processing apparatus, which corresponds to the end stage of said wait time, is such a time instant when a request packet for requesting a transmission of said return packet is transmitted.

20. The information processing system as claimed in claim 1 wherein:
in said port keeping time detecting unit, a time instant when the return packet reaches said communication processing apparatus, which corresponds to the end stage of said wait time, is such a time instant when said return packet is received.

21. The information processing system as claimed in claim 1 wherein:
in said port keeping time detecting unit, a time instant when the return packet reaches said communication processing apparatus, which corresponds to the end stage of said wait time, is such a time instant when said return packet is received in such a case that said return packet is receivable, and is such a time instant when a request packet for requesting a transmission of said return packet is transmitted in such a case that said return packet is not receivable.

22. The information processing system as claimed in claim 1 wherein:
in said packet transmission control unit, a time instant when the return packet reaches said communication processing apparatus, which corresponds to the end stage of said wait time, is such a time instant when a request packet for requesting a transmission of said return packet is transmitted.

23. The information processing system as claimed in claim 1 wherein:
said history port is such a port which is newly allocated in said communication processing apparatus when a history packet of a first time passes through said port.

24. An information processing apparatus wherein:
said information processing apparatus constitutes the information processing system as recited in claim 1.

25. A server apparatus wherein:
said server apparatus constitutes the information processing system as recited in claim 1.

26. An information processing method used in an information processing apparatus which constitutes an information processing system equipped with said information processing apparatus; a server apparatus; and a communication processing apparatus for performing a process operation related to a communication between said information processing apparatus and said sever apparatus; wherein:
said information processing method is comprised of:
a history packet transmitting step for transmitting a history packet via a history port of said communication processing apparatus, said history packet corresponding to a packet for leaving a transmission history on said communication processing apparatus;

a request packet transmitting step for transmitting a request packet to said server apparatus via a port different from the history port of said communication processing apparatus, through which said history packet has passed, said request packet requesting a transmission of a return packet from said server apparatus;

a return packet receiving step for receiving the return packet transmitted to said history port of said communication processing apparatus from said server apparatus; and a port keeping time detecting step for detecting a port keeping time of said communication processing apparatus based upon reception of the return packet during said return packet receiving step, wherein the history packet is to be transmitted via said history port in a beginning stage of a wait time, wherein the wait time is a period of time between transmission of the history packet from the history port and an arrival of the return packet at said communication processing apparatus;

said information processing method is further comprised of:

controlling transmission of said request packet;

controlling the transmission of the history packet in the beginning stage of said wait time; and detecting the port keeping time of said communication processing apparatus based upon the transmission of the history packet;

wherein passage of the history packet through said history port, which corresponds to the beginning stage of said wait time, occurs when said history packet is transmitted.

27. A computer program product embodied on a non-transitory computer readable medium which, when executed by a computer, causes the computer to perform data processing in an information processing system comprising an information processing apparatus, a server apparatus, and a communication processing apparatus for performing processing related to communications between said information processing apparatus and said server apparatus; the data processing including:

a history packet transmitting step for transmitting a history packet via a history port of said communication processing apparatus, said history packet corresponding to a packet for leaving a transmission history on said communication processing apparatus;

a request packet transmitting step for transmitting a request packet to said server apparatus via a port different from the history port of said communication processing apparatus, through which said history packet has passed, said request packet requesting a transmission of a return packet from said server apparatus;

a return packet receiving step for receiving the return packet transmitted to said history port from said server apparatus; and a port keeping time detecting step for detecting a port keeping time of said communication processing apparatus based upon the reception of the return packet by said return packet receiving step, wherein the history packet is to be passed through said history port in a beginning stage of a wait time, wherein the wait time is a period of time between passage of the history packet through the history port and an arrival of the return packet at said communication processing apparatus;

said data processing is further comprised of:

controlling the transmission of said request packet;

controlling the transmission of the history packet in the beginning stage of said wait time; and detecting the port keeping time of said communication processing apparatus based upon the transmission of the history packet;

wherein passage of the history packet through said history port, which corresponds to the beginning stage of said wait time, occurs when said history packet is transmitted.

28. A computer program product embodied on a non-transitory computer readable medium which, when executed by a computer, causes the computer to perform data processing in an information processing system comprising an information processing apparatus, a server apparatus, and a communication processing apparatus for performing processing related to communications between said information processing apparatus and said server apparatus; the data processing including:

a history packet receiving step of receiving a history packet transmitted from a history port of said communication processing apparatus, said history packet corresponding to a packet for leaving a transmission history on said communication processing apparatus;

a request packet receiving step for receiving a request packet which requests a transmission of a return packet corresponding to a packet transmitted from said server apparatus; and a return packet transmitting step for transmitting said return packet to said history port when the request packet is received in said request packet receiving step, said history port corresponding to a port of said communication processing apparatus, through which said history packet has been transmitted from said information processing apparatus in order to leave a transmission history in said communication processing apparatus, wherein the history packet is to be passed through said history port in a beginning stage of a wait time, wherein said wait time is a period of time between passage of the history packet through the history port and an arrival of the return packet at said communication processing apparatus;

said data processing is further comprised of:

controlling transmission of said request packet, and controlling transmission of the history packet in the beginning stage of said wait time; and detecting a port keeping time of said communication processing apparatus based upon the transmission of the history packet;

wherein passage of the history packet through said history port, which corresponds to the beginning stage of said wait time, occurs when said history packet is transmitted.

* * * * *